(12) United States Patent
Beshai

(10) Patent No.: US 9,706,274 B2
(45) Date of Patent: Jul. 11, 2017

(54) DISTRIBUTED CONTROL OF A MODULAR SWITCHING SYSTEM

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 0 days.

(21) Appl. No.: 14/953,442

(22) Filed: Nov. 30, 2015

(65) Prior Publication Data

US 2016/0156998 A1   Jun. 2, 2016

Related U.S. Application Data

(63) Continuation-in-part of application No. 14/741,475, filed on Jun. 17, 2015.

(60) Provisional application No. 62/086,126, filed on Dec. 1, 2014.

(51) Int. Cl.
*H04B 10/00* (2013.01)
*H04Q 11/00* (2006.01)
*H04J 14/02* (2006.01)

(52) U.S. Cl.
CPC ...... *H04Q 11/0005* (2013.01); *H04J 14/0238* (2013.01); *H04Q 2011/005* (2013.01); *H04Q 2011/0016* (2013.01); *H04Q 2011/0035* (2013.01); *H04Q 2011/0045* (2013.01); *H04Q 2011/0058* (2013.01)

(58) Field of Classification Search
USPC ................................................ 398/49–57
See application file for complete search history.

(56) References Cited

U.S. PATENT DOCUMENTS

| | | | | |
|---|---|---|---|---|
| 6,430,179 B1 * | 8/2002 | Meyer | ...................... | H04Q 3/68 340/2.21 |
| 6,826,368 B1 * | 11/2004 | Koren | ................. | H04J 14/0227 370/466 |
| 8,228,930 B1 * | 7/2012 | Kim | ........................ | H04L 12/56 370/413 |
| 8,428,071 B2 * | 4/2013 | Beshai | ............... | H04Q 11/0005 370/400 |
| 2002/0163693 A1 * | 11/2002 | Rubissa | ............ | H04Q 11/0005 398/82 |
| 2003/0193937 A1 * | 10/2003 | Beshai | ............... | H04Q 11/0005 370/372 |
| 2004/0165887 A1 * | 8/2004 | Beshai | .................... | H04L 49/10 398/42 |
| 2005/0078666 A1 * | 4/2005 | Beshai | .................... | H04L 45/62 370/380 |

(Continued)

*Primary Examiner* — Agustin Bello

(57) ABSTRACT

A large-scale switching system configured as a global network or a large-scale data center employs switches arranged in a matrix having multiple rows and multiple columns. The switching system supports a large number of access nodes (edge nodes). Each access node has a channel to each switch in a respective row and a channel from each switch of a respective column. Thus, an access node connects to input ports of a set of switches and output ports of a different set of switches. Each access node has a path to each other access node traversing only one of the switches. Controllers of switches of each diagonal pair of switches are integrated or mutually coupled to provide a return control path for each access node. The switches may be arranged into constellations of collocated switches to facilitate edge-node access to switches using wavelength-division-multiplexed links. The switches are preferably fast optical switches.

17 Claims, 50 Drawing Sheets

(56) References Cited

U.S. PATENT DOCUMENTS

| | | | |
|---|---|---|---|
| 2006/0008273 A1* | 1/2006 | Xue | H04L 45/00 398/51 |
| 2006/0120342 A1* | 6/2006 | Christensen | H04L 45/00 370/351 |
| 2008/0075071 A1* | 3/2008 | Beshai | H04Q 11/0005 370/386 |
| 2008/0138067 A1* | 6/2008 | Beshai | H04L 49/357 398/45 |
| 2013/0045009 A1* | 2/2013 | Beshai | H04Q 11/0005 398/49 |
| 2016/0156998 A1* | 6/2016 | Beshai | H04Q 11/0005 398/49 |

* cited by examiner

DISTRIBUTED CONTROL OF A MODULAR SWITCHING SYSTEM

CROSS-REFERENCE TO RELATED APPLICATIONS

The present application claims the benefit of provisional application 62/086,126 filed on Dec. 1, 2014, the entire content of which is incorporated herein by reference, and is a continuation-in-part of U.S. patent application Ser. No. 14/741,475 filed on Jun. 17, 2015, the specification of which is incorporated herein by reference in its entirety.

FIELD OF THE INVENTION

The invention is related to a modular switching system configured as a large-scale data center or a network of global coverage. In particular, the invention is concerned with distribution of control data in a modular switching system having a large number of switches.

SUMMARY

In accordance with one aspect, the present invention provides a switching system comprising switches interconnecting edge nodes. The switches are logically arranged in a matrix of a number of columns and the same number of rows. Each switch has a number of input ports and the same number of output ports and is coupled to a respective switch controller.

Each edge node is communicatively coupled to an input port of each switch of a respective row and an output port of each switch of a respective column. To facilitate distribution of control data from the switches to the edge nodes, each switch and its diagonal mirror, forming a diagonal pair, with respect to the matrix are spatially collocated. Switch controllers of a first switch and a second switch of each diagonal pair of switches are communicatively coupled.

With the matrix of switches of $\mu$ columns and $\mu$ rows, $\mu>2$, a diagonal pair of switches comprises a switch of column j and row k and a switch of column k and row j, j≠k, the columns being indexed as 0 to ($\mu-1$) and the rows being indexed as 0 to ($\mu-1$).

In addition to the input ports and output ports connecting to edge nodes, the switching mechanism of a switch may provide a control inlet and a control outlet. The switch controller of a switch may be coupled to the control inlet and control outlet so that an edge node may communicate with the switch controller through an input port, the switching mechanism, and the outlet port and, conversely, the switch controller may communicate with an edge node through the control inlet, the switching mechanism, and an output port.

Other means of communication between edge nodes coupled to a switch and a controller of the switch may be devised; for example by providing separate control paths from each input port of a switch to a controller of the switch and separate paths from the controller of the switch to output ports of the switch. Thus edge nodes connecting to the input ports may send upstream control data to the switch controller and the switch controller may send downstream control data to edge nodes connecting to the output ports of the switch.

A switch controller of a switch comprises a scheduler for scheduling data transfer through the switch and a timing circuit for exchanging timing data with each edge node connecting to the switch. A master time indicator is coupled to the switch controllers of the two switches of a diagonal pair of switches.

According to an embodiment, the edge nodes of the switching system may be communicatively coupled to the switches through intermediate spectral routers. With this method of coupling, the input ports of a switch connect to output channels of a spectral demultiplexer and the output ports of the switch connect to input channels of a spectral multiplexer. The spectral demultiplexer directs individual spectral bands from an upstream wavelength-division-multiplexed link originating from an edge node to respective input ports of the switch. The spectral multiplexer combines spectral bands from the output ports of the switch onto a downstream wavelength-division-multiplexed link terminating at an edge node.

Thus, the switching system employs a plurality of upstream spectral routers and a plurality of downstream spectral routers. Each spectral router connects a set of upstream wavelength-division-multiplexed (WDM) links originating from a respective set of edge nodes to a set of WDM links each terminating on a single switch. Each downstream spectral router connects a set of WDM links each originating from a single switch to a respective set of downstream WDM links each terminating on a single edge node.

According to another embodiment, the edge nodes of the switching system may be communicatively coupled to the switches directly. With this method of coupling, the switches would be organized into constellations of switches where the switches of each constellation are spatially collocated. Each constellation may be organized in the form of a sub-matrix of $\Lambda$ rows and $\Lambda$ columns of switches, $\Lambda>1$. With the matrix of switches having $\mu$ columns and $\mu$ rows, $\mu$ is selected as an integer multiple of $\Lambda$.

A constellation of switches is coupled to $\Lambda$ arrays of spectral demultiplexers and $\Lambda$ arrays of spectral multiplexers. Each spectral demultiplexer directs spectral bands of a respective upstream WDM link to an input port of each switch of a row of the constellation. Each spectral multiplexer combining spectral bands from an output port of each switch of a column of the constellation onto a respective downstream WDM link. Each edge node is communicatively coupled to the switches through an upstream WDM link to each constellation of a respective row of constellations and a downstream WDM link from each constellation of a respective column of constellations. An upstream WDM link connects an edge node to input of a spectral demultiplexer coupled to a constellation. A downstream WDM link connects output of a spectral multiplexer coupled to a constellation to an edge node.

In accordance with another aspect, the present invention provides a method of switching data among a plurality of edge nodes. The method comprises arranging a plurality of switches in a matrix of $\mu$ columns and $\mu$ rows, $\mu>2$, collocating the two switches of each diagonal pair of switches, mutually coupling controllers of the two switches of a diagonal pair of switches, each switch being coupled to a respective controller, and coupling the two switches of a diagonal pair of switches to a respective master time indicator.

Control data is communicated from a first controller of a first switch of a diagonal switch pair to a first edge node connected to an input port of the first switch along a first control path traversing a second controller of a second switch of the diagonal switch pair and a switching mechanism of the second switch.

Control data is communicated from the second controller to a second edge node connected to an input port of the second switch along a second control path traversing the first controller and a switching mechanism of the first switch.

The method further comprises performing, at the respective controller of a particular switch, processes of scheduling data transfer through a switching mechanism of the particular switch and exchanging timing data with each edge node connecting to the particular switch.

The method further comprises receiving at the first controller timing data from the first edge node and correlating at the first controller the received timing data with a reading of the master time indicator. A result of the correlation is communicated to the first edge node through the first control path.

The method further comprises receiving at the second controller additional timing data from the second edge node and correlating at the second controller the received additional timing data with a reading of the master time indicator. A result of the correlation is communicated to the second edge node through the second control path.

The method further comprises adding $(2\times\mu+1)$ new switches as a new column of switches and a new row of switches to the matrix of switches and providing m additional edge nodes, m being a number of input ports and a number of output ports of each switch of the plurality of switches. Each edge node of the additional edge nodes connects to an input port of each switch of $(\mu+1)$ switches of the new row of switches. The m input ports of each switch of remaining $\mu$ switches connect to a set of edge nodes connecting to one of the rows of switches.

The method further comprises indexing edge nodes of the plurality of edge nodes sequentially where edge nodes connecting to a row of index q and a column of index q, $0 \le q \le \mu$, are indexed as $(j+m\times q)$, $0 \le j < m$, thereby the index of an edge node remains unchanged as the switching system grows to accommodate more edge nodes.

The method further comprises adding an input port and an output port to each switch of the plurality of switches and providing $\mu$ additional edge nodes. Each edge node of the additional edge nodes connects to an input port of each switch of a row of index q and an output port of each switch of a column of index q, $0 \le q \le \mu$.

The method further comprises indexing edge nodes of the plurality of edge nodes sequentially where edge nodes connecting to a row of index q and a column of index q, $0 \le q \le \mu$, are indexed as $(q+\mu\times j)$, $0 \le j < m$. Thus, the index of an edge node remains unchanged as the switching system grows to accommodate more edge nodes.

In accordance with a further aspect, the present invention provides a switching system comprising a plurality of switches logically organized into a matrix of constellations of collocated switches. Each constellation comprises $\Lambda$ rows and $\Lambda$ columns of switches, $\Lambda > 1$. Each switch coupled to a respective switch controller and comprises a number of input ports and the same number of output ports. Each constellation of switches is coupled to $\Lambda$ arrays of spectral demultiplexers and $\Lambda$ arrays of spectral multiplexers. A spectral demultiplexer directs spectral bands of a respective upstream WDM link to an input port of each switch of a row of a constellation. A spectral multiplexer combines spectral bands from an output port of each switch of a column of a constellation onto a respective downstream WDM link.

To interconnect edge nodes of a plurality of edge nodes, each edge node connects to constellations of a respective row and constellations of a respective column of the matrix of constellations. An edge node has a number of upstream WDM links, each directed to a spectral demultiplexer coupled to one of the constellations of the respective row, and a number of downstream WDM links each originating from a spectral multiplexer coupled to one of the constellations of the respective column.

Thus, each edge node connects to a respective set of spectral demultiplexers coupled to constellations of a row of matrix of constellations and respective set of multiplexers coupled to constellations of a column of matrix of constellations. The respective set of spectral demultiplexers and respective set of multiplexers are selected so that each switch of a first constellation and a corresponding switch of a second constellation constitute a complementary switch pair, where said first constellation and said second constellation constitute a diagonal constellation pair.

BRIEF DESCRIPTION OF THE DRAWINGS

Features and implementations will be further described with reference to the accompanying exemplary drawings, in which.

Figure 1:
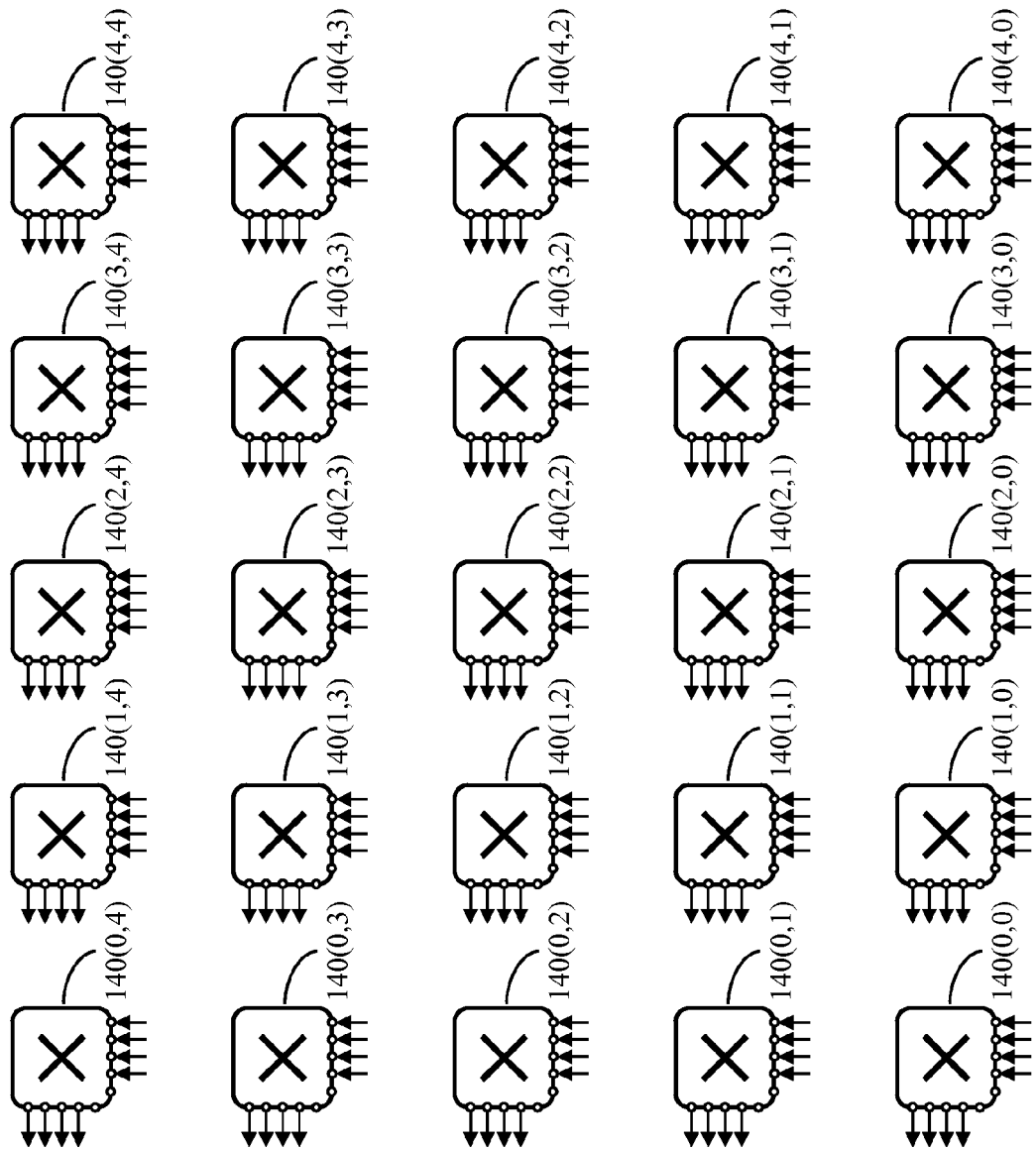
FIG. 1 illustrates switches logically arranged in a matrix of switches for use in illustrating switching-system growth according to a first growth scheme.
Figure 36:
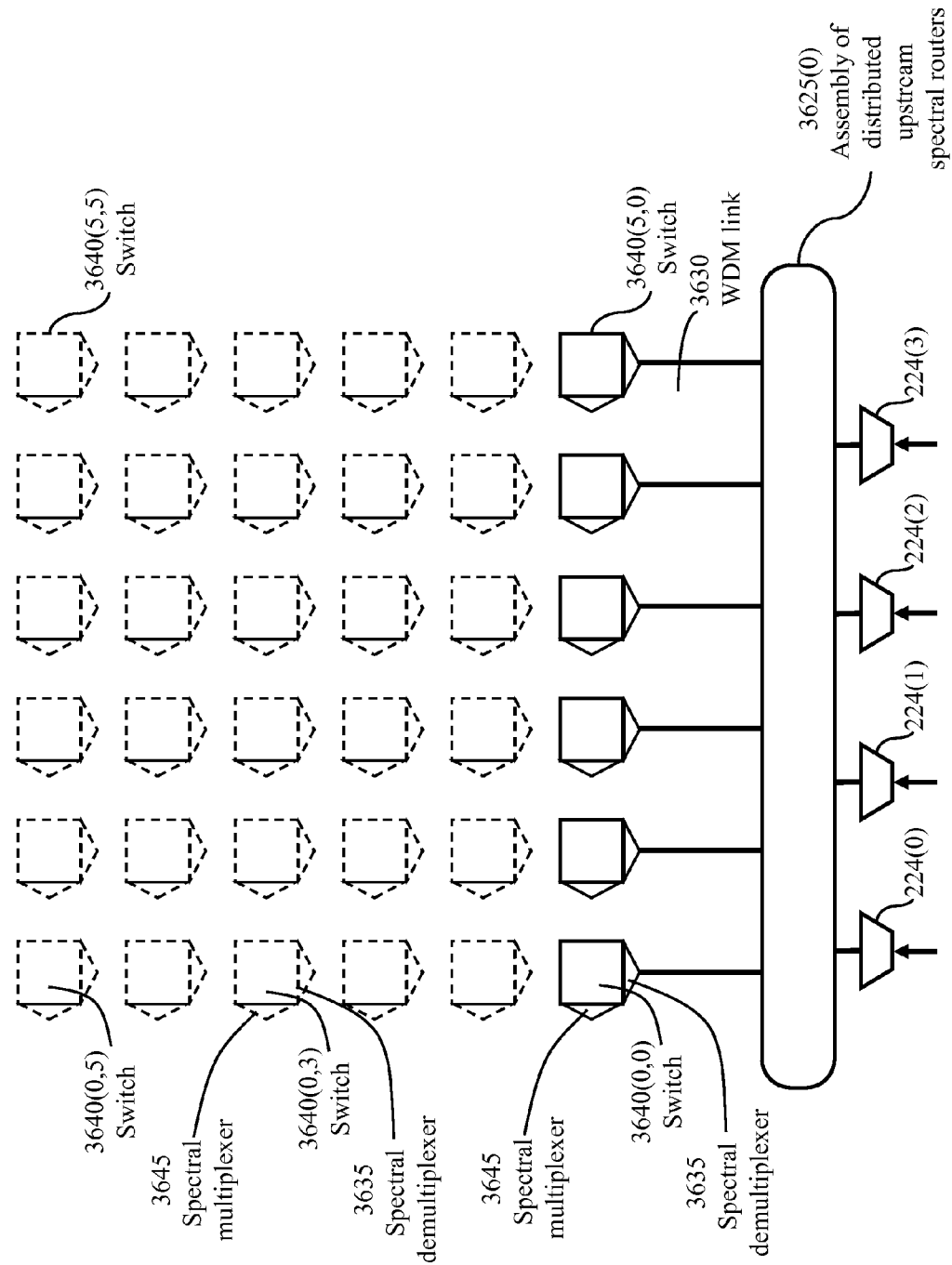
Figure 37:
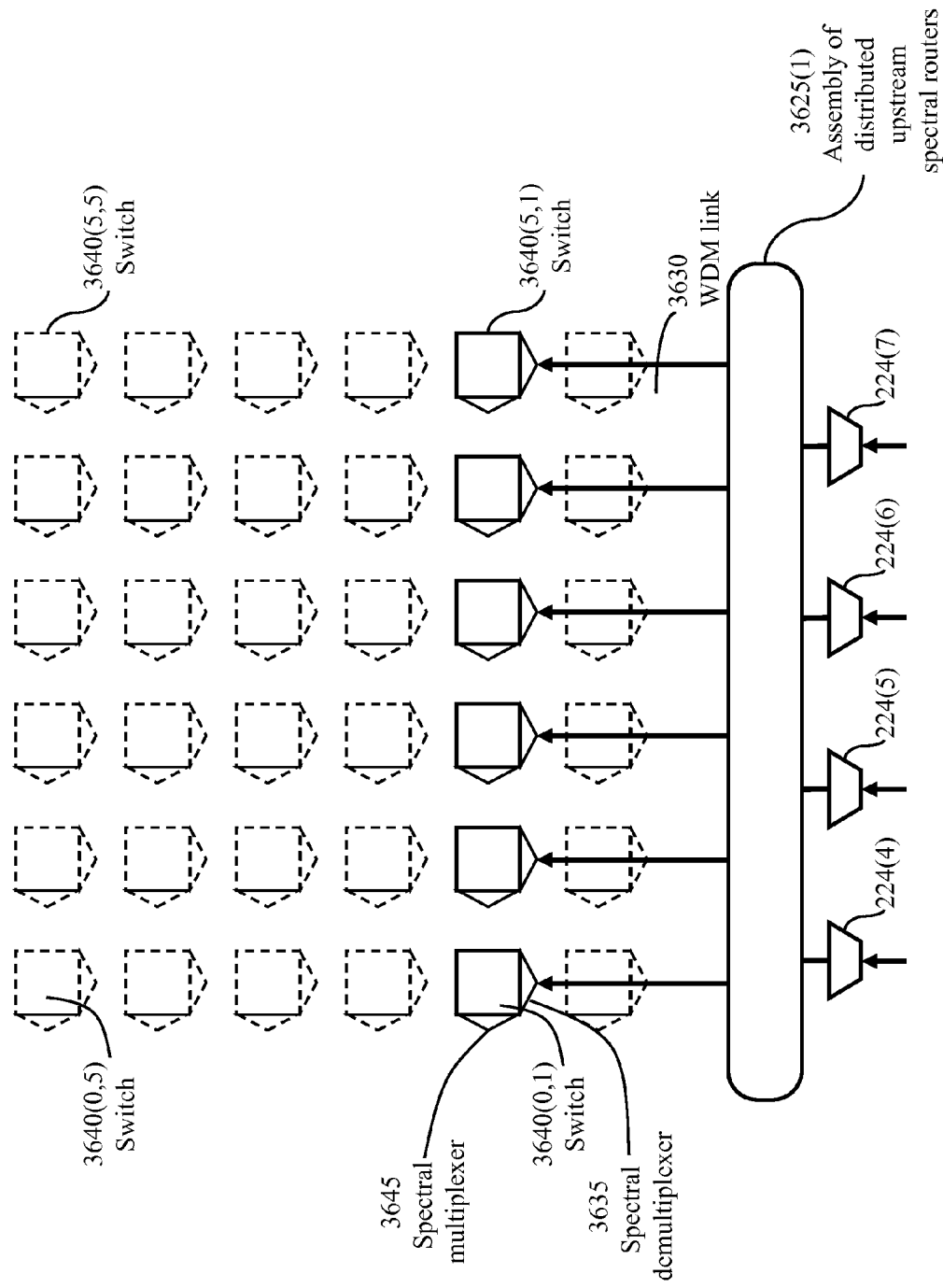
Figure 38:
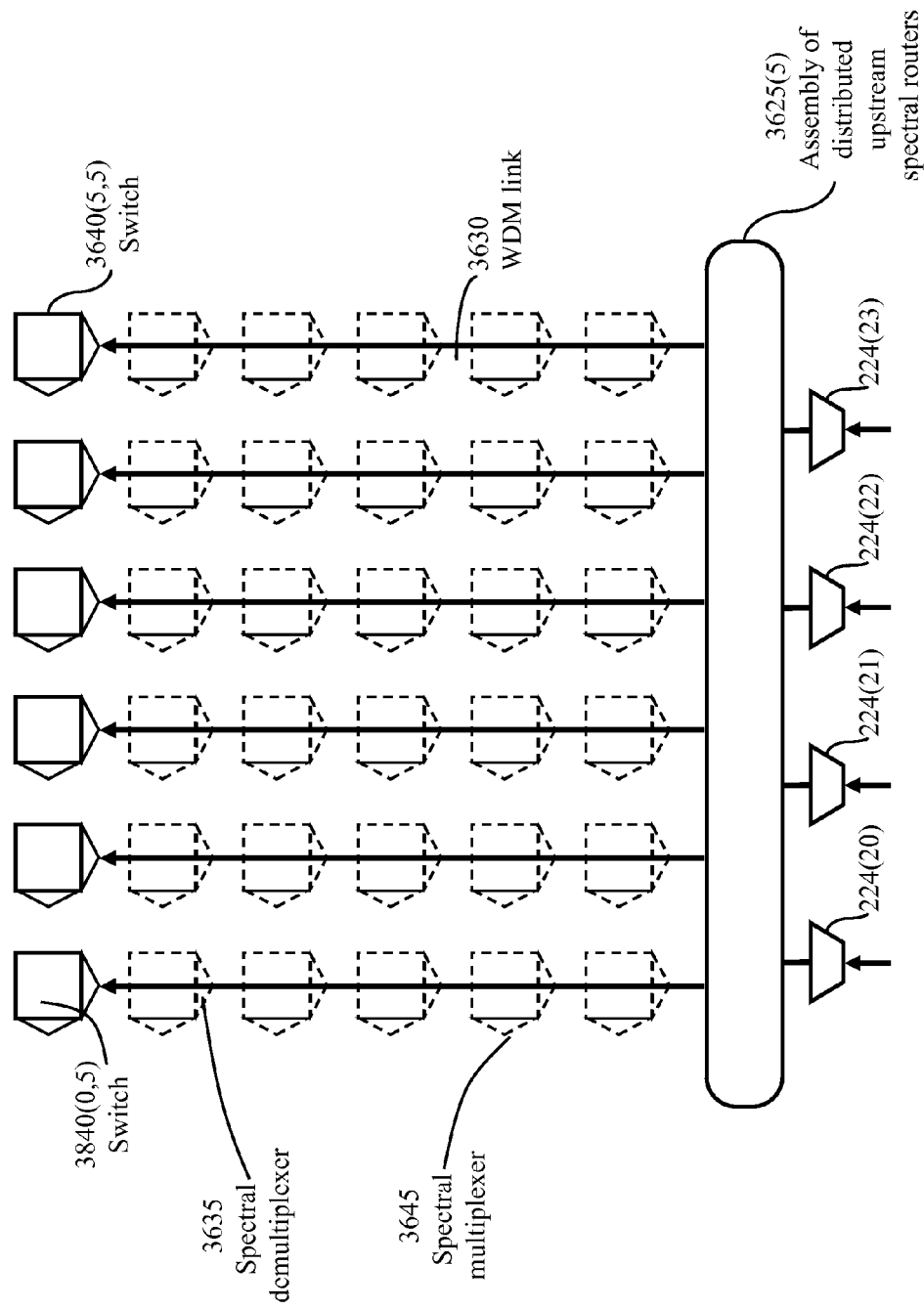
Figure 39:
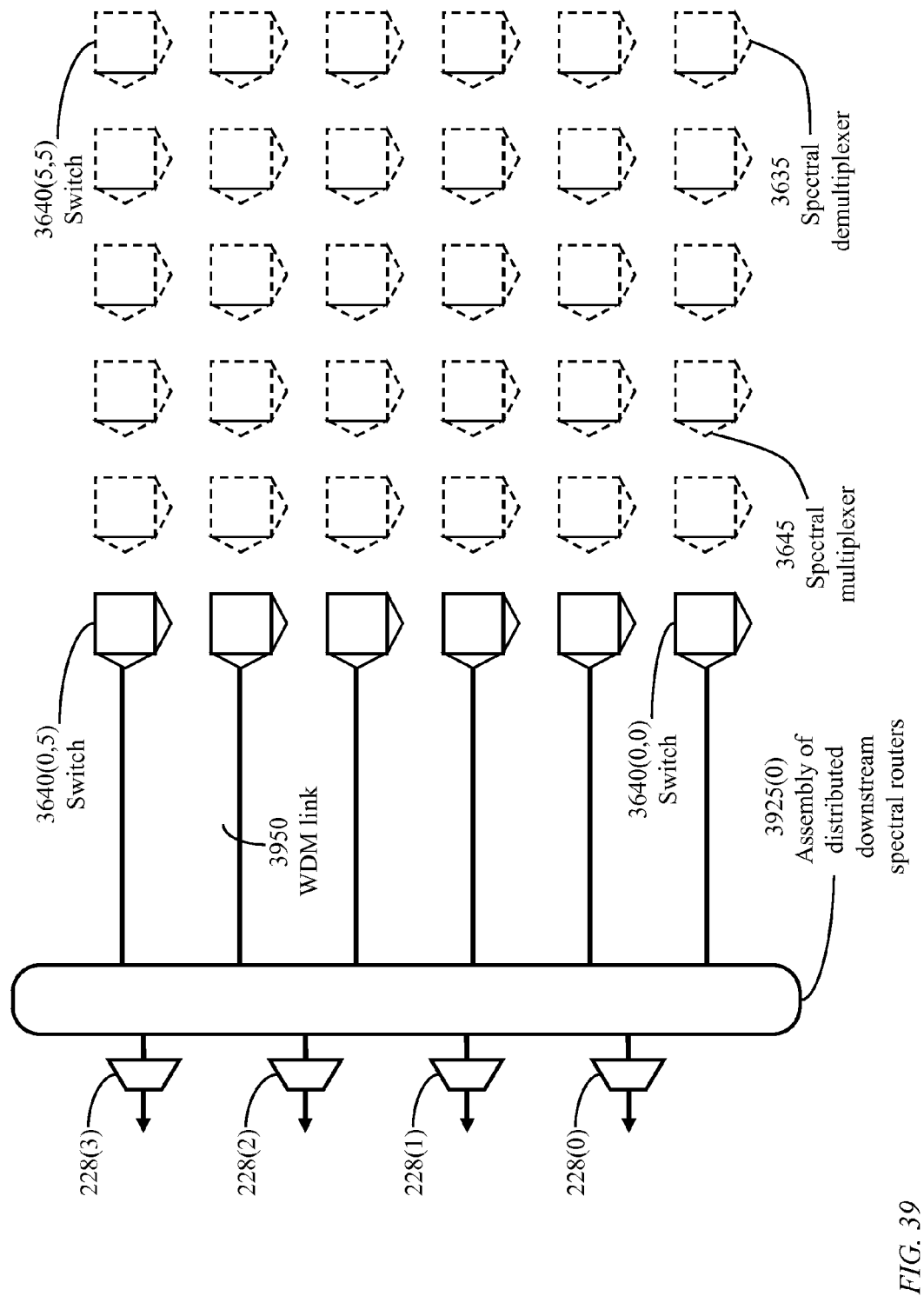
Figure 40:
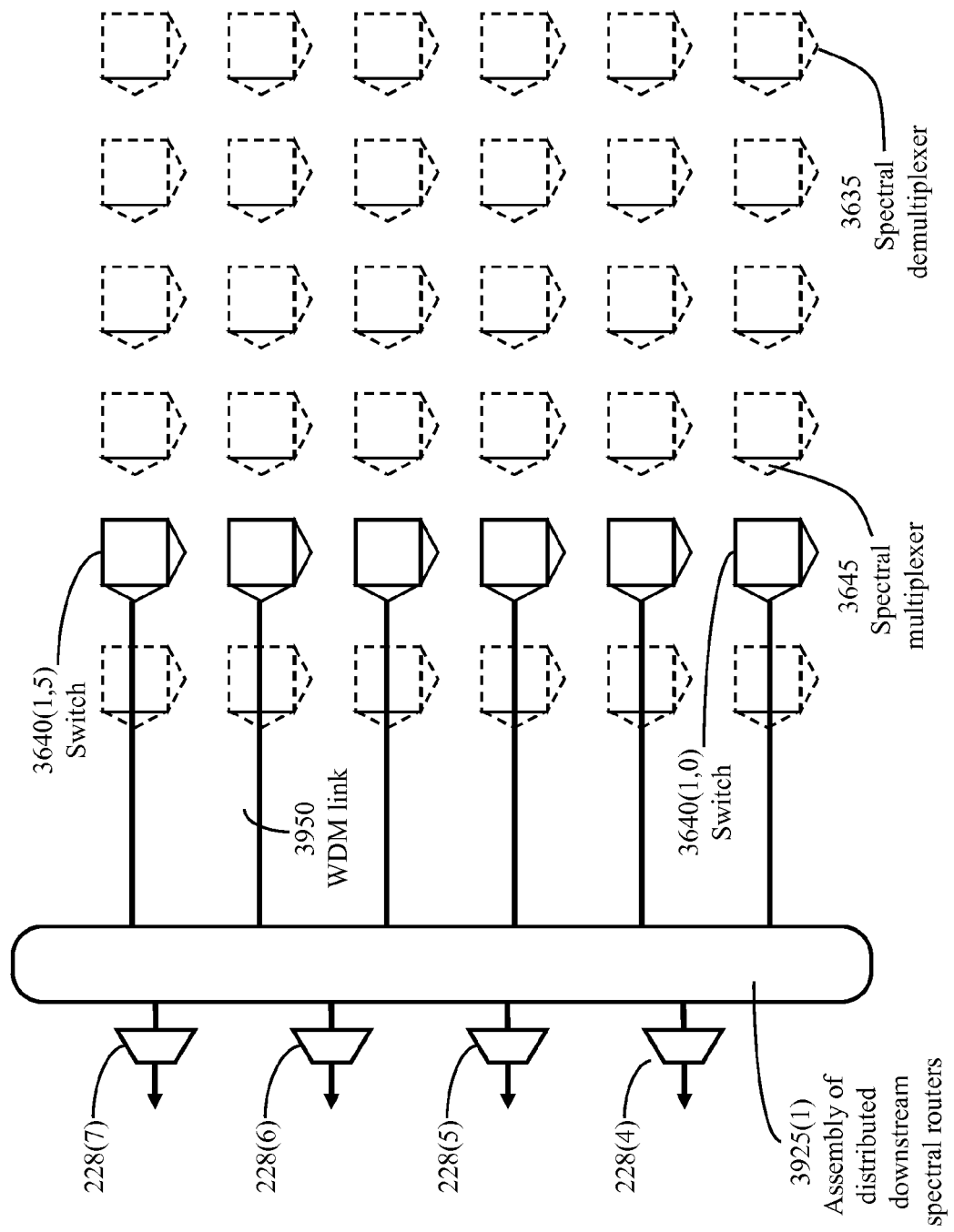
Figure 41:
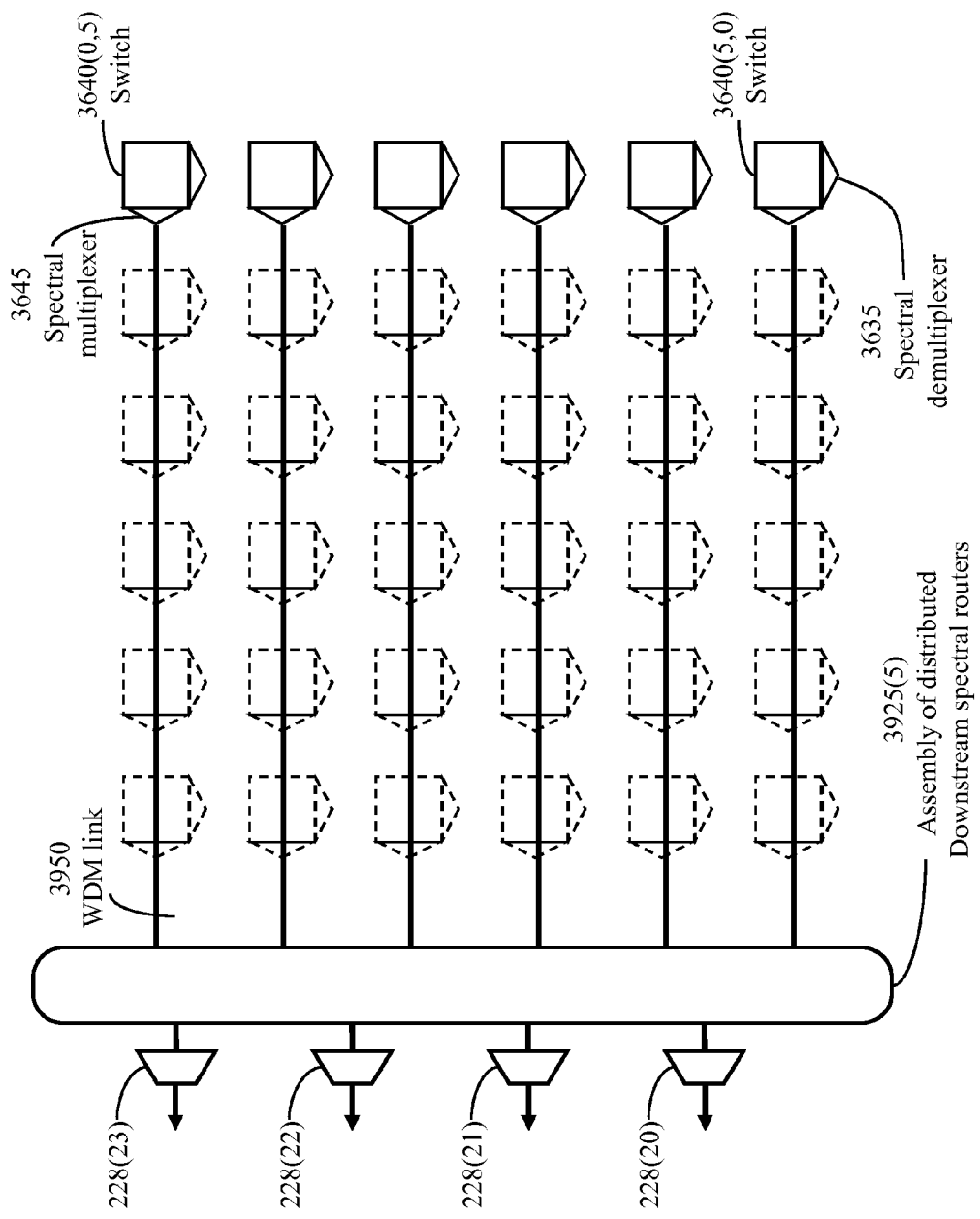
Figure 42:
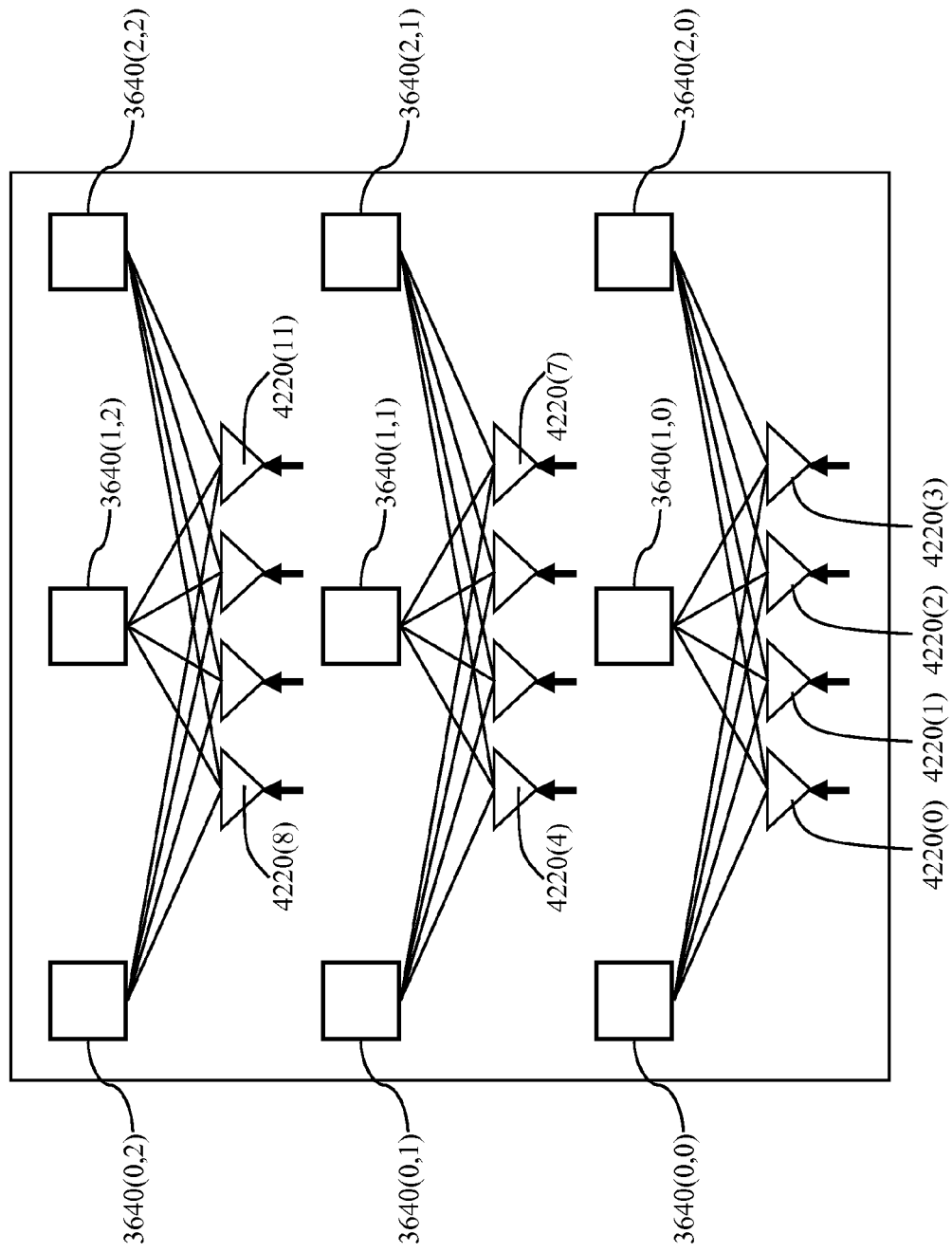
Figure 43:
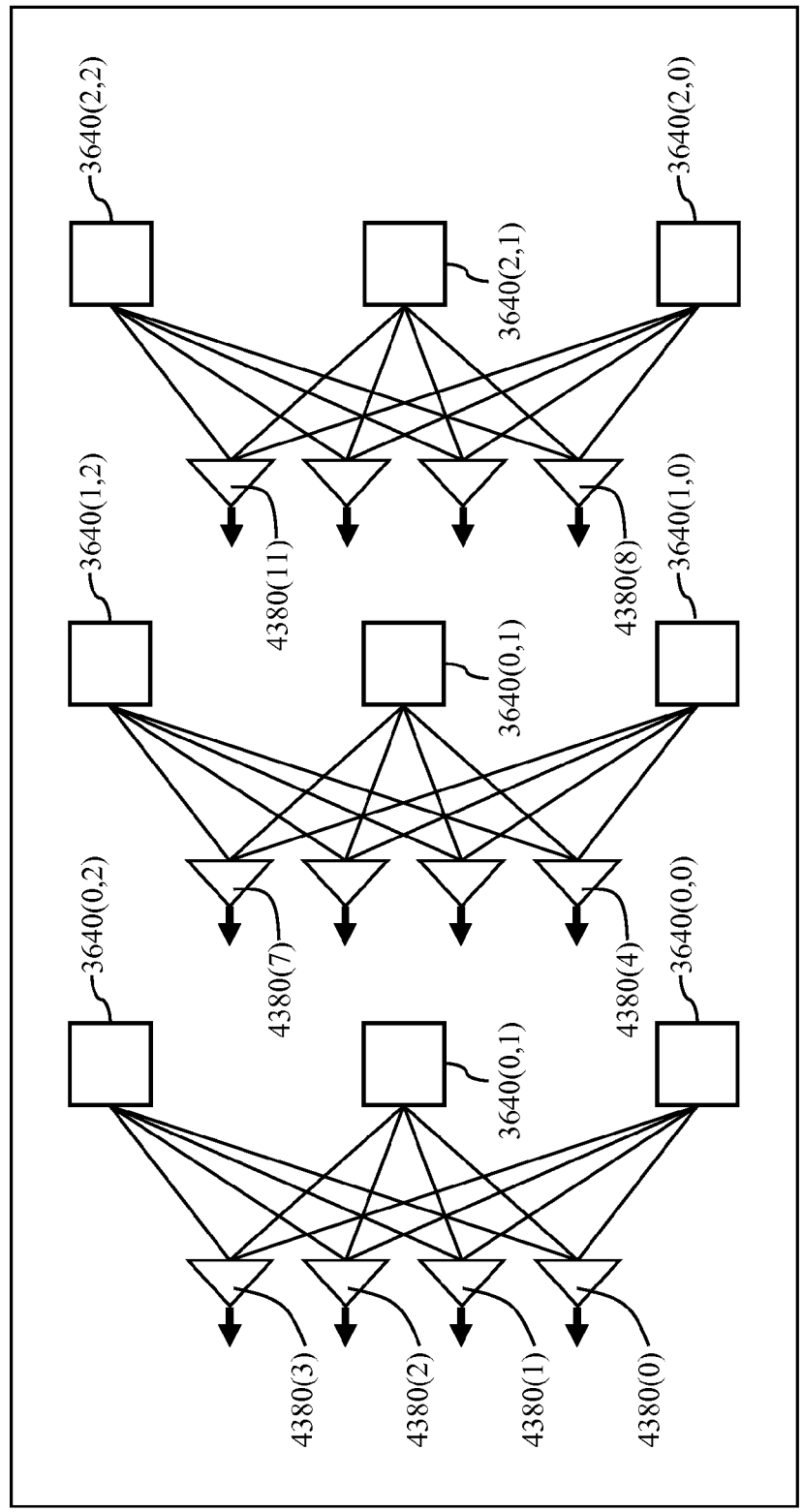
Figure 44:
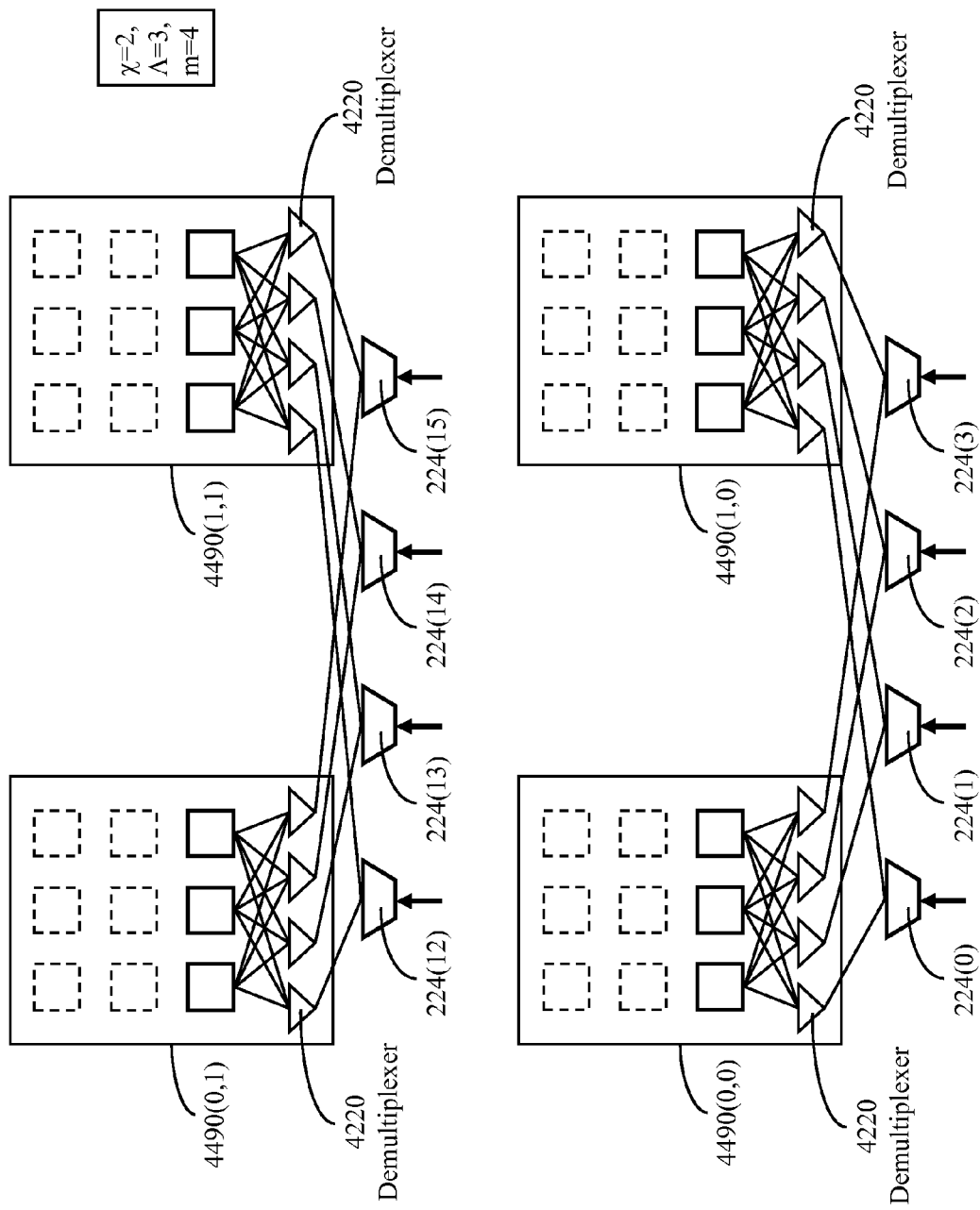
Figure 45:
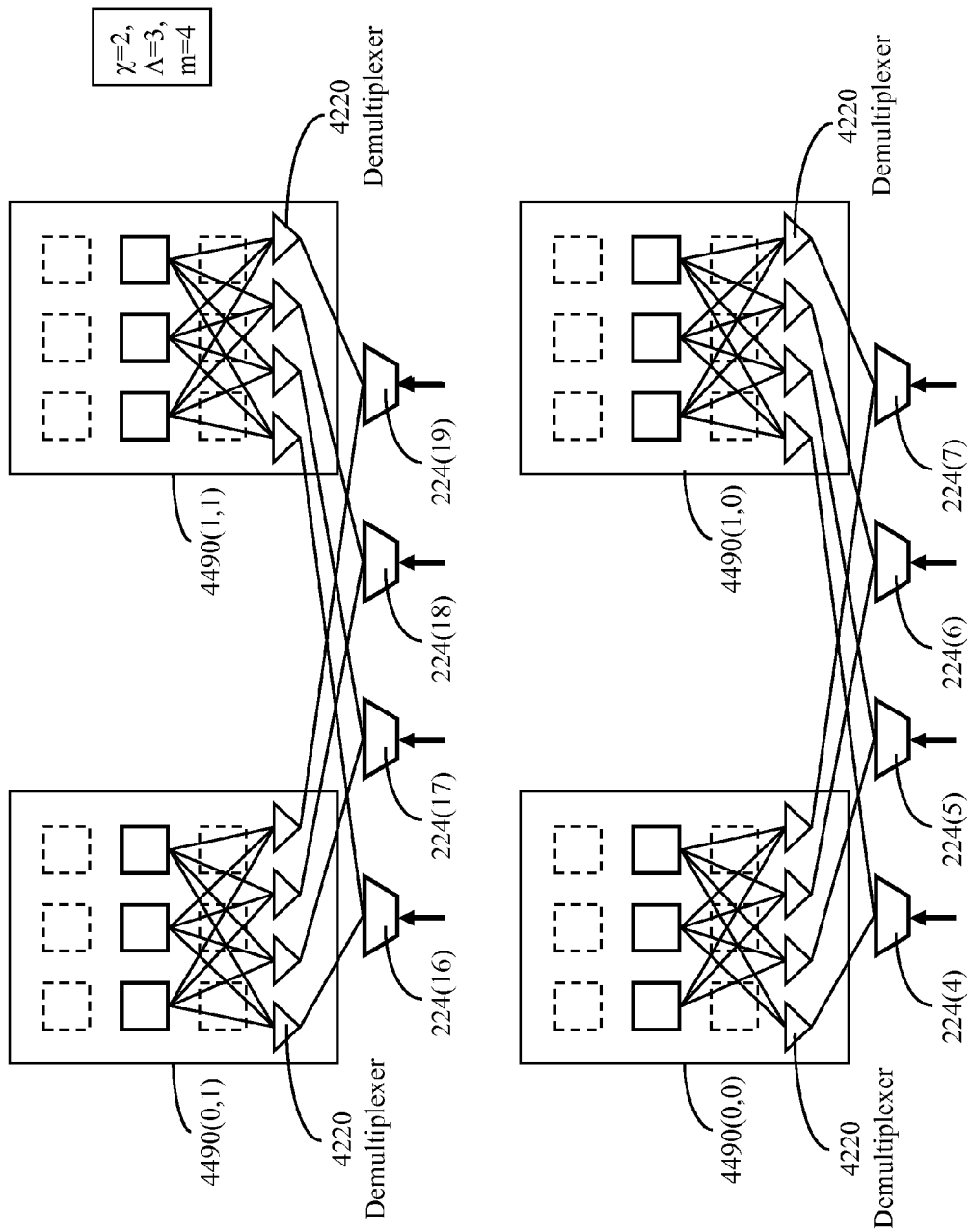
Figure 46:
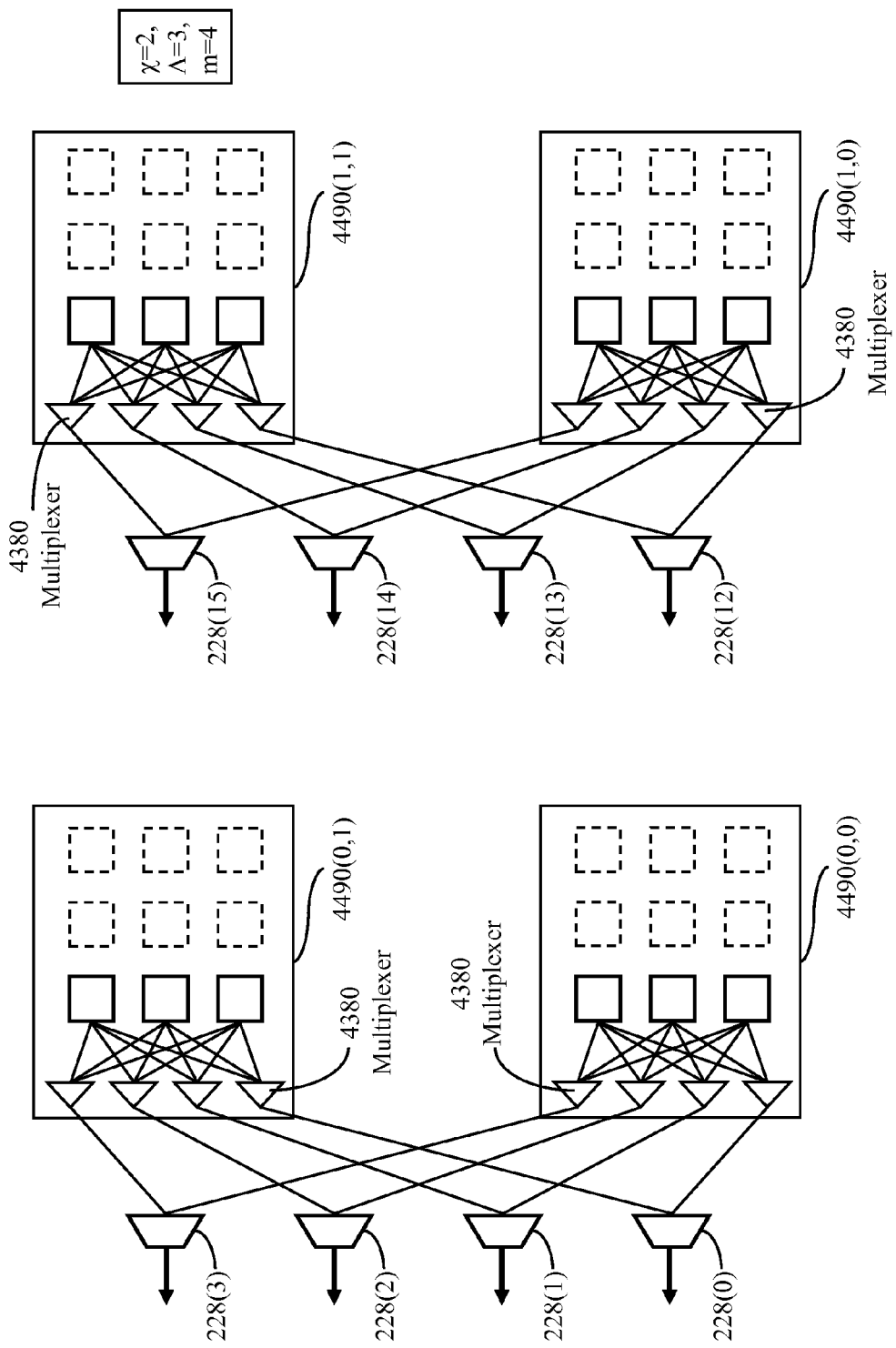
Figure 47:
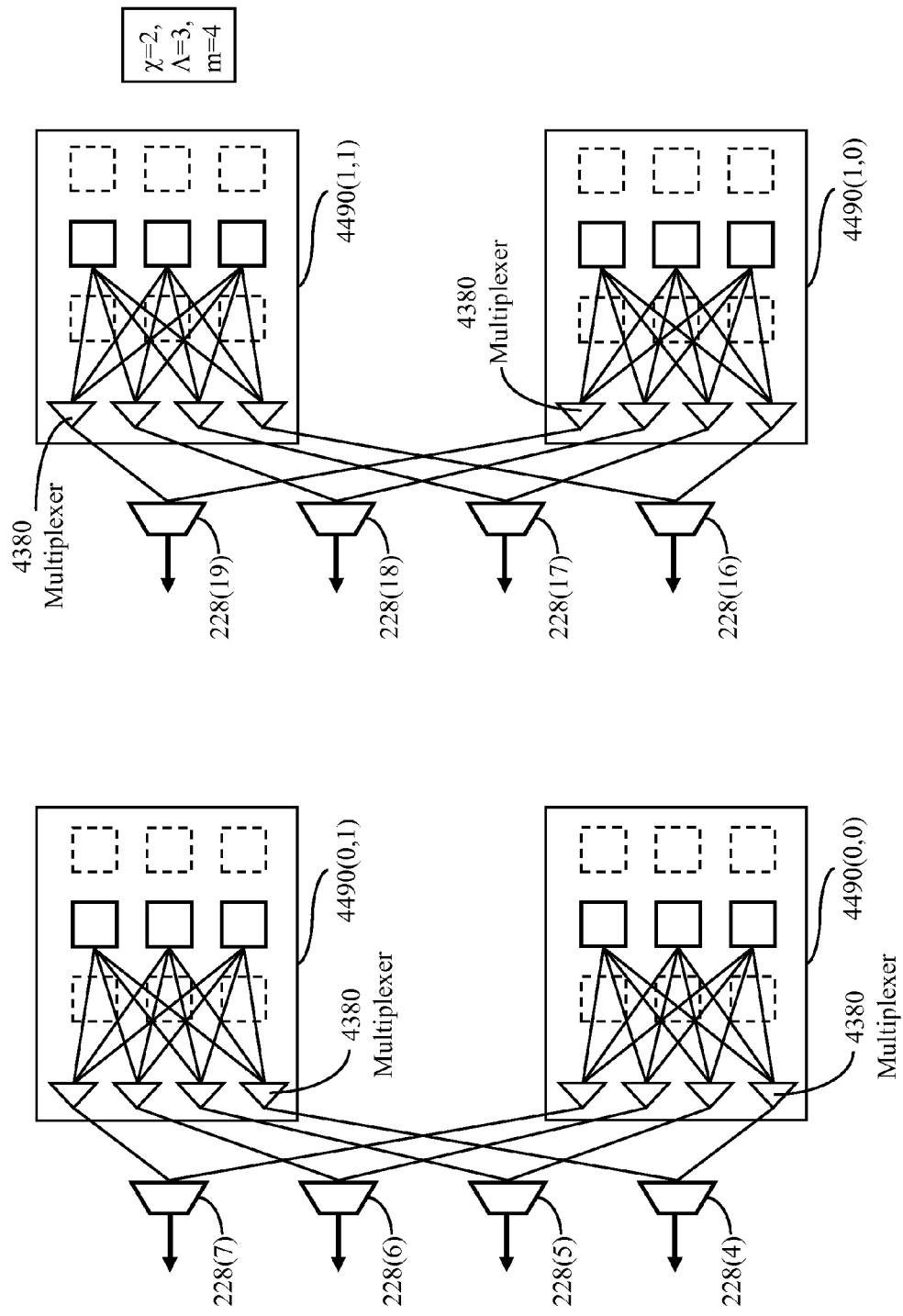
Figure 48:
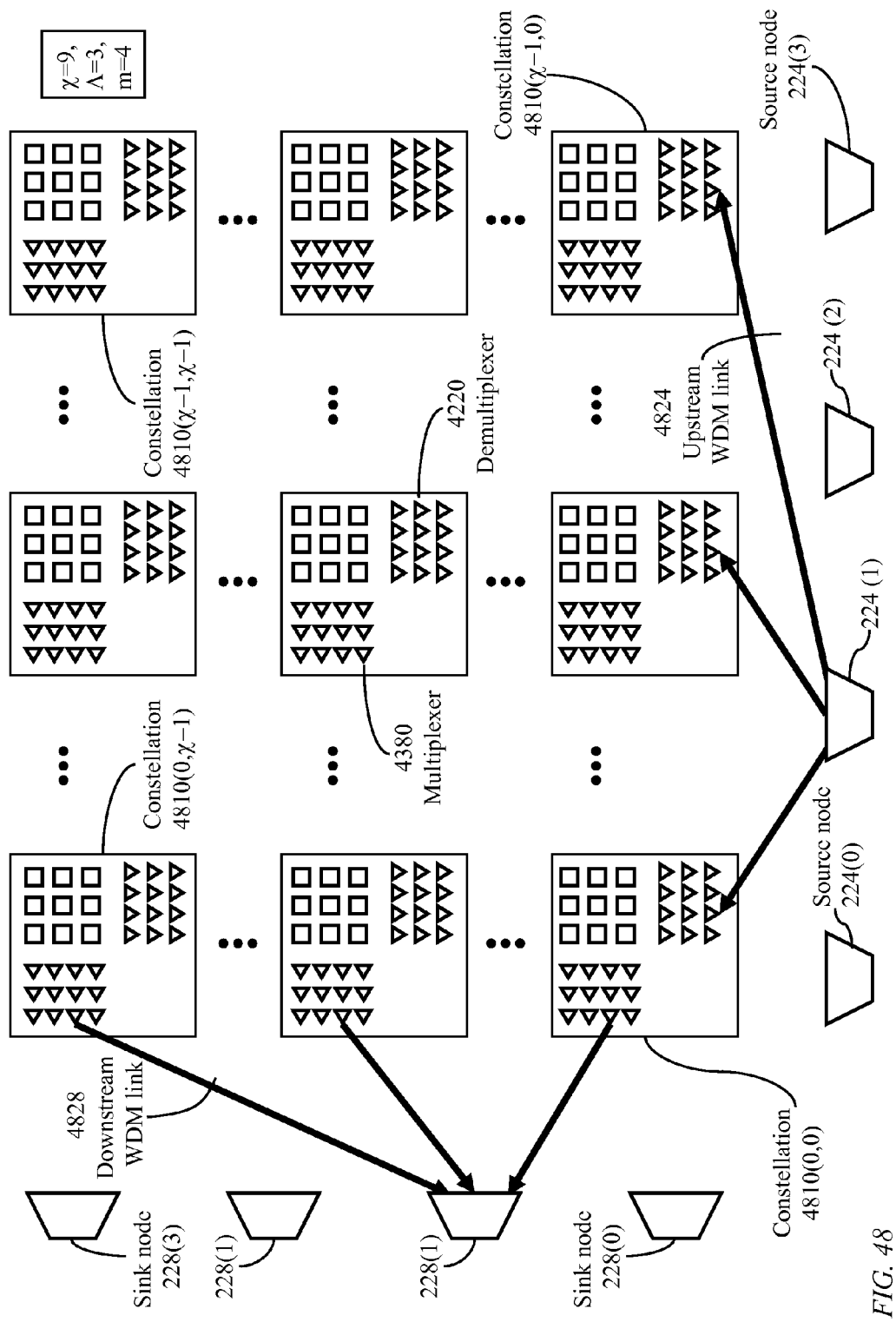
Figure 49:
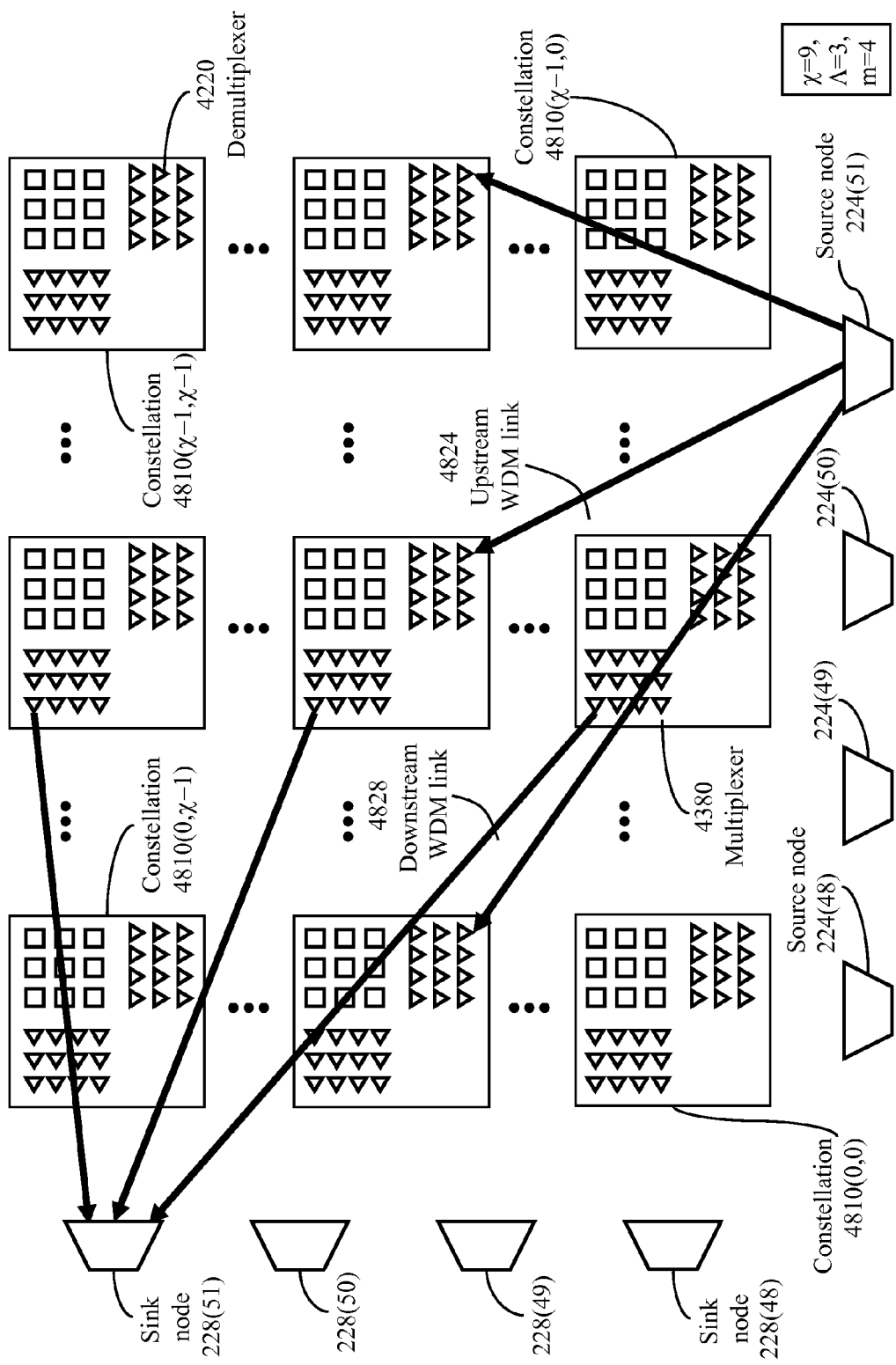
Figure 50:
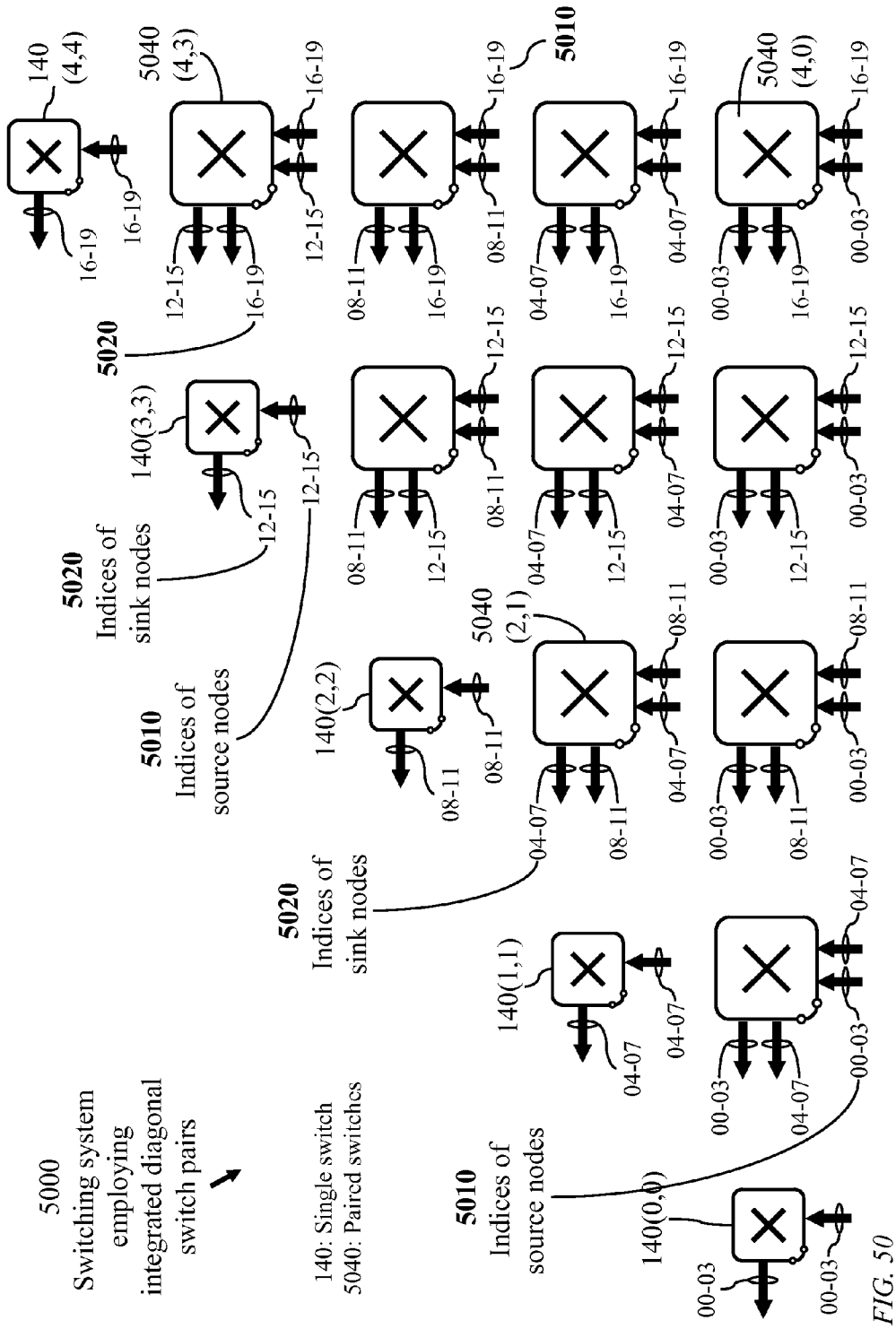

Each of FIG. 36, FIG. 37, and FIG. 38 illustrate upstream connections from edge nodes to switches through an assembly of upstream spectral routers;

FIG. 39, FIG. 40, and FIG. 41 illustrates downstream connections from switches to edge nodes through an assembly of downstream spectral routers;

FIG. 42 illustrates a constellation of collocated switches indicating collocated spectral demultiplexers, each spectral demultiplexer separating spectral bands from a WDM link originating from a respective edge node;

FIG. 43 illustrates collocated spectral multiplexers coupled to the constellation of collocated switches of FIG. 42, each spectral multiplexer combining spectral bands onto a WDM link directed to a respective edge node;

FIG. 44 and FIG. 45 illustrate upstream connections of edge nodes to constellations of switches to eliminate the need for intermediate upstream spectral routers;

FIG. 46 and FIG. 47 illustrate downstream connections of edge nodes to constellations of switches to eliminate the need for intermediate downstream spectral routers;

FIG. 48 and FIG. 49 illustrate connecting edge nodes (source nodes and sink nodes) to constellations of switches of a network of global coverage, in accordance with an embodiment of the present invention; and FIG. 50 illustrates a switching system based on the matrix of switches of FIG. 1 where the two switches of each diagonal pair of switches are integrated to share a common switching mechanism, in accordance with an embodiment of the present invention.

TERMINOLOGY

Terms used in the present application are defined below.

Edge node (access node): A switching device connecting to data sources and data sinks, and configured to transfer data from the data sources to another switching device and transfer data from another switching device to the data sinks is referenced as an edge node or access node.

Switch: A switch comprises a switching mechanism for transferring data from a set of input ports to a set of output ports. In the switching system of the present application, a switch transfer data from one set of edge nodes (access nodes) connecting to input ports of the switch to another set, or the same set, of edge nodes connecting to output ports of the switch. A switch may use an electronic or a photonic switching mechanism.

Collocation: The term refers to spatial proximity of devices which may be interconnected using relatively short links, such as fiber links each carrying a single spectral band.

Dimension of a switch: The number of input ports and output ports, excluding ports used exclusively for control purposes, defines a "dimension" of a switch.

Global network: A network comprising a large number of nodes covering a wide geographical area is traditionally referenced as a global network.

Switching-system coverage: In a switching system configured as a network comprising geographically distributed access nodes (edge nodes), the term "coverage" refers to the number of access nodes.

Spectral multiplexer: A spectral multiplexer combines spectral bands of separate input channels onto an output wavelength-division-multiplexed link (WDM link), the input channels which originate from different switches.

Spectral demultiplexer: A spectral demultiplexer directs individual spectral bands of an input WDM link to separate output channels which may terminate onto different switches.

Diagonal pair of switches: In a switching system employing a plurality of switches logically arranged in a matrix of switches having a number of columns and a same number of rows, a diagonal pair of switches comprises a switch of column j and row k and a switch of column k and row j, j≠k, the columns being indexed as 0 to ($\mu$−1) and the rows being indexed as 0 to ($\mu$−1), $\mu$ being the number of columns. A switch of a column and a row of the same index is referenced as a "diagonal switch".

Complementary pair of switches: In a switching system employing a plurality of switches interconnecting a number of edge nodes, a complementary pair of switches comprises a first switch, transferring data from a first set of edge nodes to a second set of edge nodes, and a second switch transferring data from the second set of edge nodes to the first set of edge nodes. The complementary pair of switches may share a common controller or a dual controller comprising a first controller coupled to the first switch and a second controller coupled to the second switch where the two controllers are communicatively coupled to enable transferring control data from the first controller to the first set of edge nodes and control data from the second controller to the second set of edge nodes. Herein, the two switches, and respective controller(s), of a complementary pair of switches are considered to be collocated.

Constellation of switches: A number of collocated switches form a constellation.

Diagonal constellation pair: In a switching system employing a plurality of switches arranged into a matrix of constellations of collated switches having a number of $\chi$ columns and $\chi$ rows, $\chi>1$, a diagonal pair of constellations comprises a constellation of column j and row k and a constellation of column k and row j, j≠k, the columns being indexed as 0 to ($\chi-1$) and the rows being indexed as 0 to ($\chi-1$).

Diagonal pair of rotators: In a switching system employing a plurality of rotators logically arranged in a matrix rotators having a number of columns and a same number of rows, a diagonal pair of rotators comprises a rotator of column j and row k and a rotator of column k and row j, j≠k, the columns being indexed as 0 to ($\mu-1$) and the rows being indexed as 0 to ($\mu-1$), $\mu$ being the number of columns. A rotator of a column and a row of the same index is referenced as a "diagonal rotator".

Complementary pair of rotators: In a switching system employing a plurality of rotators interconnecting a number of edge nodes, a complementary pair of rotators comprises a first rotator, transferring data from a first set of edge nodes to a second set of edge nodes, and a second rotator transferring data from the second set of edge nodes to the first set of edge nodes.

Processor: The term "processor" as used in the specification of the present application, refers to a hardware processor, or an assembly of hardware processors, having at least one memory device.

Controller: The term "controller", as used in the specification of the present application, is a hardware entity comprising at least one processor and at least one memory device storing software instructions. Any controller type, such as a "node controller", "switch controller", "domain controller", "network controller", or "central controller" is a hardware entity.

Node controller: Each node, whether an ordinary node or a principal node, has a node controller for scheduling and establishing paths from input ports to output ports of the node.

Software instructions: The term refers to processor-executable instructions which may be applied to cause a processor to perform specific functions.

Configuring a controller: The term refers to an action of installing appropriate software for a specific function.

Cross connector: The term is used herein to refer to a device having multiple input ports and multiple output ports where each input port cyclically connects to each output port during a repetitive time frame.

Channel: A directional channel is a communication path from a transmitter to a receiver. A dual channel between a first port having a transmitter and a receiver and a second port having a transmitter and a receiver comprises a directional channel from the transmitter of the first port to the receiver of the second port and a directional channel from the transmitter of the second port to the receiver of the first port. A channel may occupy a spectral band in a wavelength division multiplexed (WDM) link.

Link: A link is a transmission medium from a first node to a second node. A link contains at least one channel, each channel connecting a port of the first node to a port of the second node. A directional link may contain directional channels from ports of the first node to ports of the second node, or vice versa. A dual link comprises two directional links of opposite directions.

WDM link: A number of channels occupying different spectral bands of an electromagnetic transmission medium form a wavelength-division-multiplexed link (a WDM link).

Spectral router: A spectral router (also called "wavelength router") is a passive device connecting a number of input WDM links to a number of output WDM links where each output WDM link carries a spectral band from each input WDM link.

Processor-executable instructions causing respective processors to route data through the switching system may be stored in a processor-readable media such as floppy disks, hard disks, optical disks, Flash ROMS, non-volatile ROM, and RAM. A variety of processors, such as microprocessors, digital signal processors, and gate arrays, may be employed.

A reference numeral may individually or collectively refer to items of a same type. A reference numeral may further be indexed to distinguish individual items of a same type.

DETAILED DESCRIPTION

FIG. 1 illustrates switches 140 logically arranged in a matrix of switches having $\mu$ columns and $\mu$ rows, $\mu>2$. The switches are individually identified as 140$(j,k)$, $0 \le j < \mu$, $0 \le k < \mu$, where j and k are indices of a column and a row, respectively, of the matrix of switches. In the exemplary arrangement of FIG. 1, $\mu=5$. Each switch 140 connects to respective input channels 112 and respective output channels 114.

Figure 2:
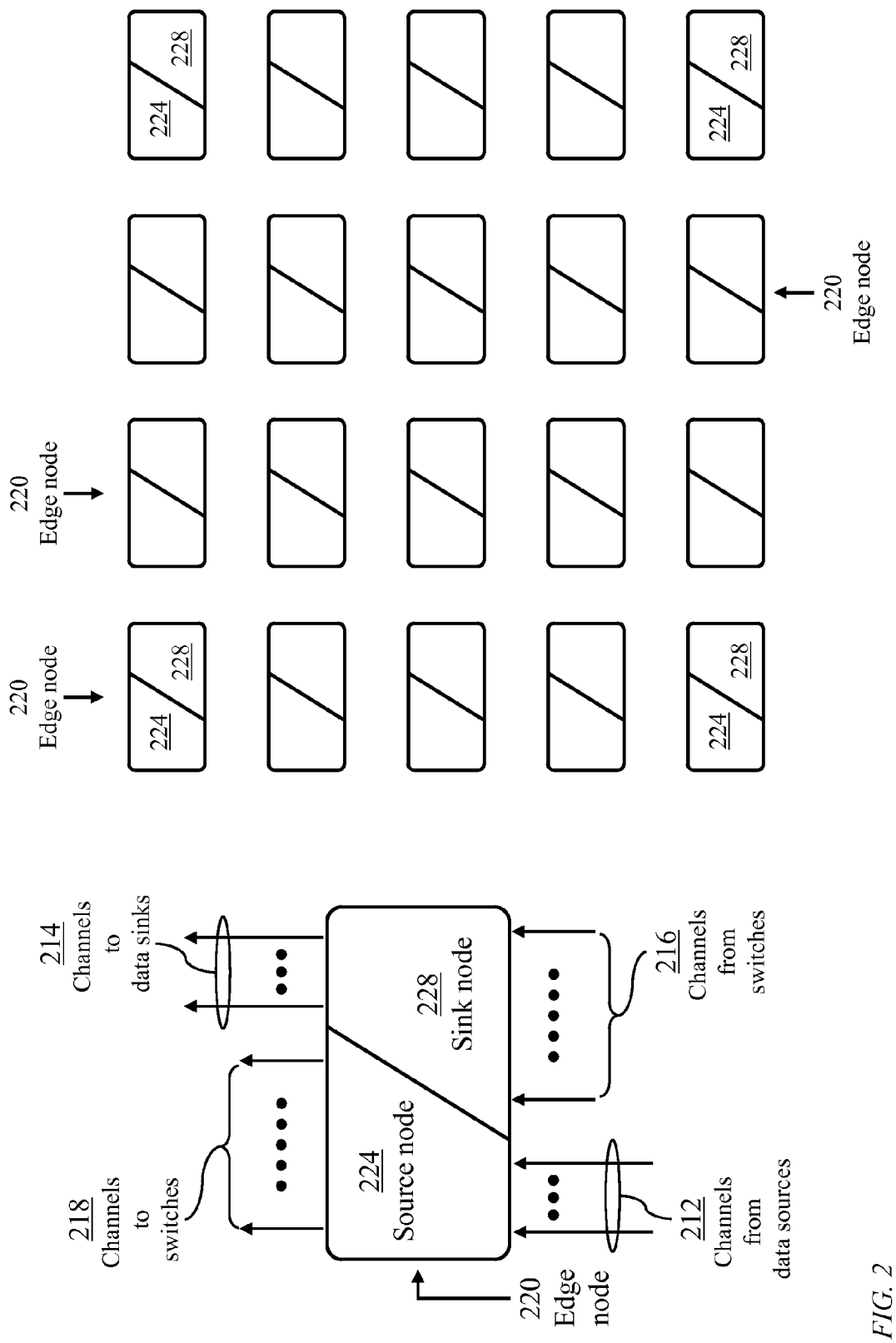
FIG. 2 illustrates a plurality of edge nodes interconnected through switches of the matrix of switches of FIG. 1.

FIG. 2 illustrates edge nodes 220 which may be interconnected through the matrix of switches of FIG. 1. Each edge node 220 comprises a source node 224 and a sink node 228. Each edge node 220 (source node 224) connects to an upstream channel 230 to each switch 140 of a selected set switches. Each edge node 220 (sink node 228) connects to a downstream channel 240 from each switch 140 of another selected set selected switches. A source node 224 (edge node 220) receives data from data sources through a number of channels 212. A sink node 228 (edge node 220) transmits data from data sinks through a number of channels 214. Each edge node 220 comprises a respective edge-node controller (not illustrated) configured to communicate with controllers of switching nodes or other switching-system components. The edge controller is a hardware entity which employs at least one hardware processor, memory devices storing software instructions, and memory devices storing control data such as routing-related data.

Figure 3:
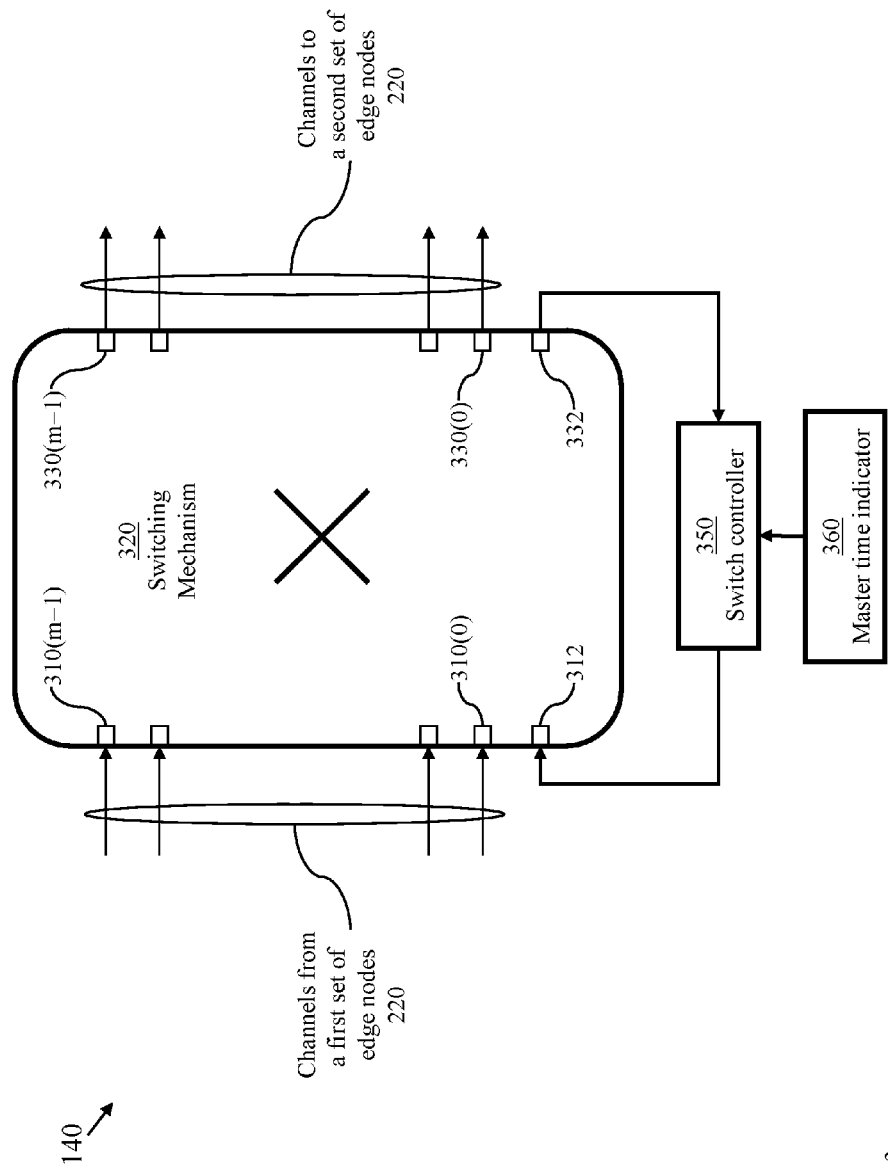
FIG. 3 illustrates a switch of the matrix of switches of FIG. 1.

FIG. 3 illustrates a switch 140 comprising a number m of input ports 310, a control inlet 312, a number m of output ports 330, and a control outlet 332. The m input ports are individually identified as input ports 310(0), 310(1), ..., 310(m−1), m>2. The m output ports are individually identified as output ports 330(0), 330(1), ..., 330(m−1). A switching mechanism 320 selectively transfers data from the input ports and the control inlet to the output ports and the control outlet. A switch controller 350 receives control data from the input ports 310 through the switching mechanism and control outlet 332. The switch controller 350 transmits control data to the output ports 310 through control inlet 312 and the switching mechanism. A master time indicator 360 provides reference time to the switch controller. The switch controller 350 is a hardware entity comprising at least one hardware processor and a storage medium holding software instructions which cause the at least one hardware processor to implement routing and time alignment functions.

Growth of the Switching System

With the matrix of switches containing $\mu^2$ switches 140 arranged into $\mu$ columns and $\mu$ rows, each switch having m dual ports (m input ports and m output ports), in addition to control inlets and outlets, the maximum number of edge nodes 220 supported by the switching system would be limited to μ×m. To increase the number of edge nodes 220, the dimension of each switch, i.e., number m of dual ports, may be increased, the number of switches may be increased, or both the dimension of each switch and the number of switches may be increased, In a first growth scheme, illustrated in FIG. 4 to FIG. 11, the dimension of each switch is kept unchanged and growth is realized by adding a column and a row of switches 140. Thus, with a current switching system employing $\mu^2$ switches, (2×μ+1) switches are added to increase the number of edge nodes from μ×m to (μ×m+m). Each edge node 220 would then have (μ+1) channels 218 to switches of a row of the matrix of switches and (μ+1) channels 216 from switches of a column of the matrix of switches. The edge nodes may be indexed sequentially so that edge nodes connecting to a row of index q and a column of index q, $0 \leq q \leq \mu$, are indexed as (j+m×q), $0 \leq j < m$. Thus, the index of an edge node remains unchanged as the switching system grows to accommodate more edge nodes.

In a second growth scheme, illustrated in FIG. 13 to FIG. 18, each edge node 220 has a fixed number μ of channels 218 to switches of a row of the matrix of switches and the same number μ of channels 216 from switches of a column of the matrix of switches. Thus, with the number $\mu^2$ of switches is unchanged. Growth is realized by adding a dual port (an input port and an output port) in each switch to increase the number of edge nodes from μ×m to (μ×m+μ). The edge nodes may be indexed sequentially so that edge nodes connecting to a row of index q and a column of index q, $0 \leq q < \mu$, are indexed as (q+μ×j), $0 \leq j < m$. Thus, the index of an edge node remains unchanged as the switching system grows to accommodate more edge nodes.

First Scheme of Switching-System Growth

Figure 4:
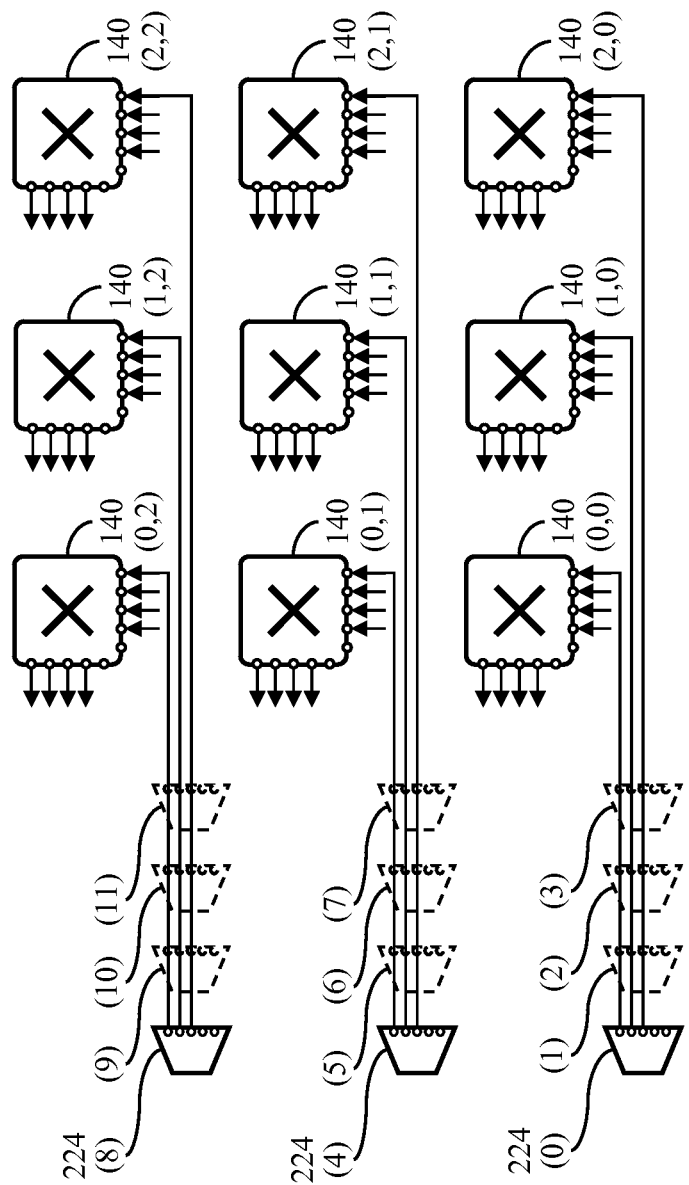
FIG. 4 illustrates connectivity of a set of source nodes connecting to switches of a sub-matrix of the matrix of switches of FIG. 1.

FIG. 4 illustrates a selected set of source nodes 224 (edge nodes 220) connecting to switches of a sub-matrix 420 of the matrix of switches of FIG. 1. The exemplary arrangement of switches of FIG. 1 comprises 25 switches arranged in five columns and five rows. A switching system may initially use switches of a sub-matrix of three columns and three rows (μ=3). Each source node 220 has an upstream channel 230 to each switch 140 of a row.

Figure 5:
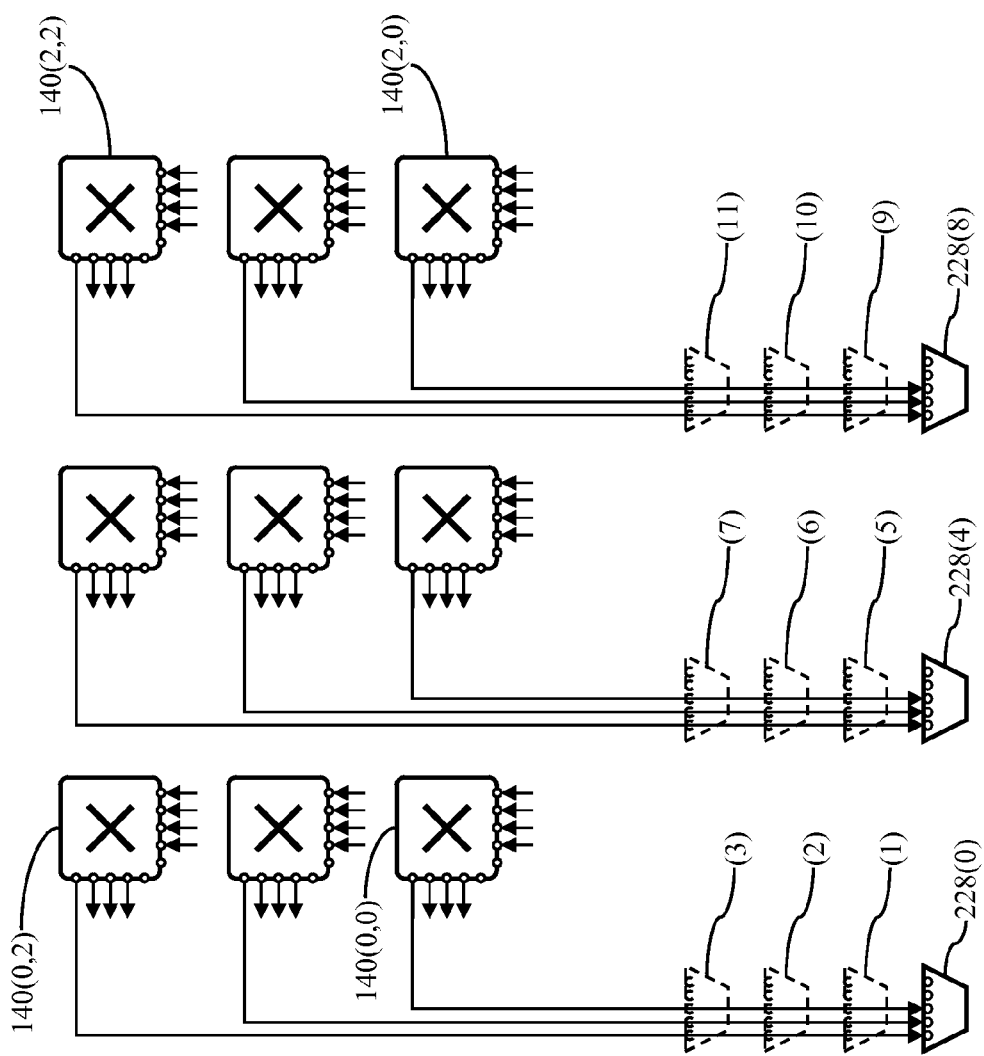
FIG. 5 illustrates connectivity of a set of sink nodes connecting to switches of the sub-matrix of FIG. 4 according to the first growth scheme, where each sink node is integrated with a respective source node to form an edge node.

FIG. 5 illustrates a selected set of sink nodes 228 (edge nodes 220) connecting to the switches of FIG. 4, where each sink node 228 has a downstream channel 240 from each switch 140 of a respective column. The connectivity patterns of FIG. 4 and FIG. 5 are similar to the connectivity pattern of FIG. 5 of U.S. Pat. No. 7,760,716. Each sink node may be integrated with a respective source node to form an edge node.

According to the connectivity patterns of FIG. 4 and FIG. 5, an edge node 220 (224/228) has an upstream channel 230 to a switch 140(j, k), and a downstream channel 240 from a switch 140(k, j), $0 \leq j < \mu$, $0 \leq k \leq \mu$.

Figure 6:
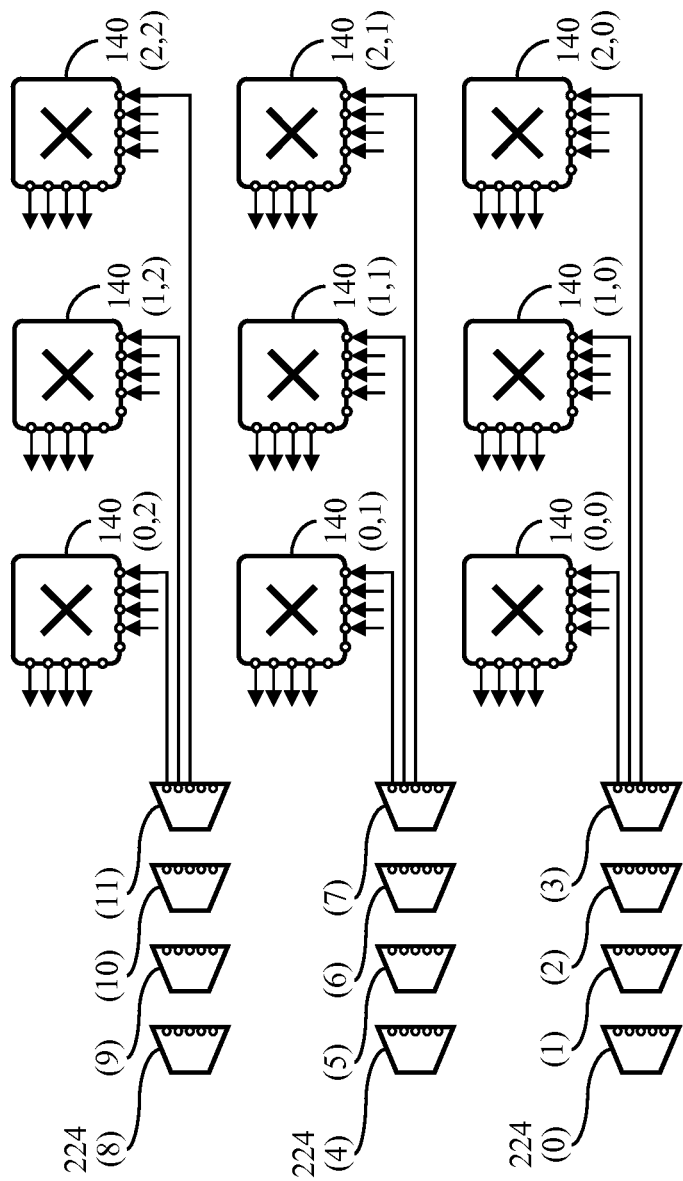
FIG. 6 illustrates connectivity of another set of source nodes connecting to switches of the sub-matrix of FIG. 4.

FIG. 6 illustrates another selected set of source nodes 224 connecting to switches 140 of sub-matrix 420 of switches of the matrix of FIG. 1.

Figure 7:
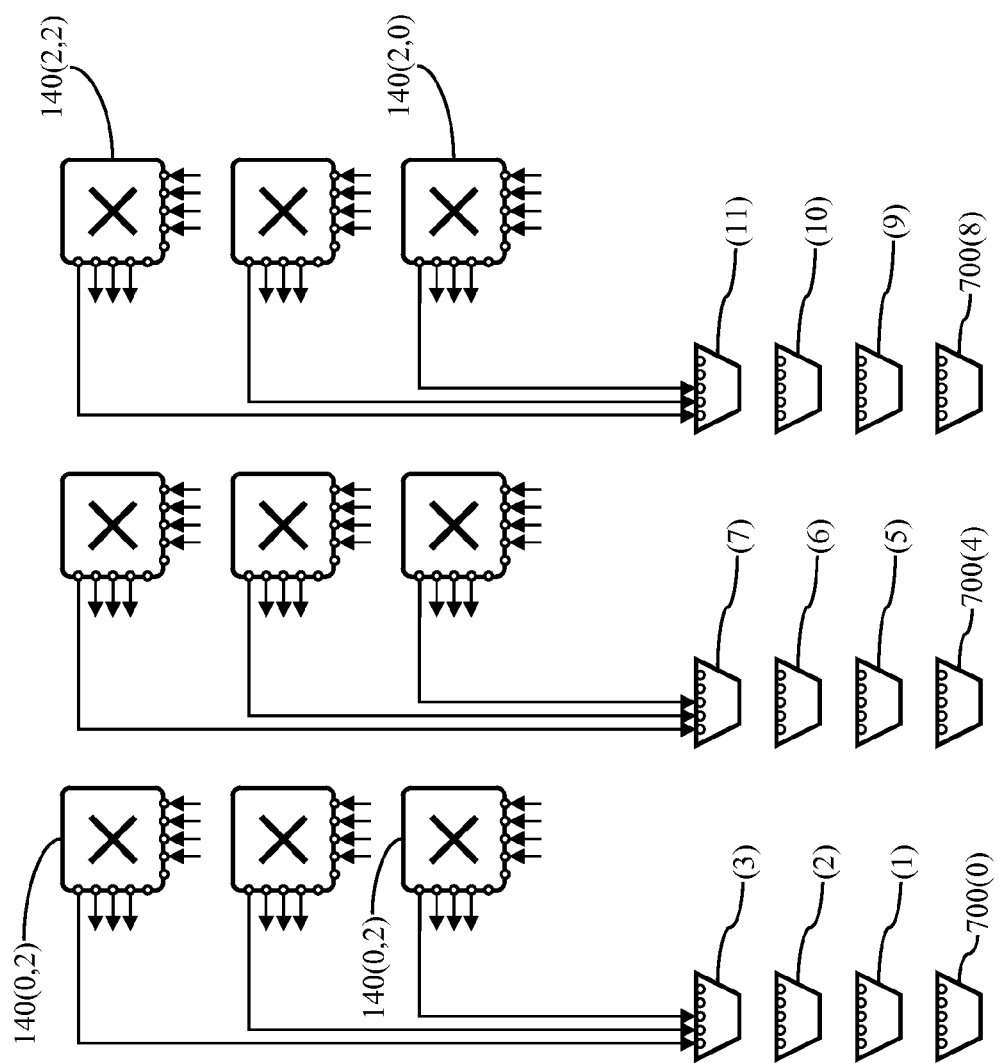
FIG. 7 illustrates connectivity of another set of sink nodes connecting to switches of the sub-matrix of FIG. 4.

FIG. 7 illustrates another selected set of sink nodes 228 connecting to the switches of FIG. 4, where each sink node 228 has a downstream channel 240 from each switch 140 of a respective column.

Figure 8:
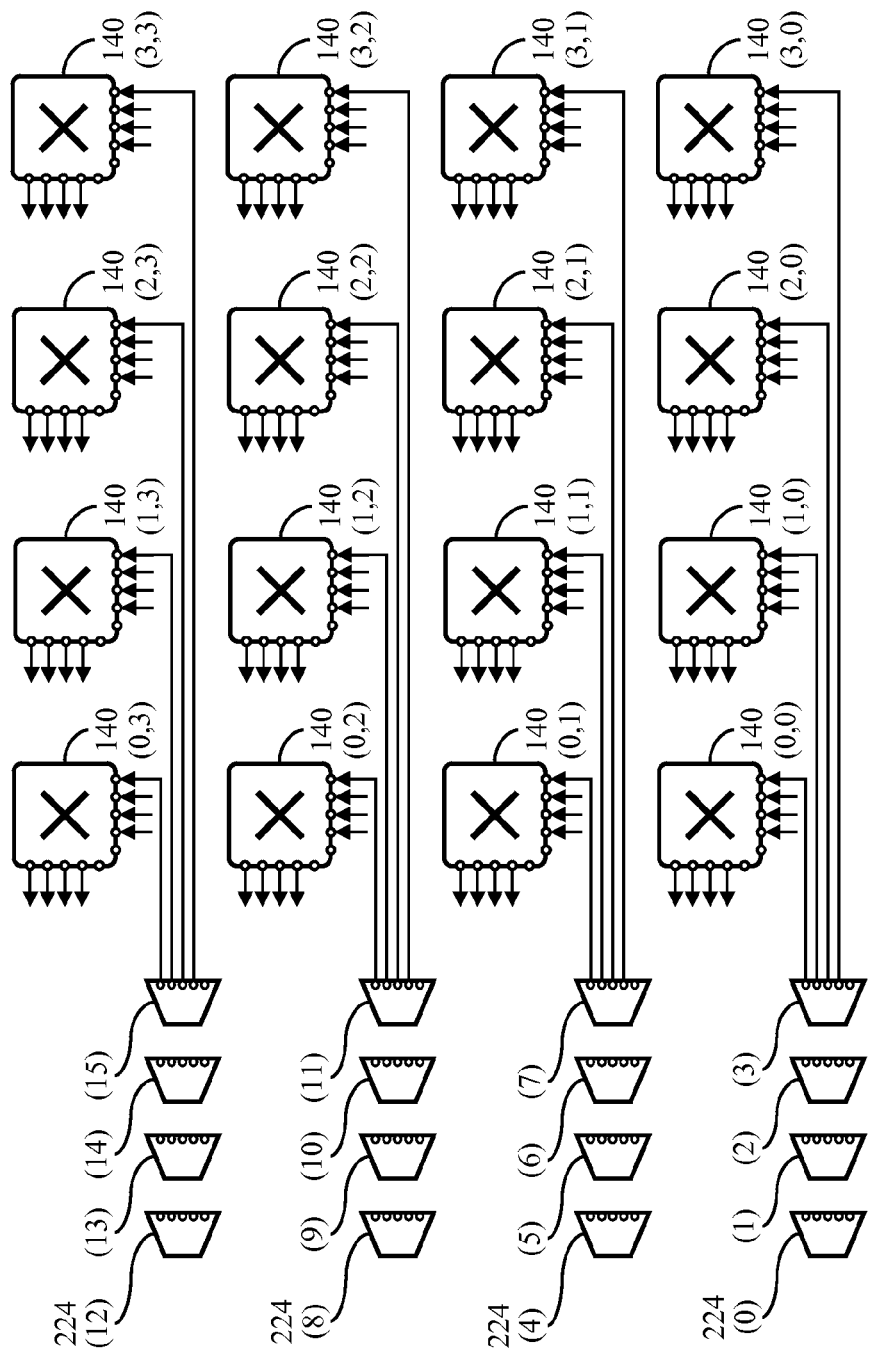
FIG. 8 and FIG. 9 illustrate an increased number of edge nodes (source nodes and sink nodes) connecting to switches of another sub-matrix of the matrix of switches of FIG. 1 according to the first growth scheme.
Figure 9:
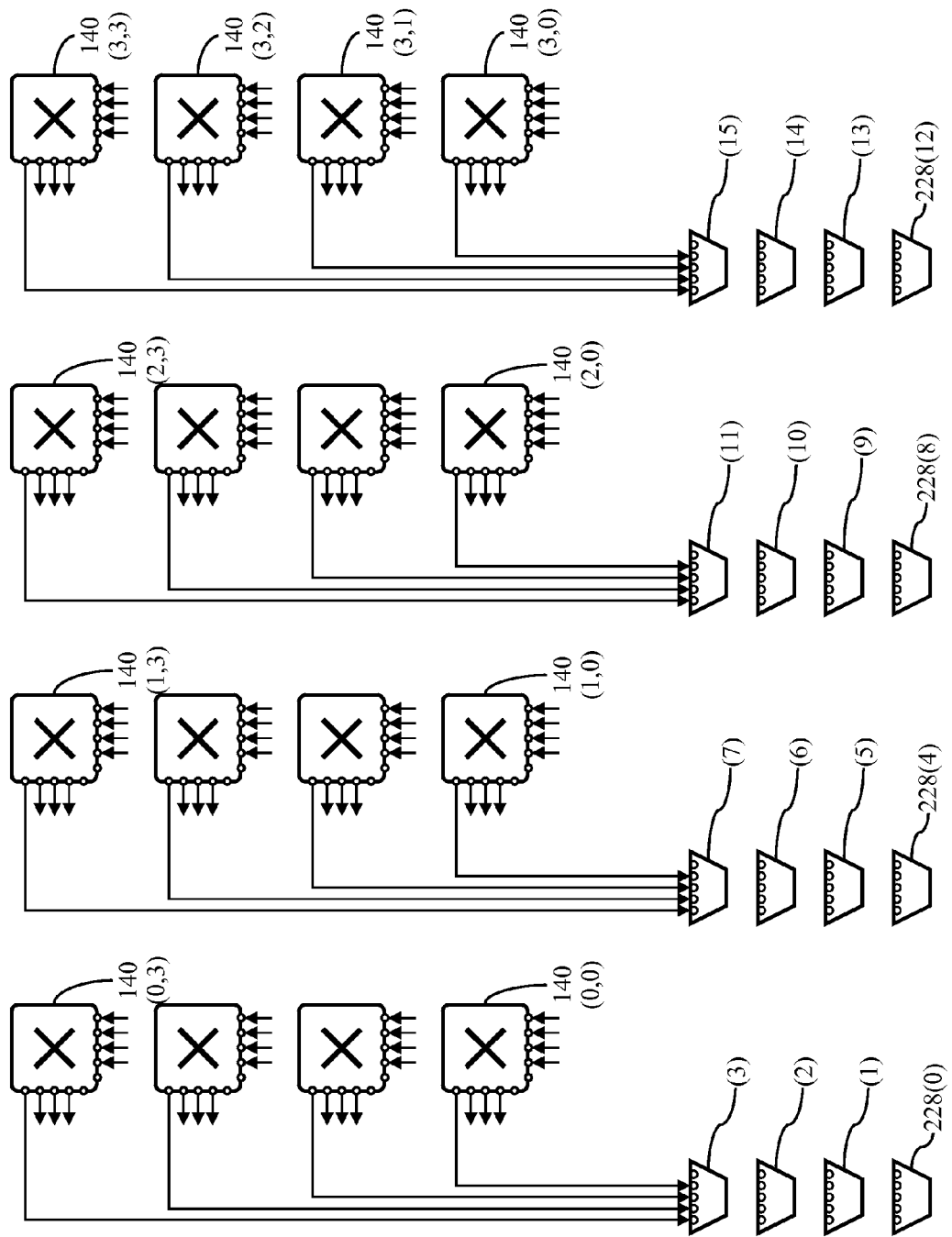

FIG. 8 and FIG. 9 illustrate growth of the switching system of FIG. 4 and FIG. 5, according to a first growth scheme, using switches of a sub-matrix 820 of four columns and four rows (μ=4). FIG. 8 illustrates source nodes 224 connecting to switches of a sub-matrix 820. FIG. 9 illustrates sink nodes 228 connecting to witches 140 of sub-matrix 820 of FIG. 8.

Figure 10:
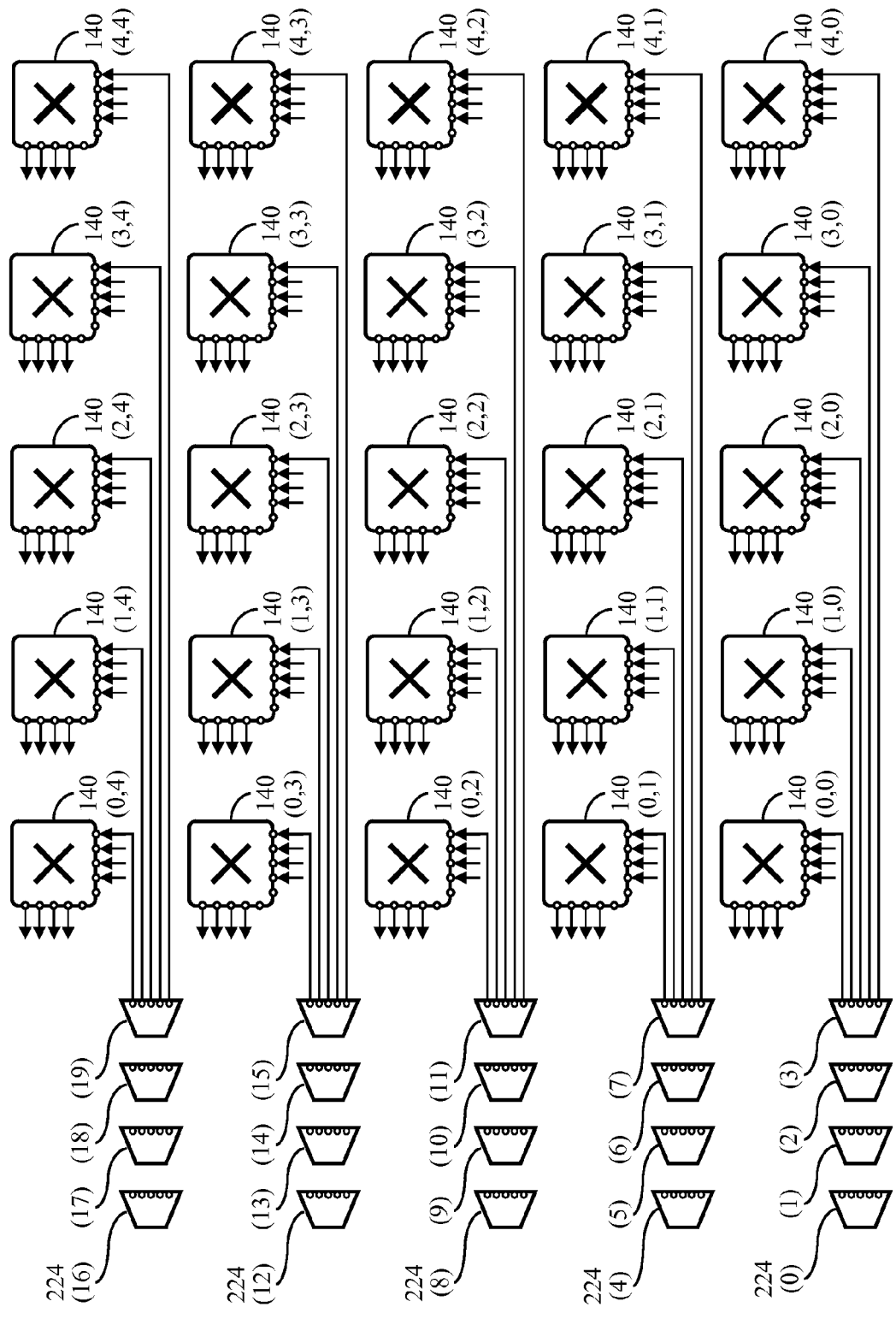
FIG. 10 and FIG. 11 illustrate further growth of the number of edge nodes (source nodes and sink nodes) connecting to the switches of the matrix of switches of FIG. 1 according to the first growth scheme.
Figure 11:
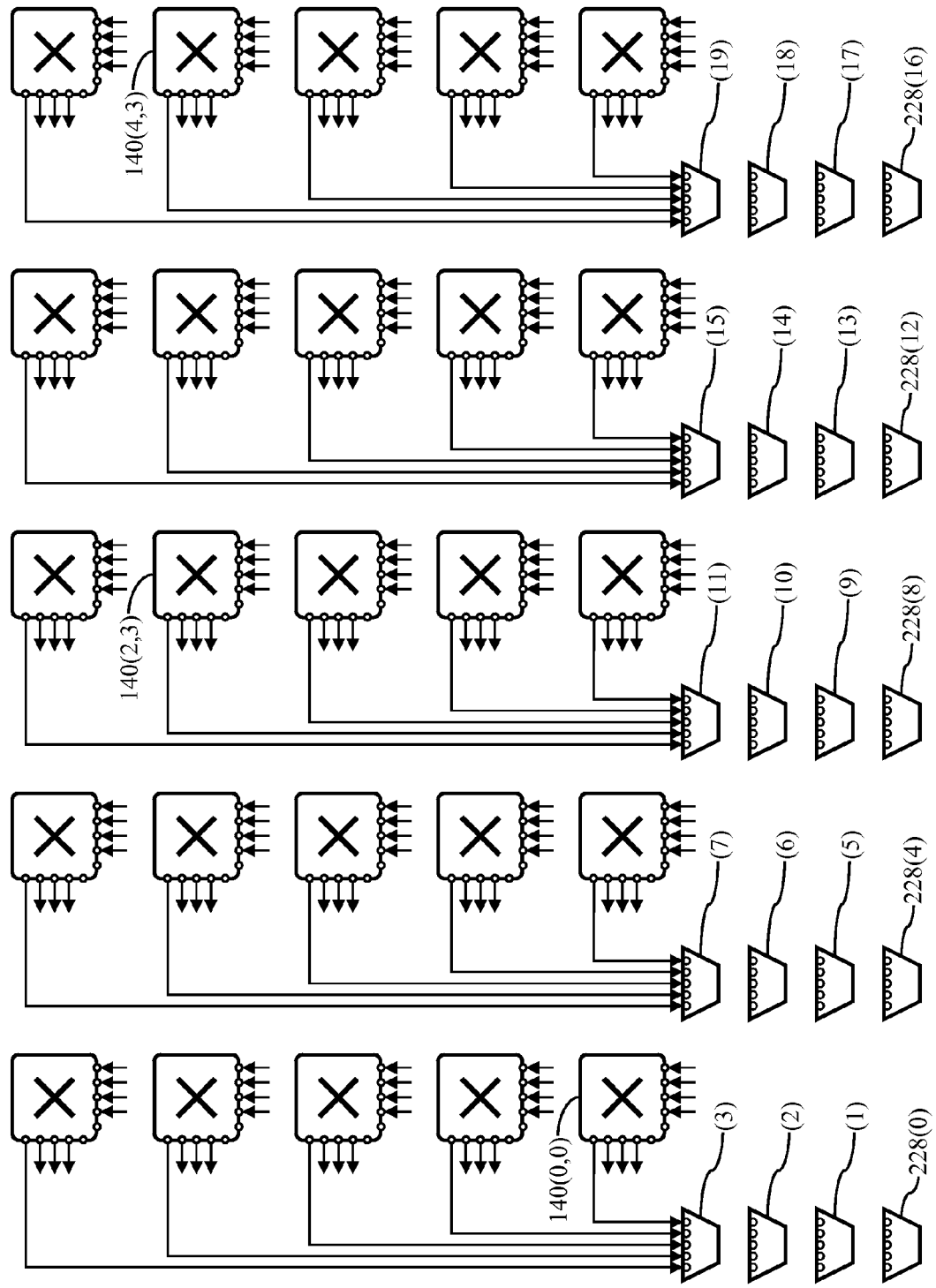

FIG. 10 and FIG. 11 illustrate further growth of the switching system of FIG. 8 and FIG. 9, according to the first growth scheme, to a switching system using all switches of the matrix of switches of FIG. 1 arranged in five columns and five rows (μ=5).

FIG. 4, FIG. 6, FIG. 8, and FIG. 10 illustrate upstream connectivity of source nodes to respective switches. FIG. 5, FIG. 7, FIG. 9, and FIG. 11 illustrate downstream connectivity of switches to respective sink nodes.

Second Scheme of Switching-System Growth

Figure 12:
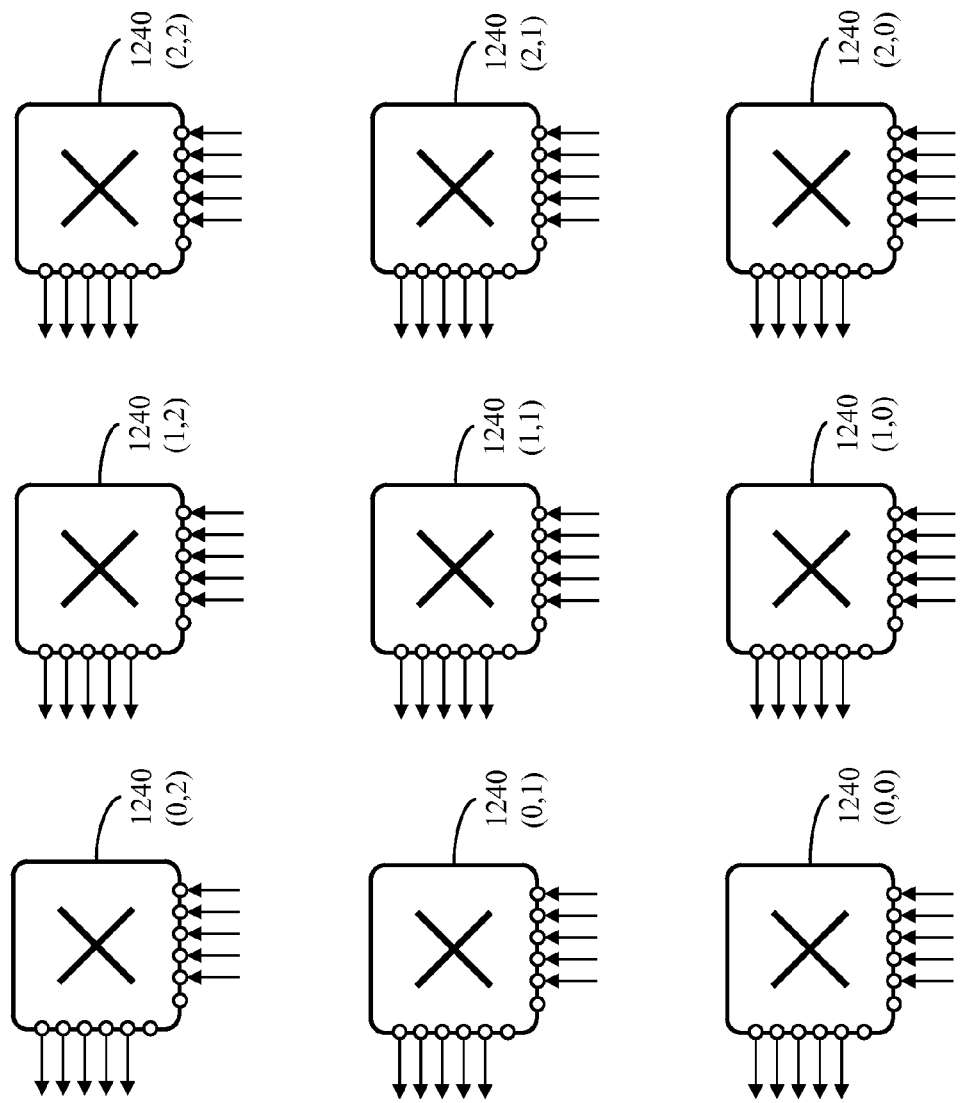
FIG. 12 illustrates switches logically arranged in a matrix of switches for use in illustrating switching-system growth according to a second growth scheme.

FIG. 12 illustrates switches 1240 arranged in a matrix of switches of according to a second growth scheme where the dimension of each switch 140 of the matrix 100 of switches may be increased to increase the coverage and capacity of the switching system. The number of supported edge nodes is μ×m, and the access capacity of the switching system is $\alpha \times \mu^2 \times m \times R$, where α, $0 \leq \alpha < 1.0$, is a design parameter and R is the capacity of each access channel; R=2–Gigabits/second, for example.

A switch 1240 is structurally similar to a switch 140. In the switching-system configurations of FIG. 4 to FIG. 11, the number m of dual ports 310/330 is kept unchanged (m=4) while the number μ of dual channels (upstream channels and downstream channels) connecting each edge node 220 to switches 140 is increased to grow the switching system according to the first growth scheme. In the switching-system configurations of FIG. 13 to FIG. 14, the number μ of dual channels connecting each edge node 220 to switches 1240 is kept unchanged (μ=3) while the number m of dual ports 310/330 is increased to grow the switching system according to the second growth scheme.

The switches 1240 of FIG. 12 are logically arranged in a matrix of switches having μ columns and μ rows, μ>2. The switches are individually identified as 1240(j,k), $0 \leq j < \mu$, $0 \leq k < \mu$, where j and k are indices of a column and a row, respectively, of the matrix of switches. In the exemplary arrangement of FIG. 12, μ=3. Each switch 1240 connects to respective input channels 1212 and respective output channels 1214. Each switch 1240 of the exemplary switch arrangement comprises five input ports, five output ports, one control inlet, and one control outlet.

Figure 13:
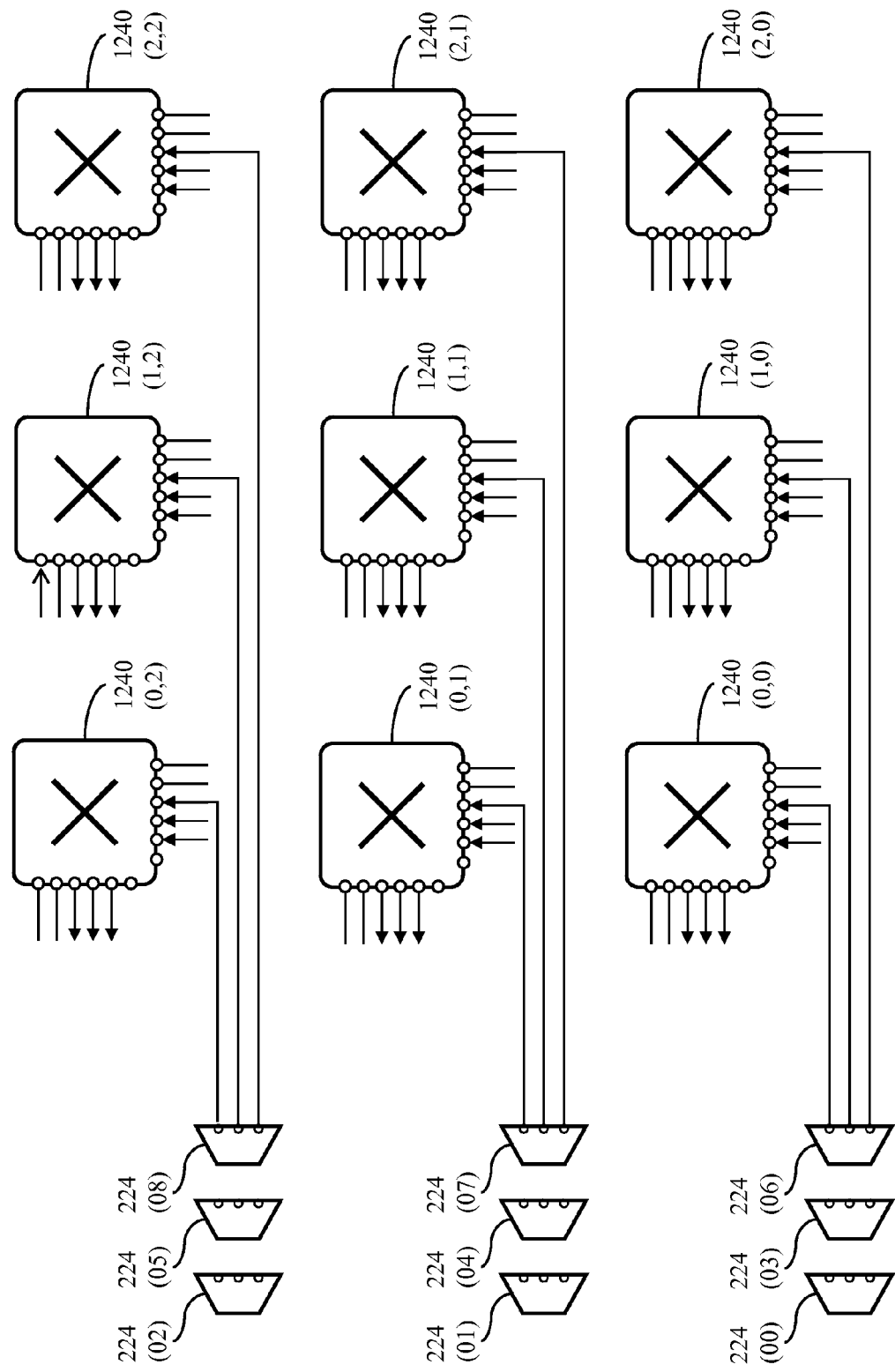
FIG. 13 and FIG. 14 illustrate edge nodes (source nodes and sink nodes) connecting to the switches of FIG. 12 for use in illustrating the second growth scheme.
Figure 14:
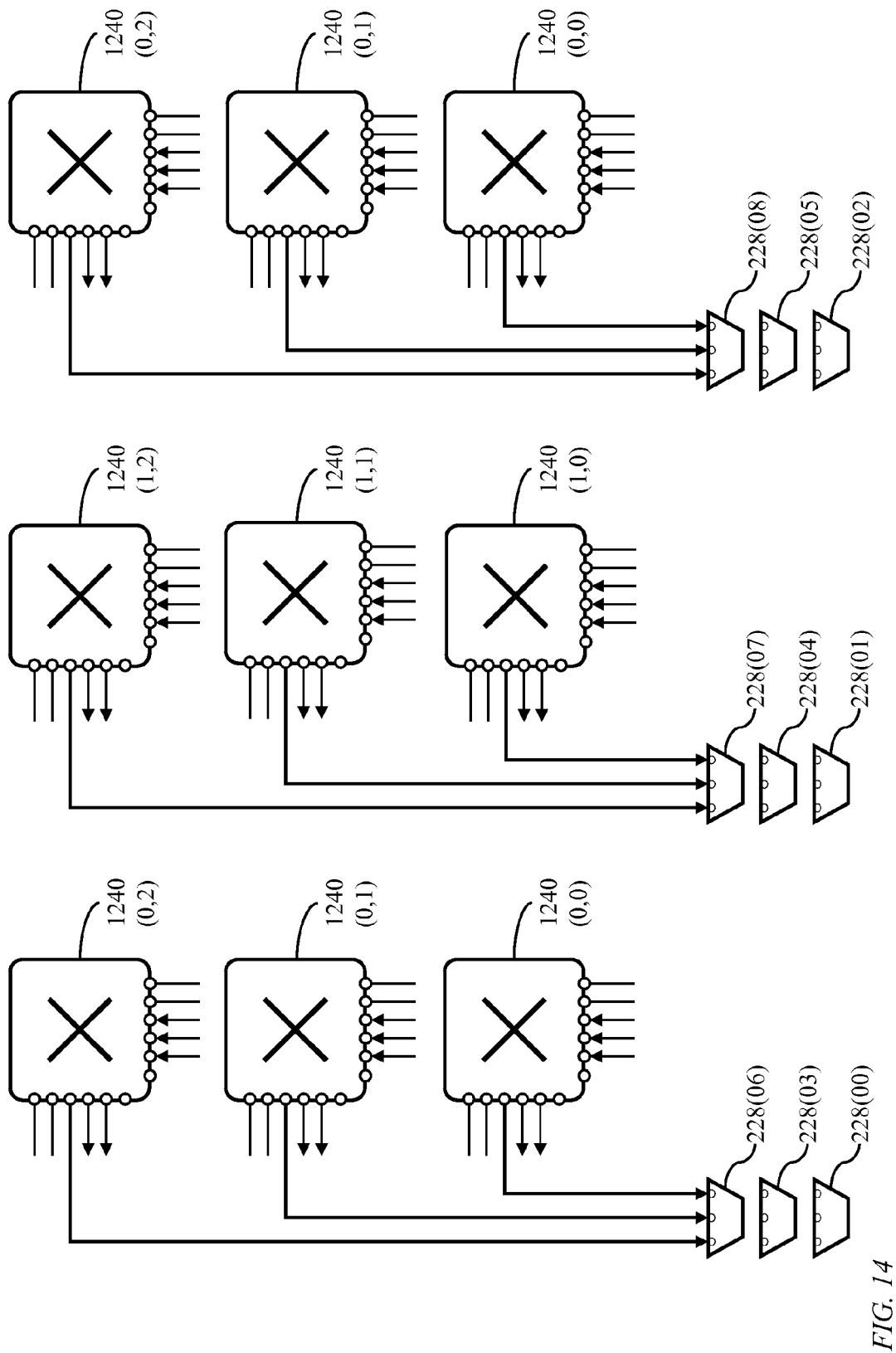

FIG. 13 and FIG. 14 illustrate source nodes 224 (edge nodes 220) connecting to the switches 1240 of FIG. 12 and sink nodes 228 (source nodes 220) connecting to the switches of FIG. 12, where each switch 1240 connects to three source nodes 224 and three sink nodes 228 (m=3).

Figure 15:
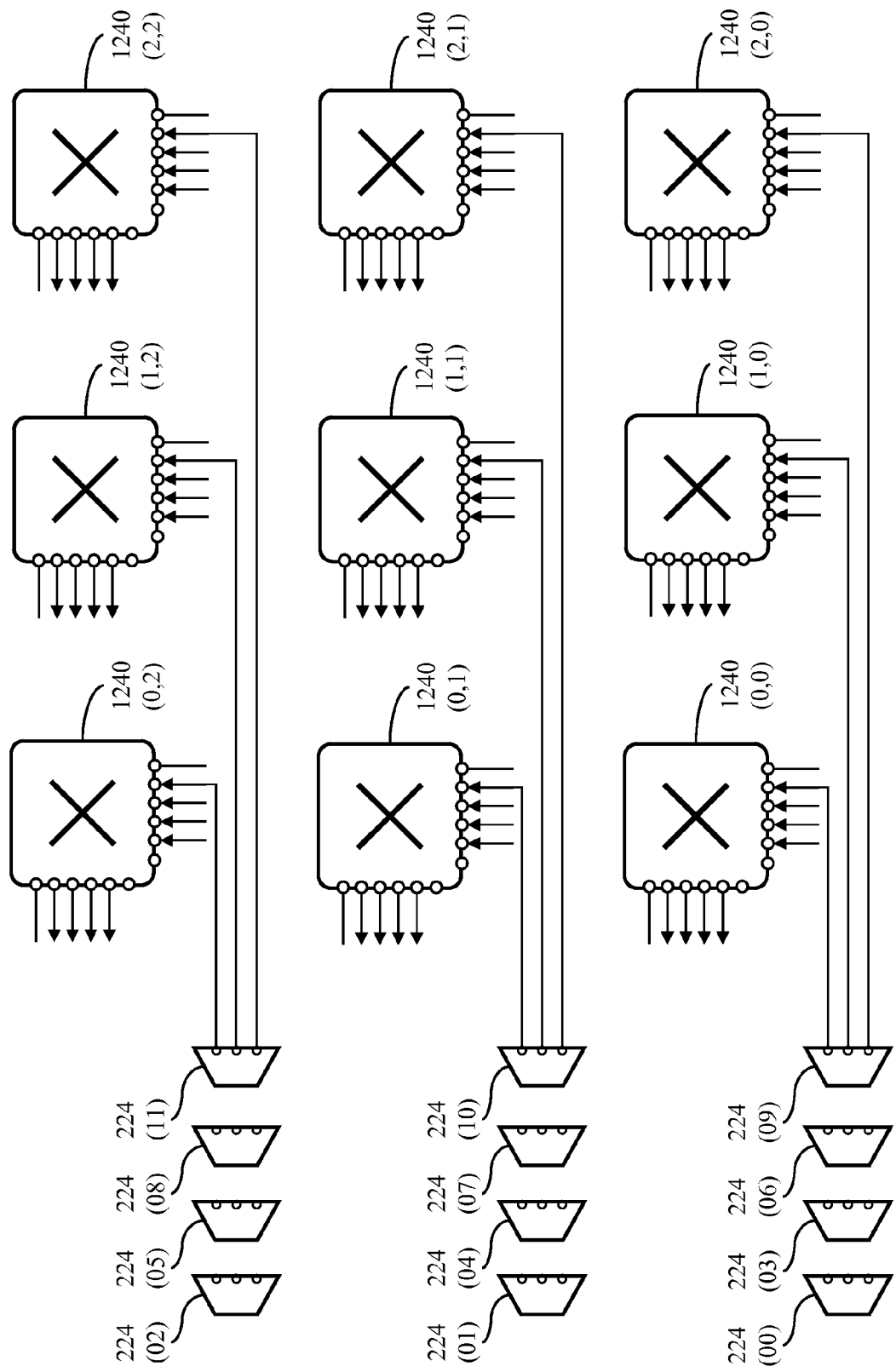
FIG. 15 and FIG. 16 illustrate a larger number of edge nodes (source nodes and sink nodes) connecting to the switches of FIG. 12 according to the second growth scheme.
Figure 16:
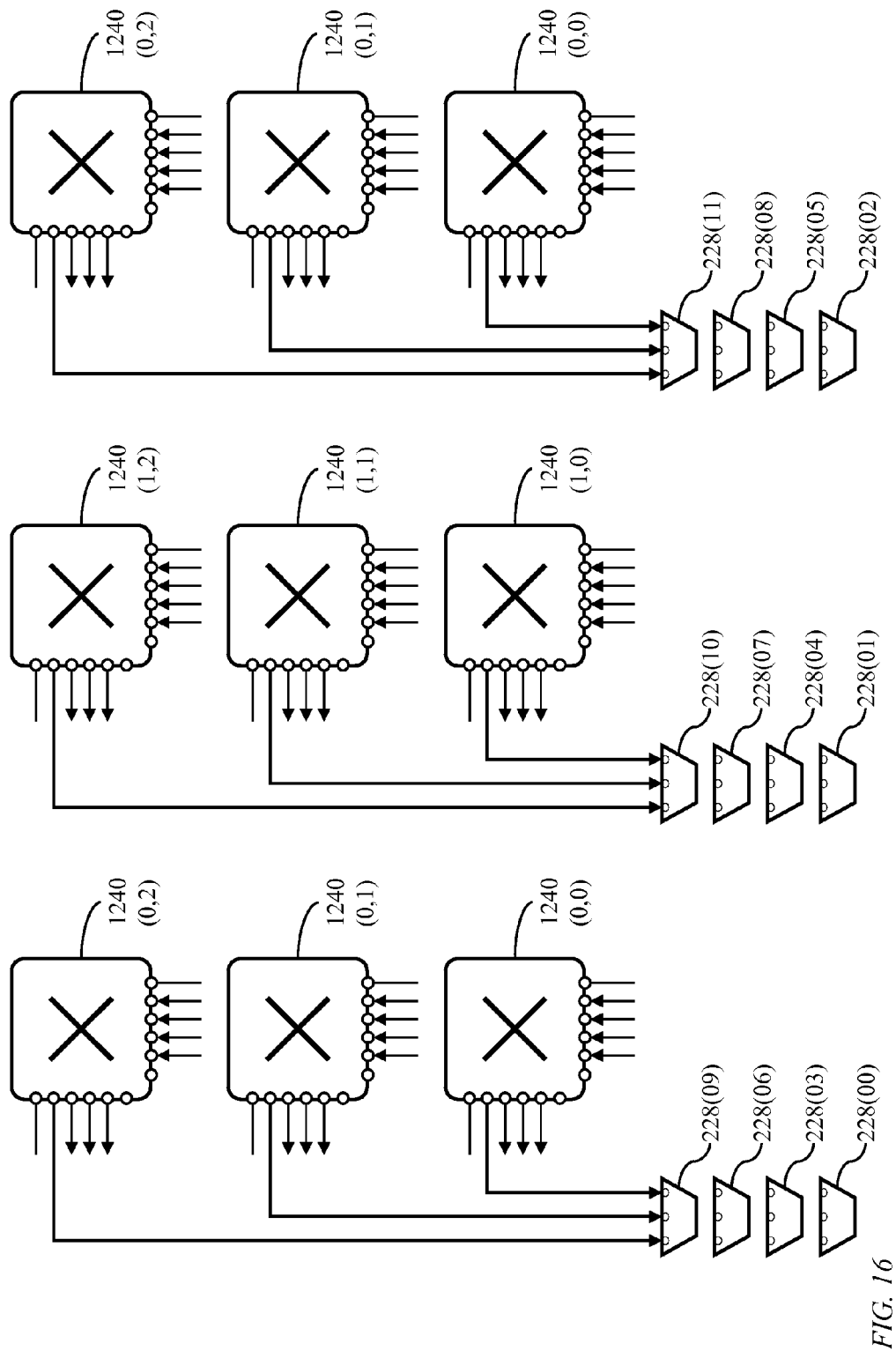

FIG. 15 and FIG. 16 illustrate growth of the switching system of FIG. 13 and FIG. 14, according to a second growth scheme, where each switch connects to four source nodes and four sink nodes (m=4). FIG. 15 illustrates source nodes 224 connecting to the switches 1240 of FIG. 12 and FIG. 16 illustrates sink nodes 228 connecting to the switches 1240 of FIG. 12.

Figure 17:
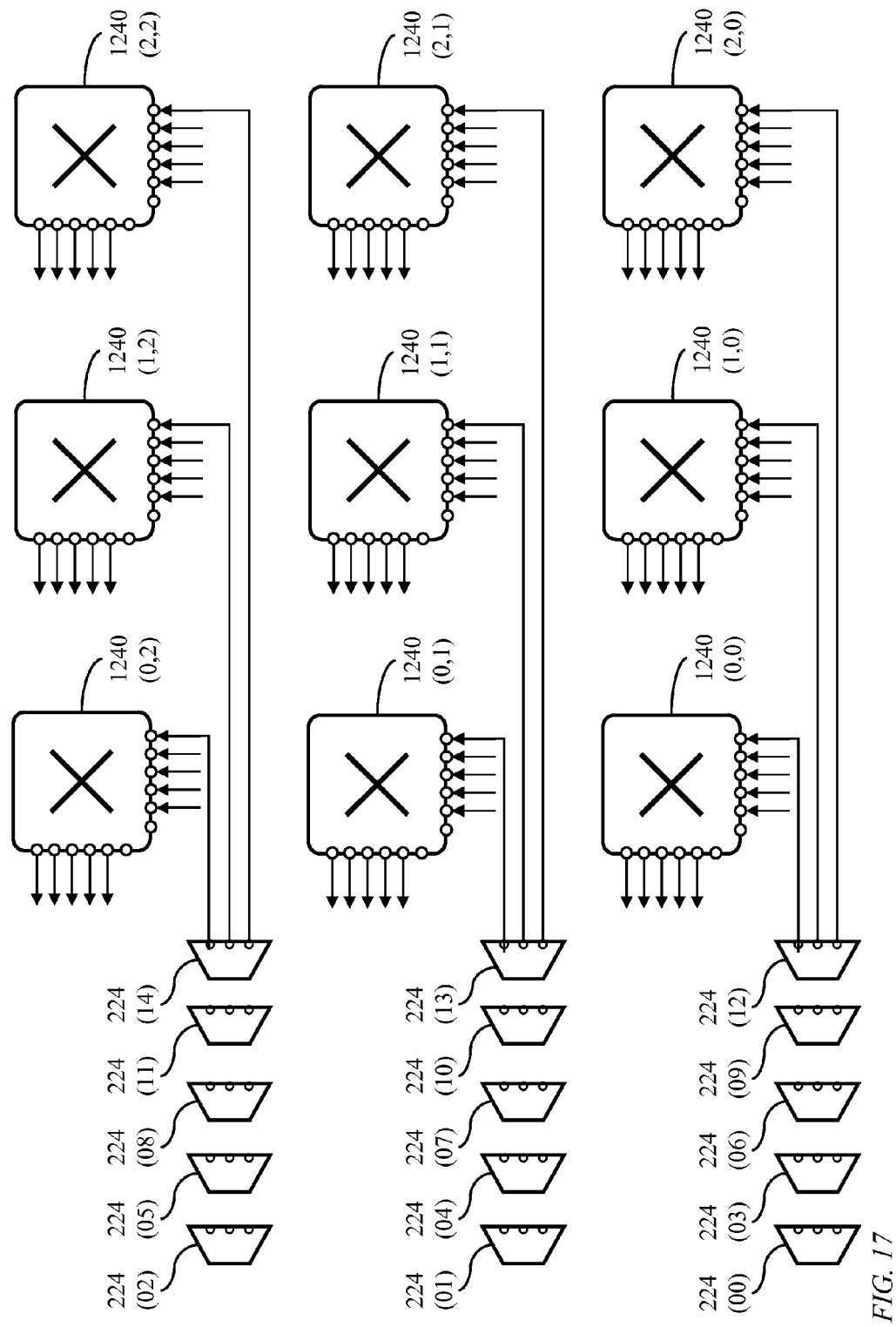
FIG. 17 and FIG. 18 illustrate further growth of the number of edge nodes (source nodes and sink nodes) connecting to the switches of FIG. 12 according to the second growth scheme.
Figure 18:
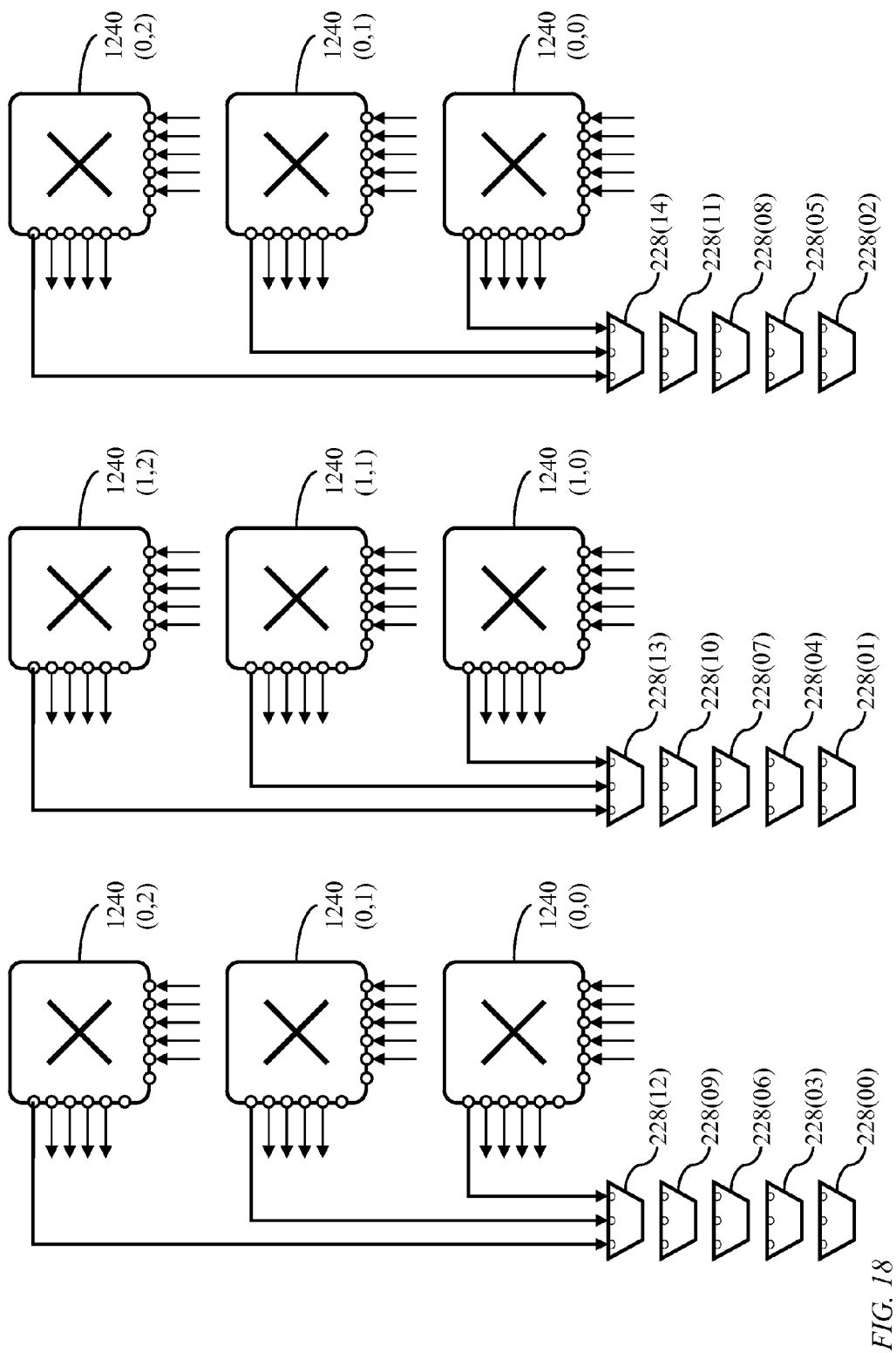

FIG. 17 and FIG. 18 illustrate further growth of the switching system of FIG. 15 and FIG. 16, according to the second growth scheme, where each switch 1240 connects to five source nodes and five sink nodes (m=5). FIG. 17 illustrates source nodes 224 connecting to the switches 1240 of FIG. 12 and FIG. 18 illustrates sink nodes 228 connecting to the switches 1240 of FIG. 12.

As defined earlier, a switch of column j and row j, $0 \le j \le \mu$, in a matrix of switches having $\mu$ columns and $\mu$ rows, $\mu > 2$, is referenced as a diagonal switch, the columns being indexed as 0 to ($\mu-1$) and the rows being indexed as 0 to ($\mu-1$). A diagonal pair of switches comprises a switch of column j and row k and a switch of column k and row j, j≠k of the matrix of switches.

Routing Control of the Switching System

Figure 19:
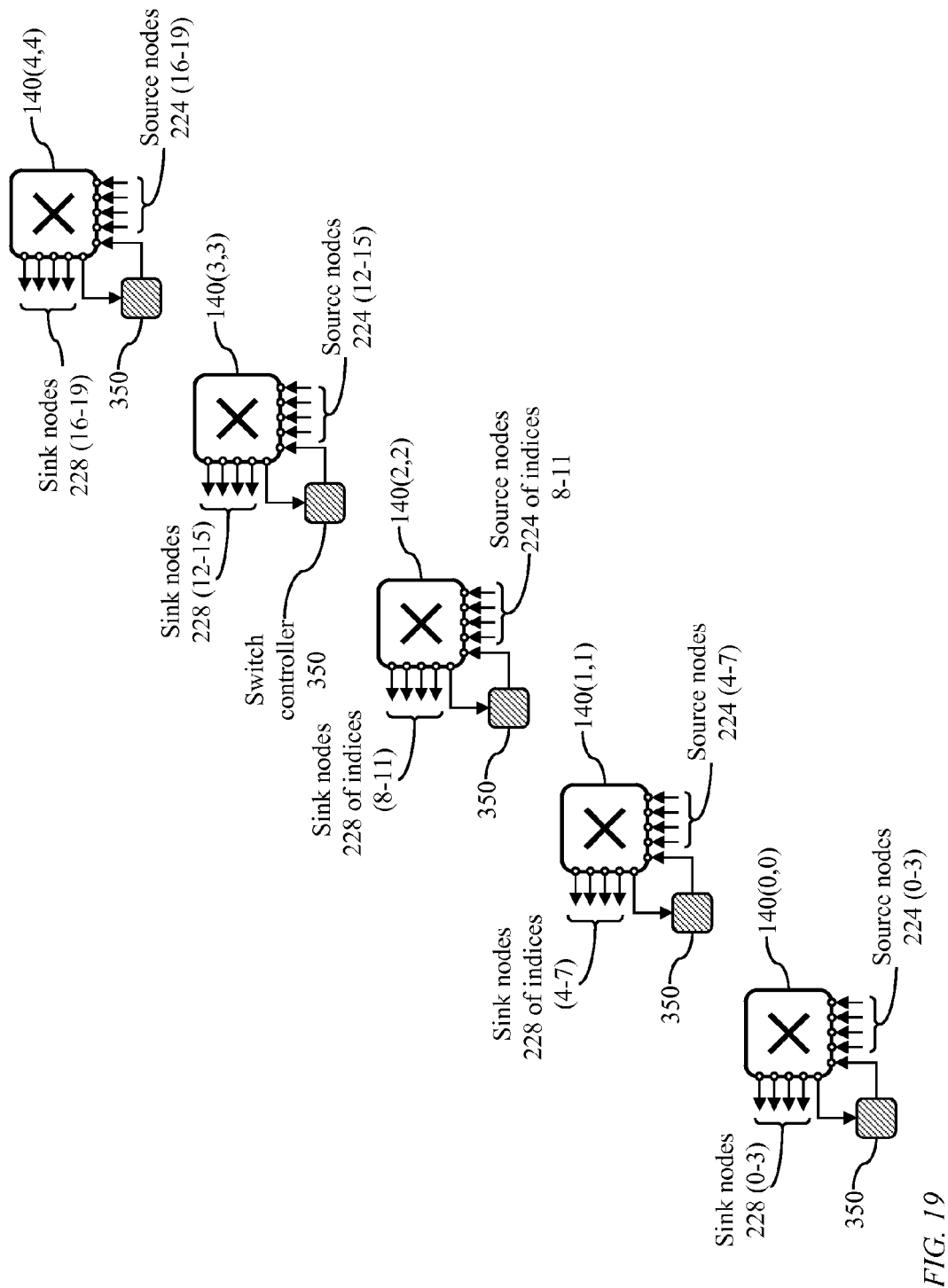
FIG. 19 illustrates diagonal switches along a diagonal of the matrix of switches of FIG. 1.

FIG. 19 illustrates diagonal switches 140(j, j), $0 \le j < \mu$, along a diagonal of the matrix of switches of FIG. 1. Each edge node 220 which connects to an input port of a switch 140(j,k), where j=k, also connects to an output port of the same switch. Thus, where an edge node 220 connects to a switch 140(j,j), there is a return control path from the edge node 220 to itself, i.e., from the source node 224 to the sink node 228 of the same edge node, through the same switch 140(j,j). This is not the case where k≠j. In the configurations of FIG. 4 to FIG. 11, each source node 224 has a path to each sink node 228 through one of the switches 140. Thus, when a source node 224 and a sink node 228 of a same edge node 220 connect to different switches, a return control path from an edge node to itself can be provided through any intermediate edge node 220. However, it is preferable that such a return control path be created without the need to traverse an intermediate edge node 220. This can be realized by collocating a switch 140(j, k) with a switch 140(k, j), where j≠k, $0 \le j < \mu$, $0 \le j < \mu$. A switch 140(j,k) and a switch 140(k,j), j≠k, form a "diagonal switch pair". With the connectivity schemes of FIG. 4 to FIG. 11, switch 140(j,k) and 140(k,j) are also complementary switches forming a "complementary switch pair".

Figure 20:
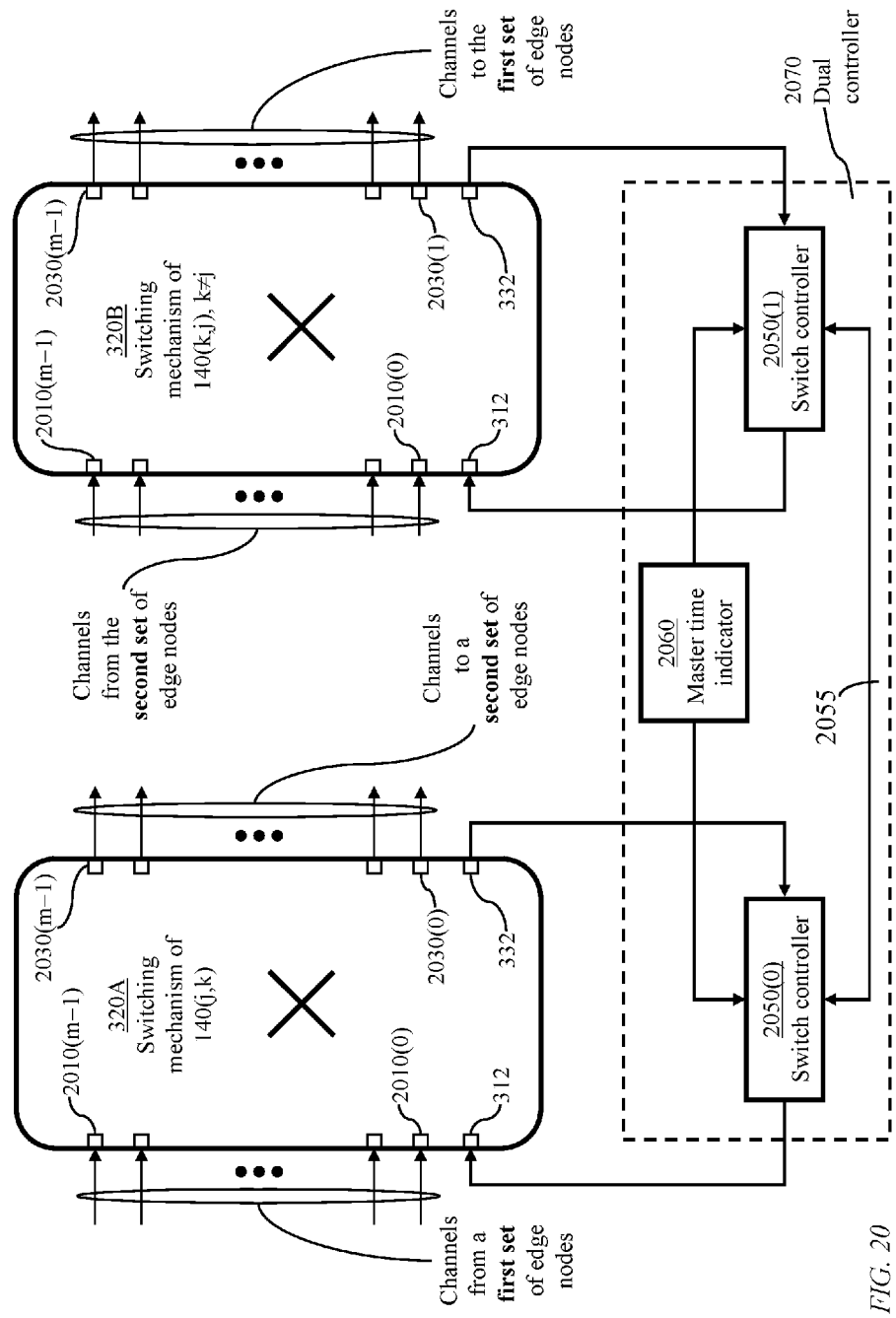
FIG. 20 illustrates coupling of controllers of any complementary switch pairs, in accordance with an embodiment of the present invention.

FIG. 20 illustrates coupling of controllers of any complementary switch pairs of the matrix of switches 140 of FIG. 1 or the matrix of switches 1240 of FIG. 12 to form a "dual controller". A controller 2050(0), which comprises a scheduler and a timing circuit for time-aligning data arriving at inputs of a switching mechanism 320A of a switch 140(j, k), is coupled through a dual channel 2055 to a similar controller 2050(1) of a switching mechanism 320B of a switch 140(k,j), j≠k. The mutually coupled controllers 2050(0) and 2050(1) are herein referenced as a "dual controller" 2070. Controller 2050(0) connects to control inlet 312 and control outlet 332 of switching mechanism 320A while controller 2050(1) connects to control inlet 312 and control outlet of switching mechanism 320B. Controllers 2050(0) and 2050(1) are coupled to a master time indicator 2060. Each controller receives control data from respective input ports 2010(0) to 2010(m−1) and transmits control data to respective output ports 2030(0) to 2030(m−1). Since the input ports 2010(0) to 2010(m−1) of a switching mechanism 320A and the output ports 2030(0) to 2030(m−1) of switching mechanism 320B connect to a same set of edge nodes, control data from controller 2050(0) may be sent through controller 2050(1) to the same set of edge nodes. Likewise, control data may be sent from controller 2050(1) through controller 2050(0) to edge nodes connecting to input ports of switching mechanism 320B and output ports of switching mechanism 320A. The two controllers 2050(0) and 2050(1) may be integrated to function as a single controller (not illustrated).

FIG. 21, FIG. 22, FIG. 23, and FIG. 24 illustrate diagonal switch pairs {140(j,k), 140(k,j), j≠k}, $0 \le j < \mu$, $0 \le k < \mu$, each diagonal switch pair connecting to a respective set of source nodes and a respective set of sink nodes where, for each switch pair, source nodes of a respective first set of edge nodes and sink nodes of a respective second set of edge nodes connect to one of the switches while source nodes of the respective second set of edge nodes and sink nodes of the respective first set of edge nodes connect to the other switch. Thus, each of the diagonal switch pairs is also a complementary switch pair.

Figure 21:
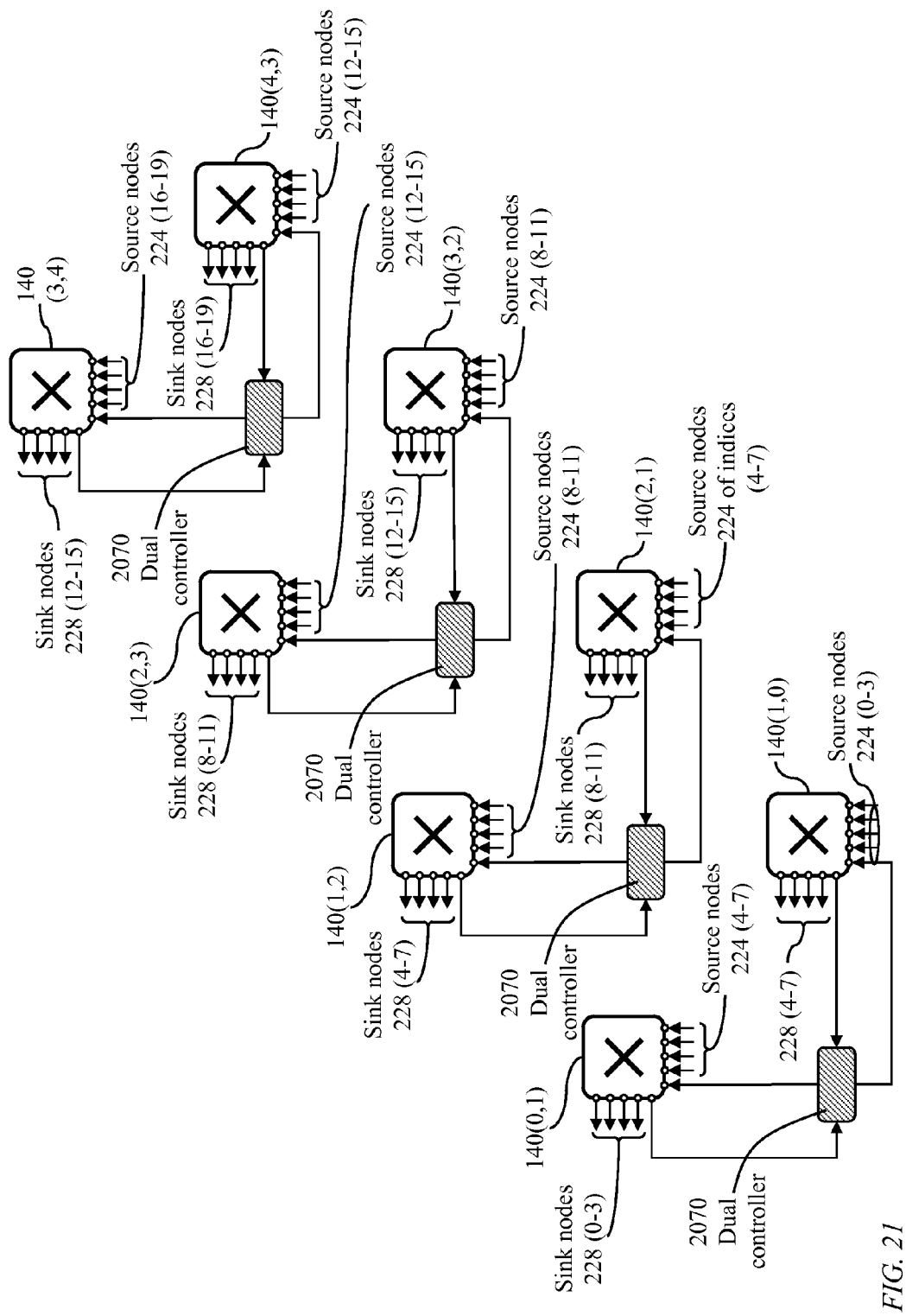
FIG. 21, FIG. 22, FIG. 23, and FIG. 24 illustrate switch pairs each connecting to a respective dual controller where, for each switch pair, source nodes of a respective first set of edge nodes and sink nodes of a respective second set of edge nodes connect to one of the switches while source nodes of the respective second set of edge nodes and sink nodes of the respective first set of edge nodes connect to the other switch, in accordance with an embodiment of the present invention.

FIG. 21 illustrates diagonal switch pairs of the matrix of switches of FIG. 1. A switch 140(1,0) connects to source nodes 224 of indices {0, 1, 2, 3} and sink nodes 228 of indices {4, 5, 6, 7} while a complementary switch 140(0,1) connects to source nodes 224 of indices {4, 5, 6, 7} and sink nodes 228 of indices {0, 1, 2, 3}. Thus, if the two switches 140(1,0) and 140(0,1) are collocated, the two switches may share a dual controller 2070 and a return control path through the switch pair can be established. A switch 140(2,1) connects to source nodes 224 of indices {4, 5, 6, 7} and sink nodes 228 of indices {8, 9, 10, 11} while a complementary switch 140(1,2) of switch 140(2, 1) connects to source nodes 224 of indices {8, 9, 10, 11} and sink nodes 228 of indices {4, 5, 6, 7}. Thus, collocating switches 140(2,1) and 140(1, 2) enables employing a dual controller 2070 and creating a return control path for each of the edge nodes of indices 4 to 11 through the switch pair. Likewise, switches 140(3, 2) and 140(2,3) form a complementary pair, and switch 140(3, 4) and switch 140(4, 3) form a complementary pair. The source nodes 224 and sink nodes 228 connecting to each of switches 140(1,0), 140(0,1), 140(2,1), 140(1,2), 140(3,2), 140(2,3), 140(4,3), and 140(3,4) are indicated in FIG. 22.

Figure 22:
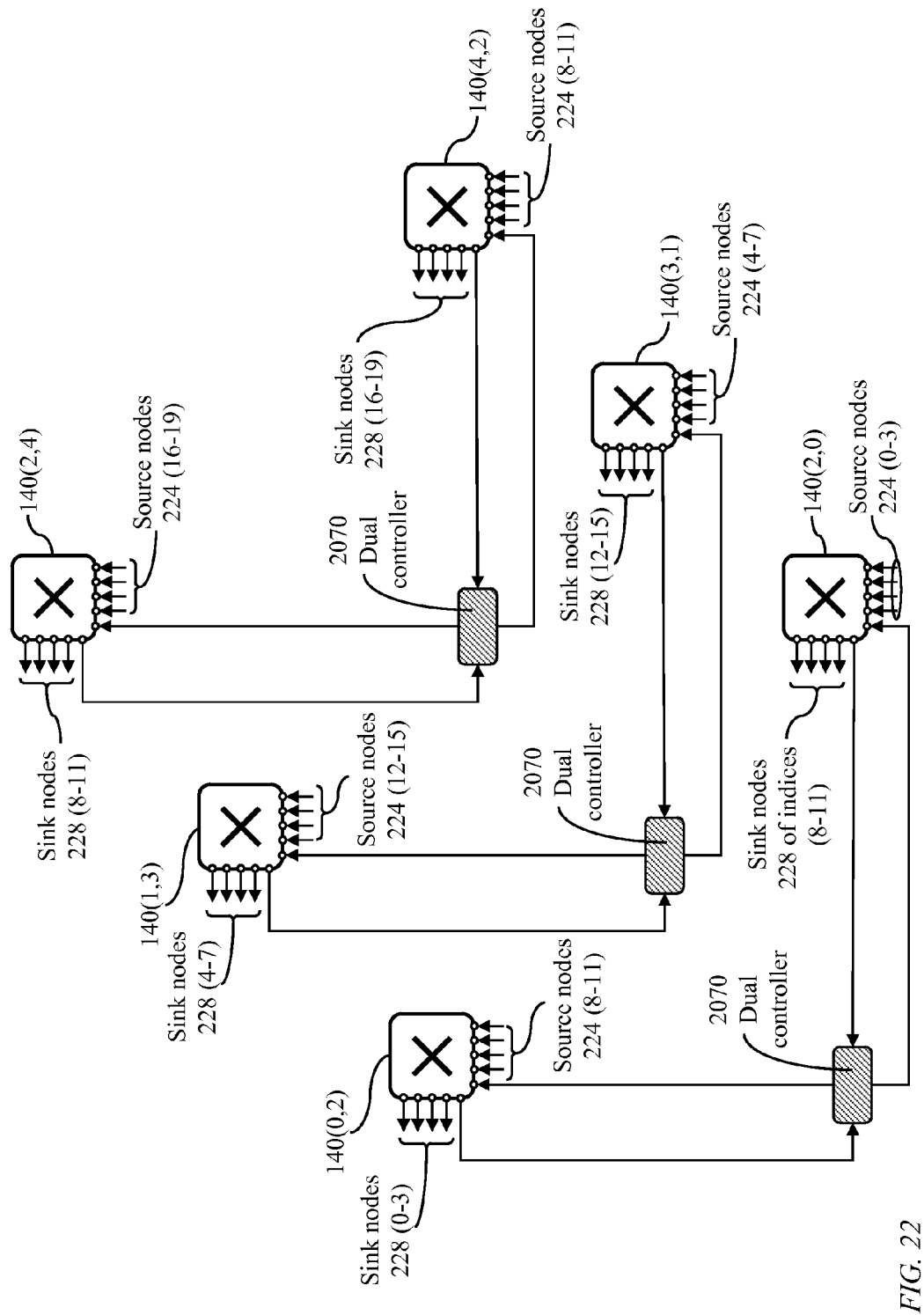

As illustrated in FIG. 22, switch 140(2, 0) and switch 140(0,2) form a complementary switch pair, switch 140(3,1) and switch 140(1,3) form a complementary switch pair, and switch 140(4,2) and switch 140(2,4) form a complementary switch pair. The source nodes 224 and sink nodes 228 connecting to each of switches 140(2,0), 140(0,2), 140(3,1), 140(1,3), 140(4,2), and 140(2,4) are indicated in FIG. 22.

Figure 23:
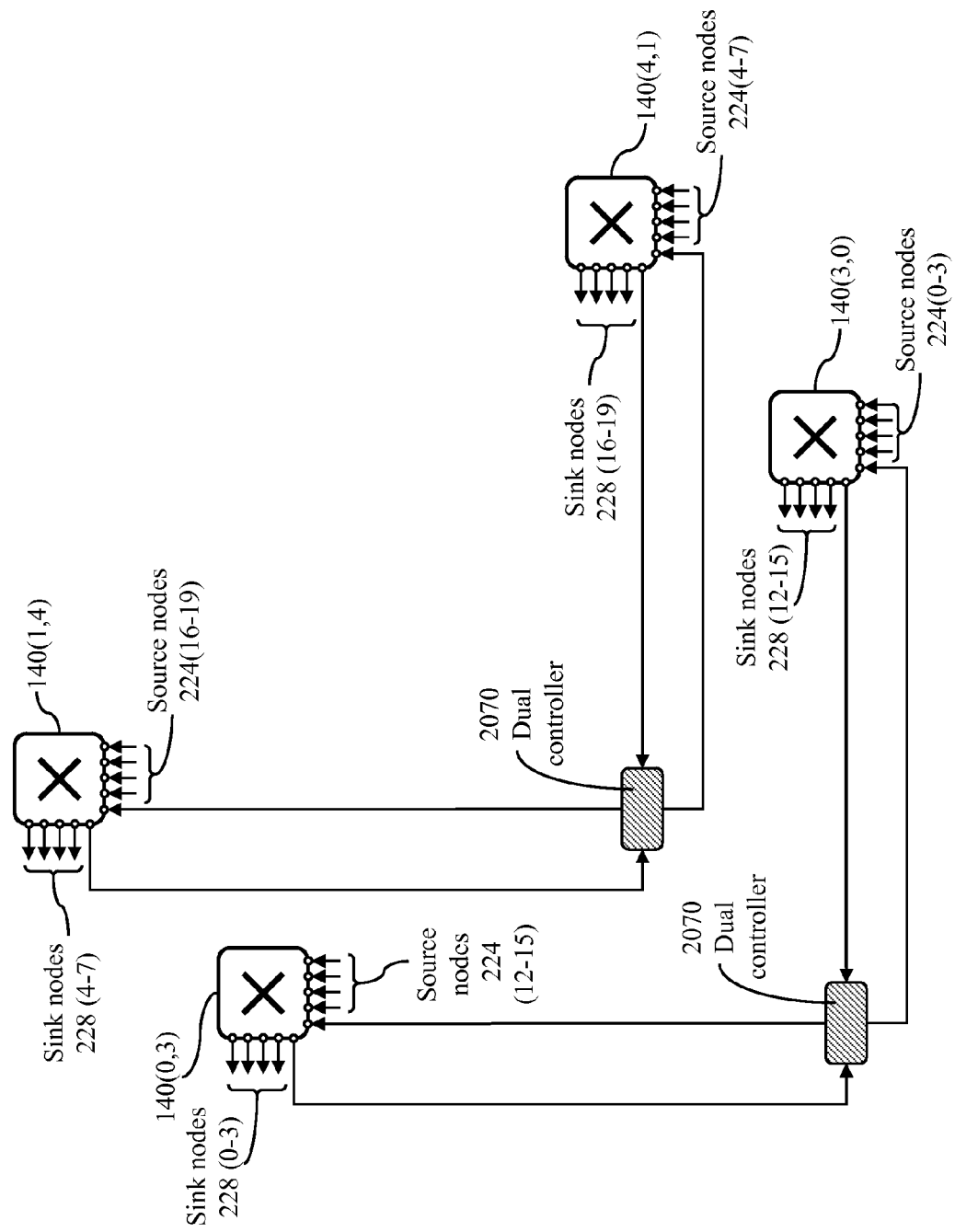

FIG. 23 illustrates a dual controller 2070 of switch 140(3, 0) and switch 140(0,3) which form a complementary switch pair, and a dual controller 2070 of switch 140(4,1) and switch 140(1,4) which form a complementary switch pair. Switch 140(3, 0) connects to source nodes 224 of indices 0-3 and sink nodes 228 of indices 12-15, while complementary switch 140(0, 3) connects to sink nodes 228 of indices 0-3 and source nodes 224 of indices 12-15. Switch 140(4, 1) connects to source nodes 224 of indices 4-7 and sink nodes 228 of indices 16-19, while complementary switch 140(1,4) connects to sink nodes 228 of indices 4-7 and source nodes 224 of indices 16-19.

Figure 24:
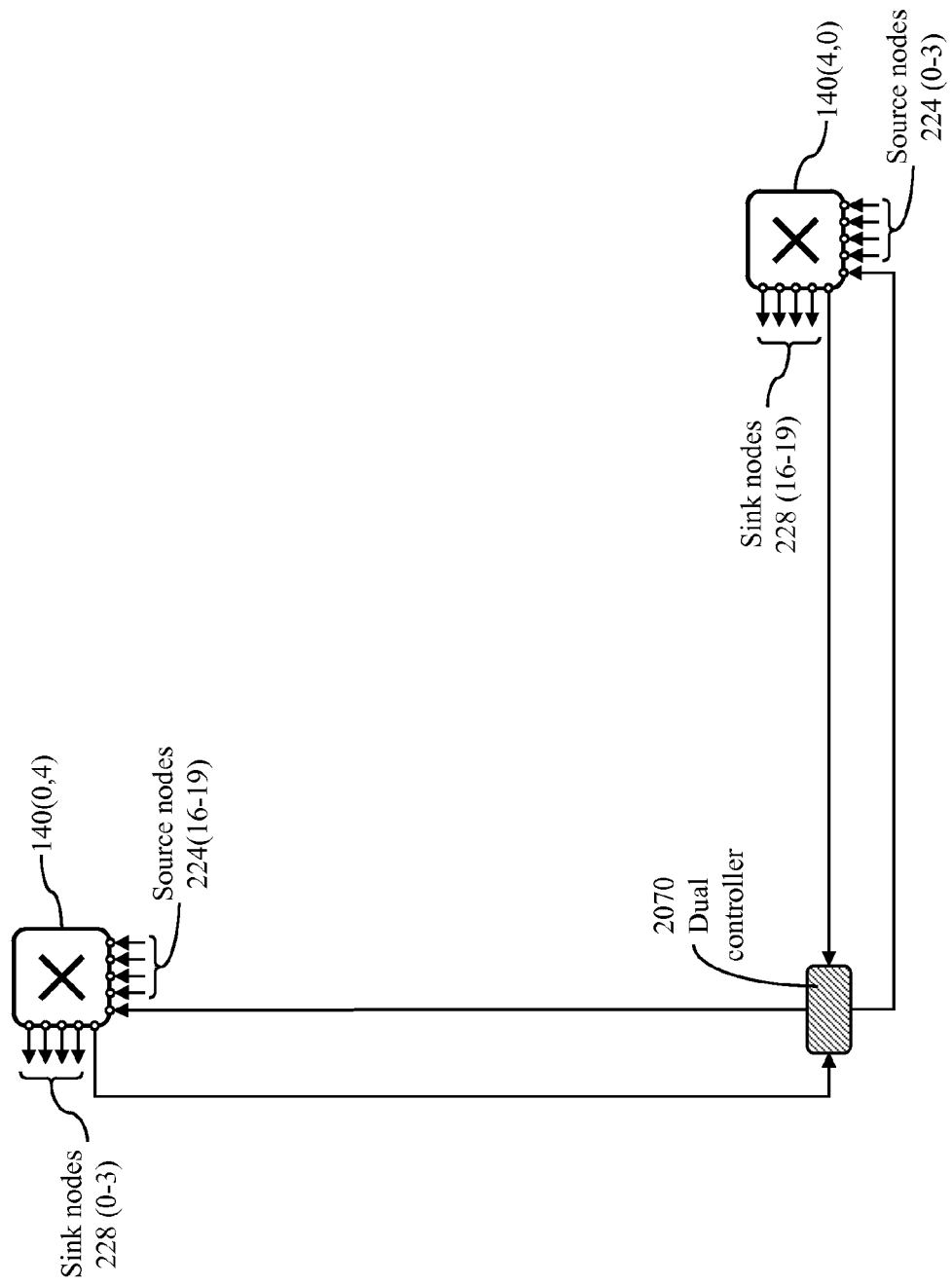

FIG. 24 illustrates a dual controller 2070 of switch 140(4, 0) and switch 140(0,4) which form a complementary switch pair. Switch 140(4, 0) connects to source nodes 224 of indices 0-3 and sink nodes 228 of indices 16-19, while complementary switch 140(0,4) connects to sink nodes 228 of indices 0-3 and source nodes 224 of indices 16-19.

Switching System Employing Core Rotators

A large-scale temporal rotator may be used to interconnect a large number of edge nodes to create a fully-meshed network. A temporal rotator having N input ports and N output ports, N>2, provides a path from each edge node to each other edge node. With each input port (and each output port) having a capacity of R bits/second, a path of capacity R/N from each port to each other port is created, with each edge node having a return data path to itself. A number of N×N temporal rotators may be operated in parallel to distribute data from N upstream wavelength-division-multiplexed (WDM) links to N downstream WDM links. However, with a large number N (8000, for example), the delay resulting from use of a temporal rotator of large dimension and the small capacity of a path within each temporal rotator may be undesirable.

Figure 25:
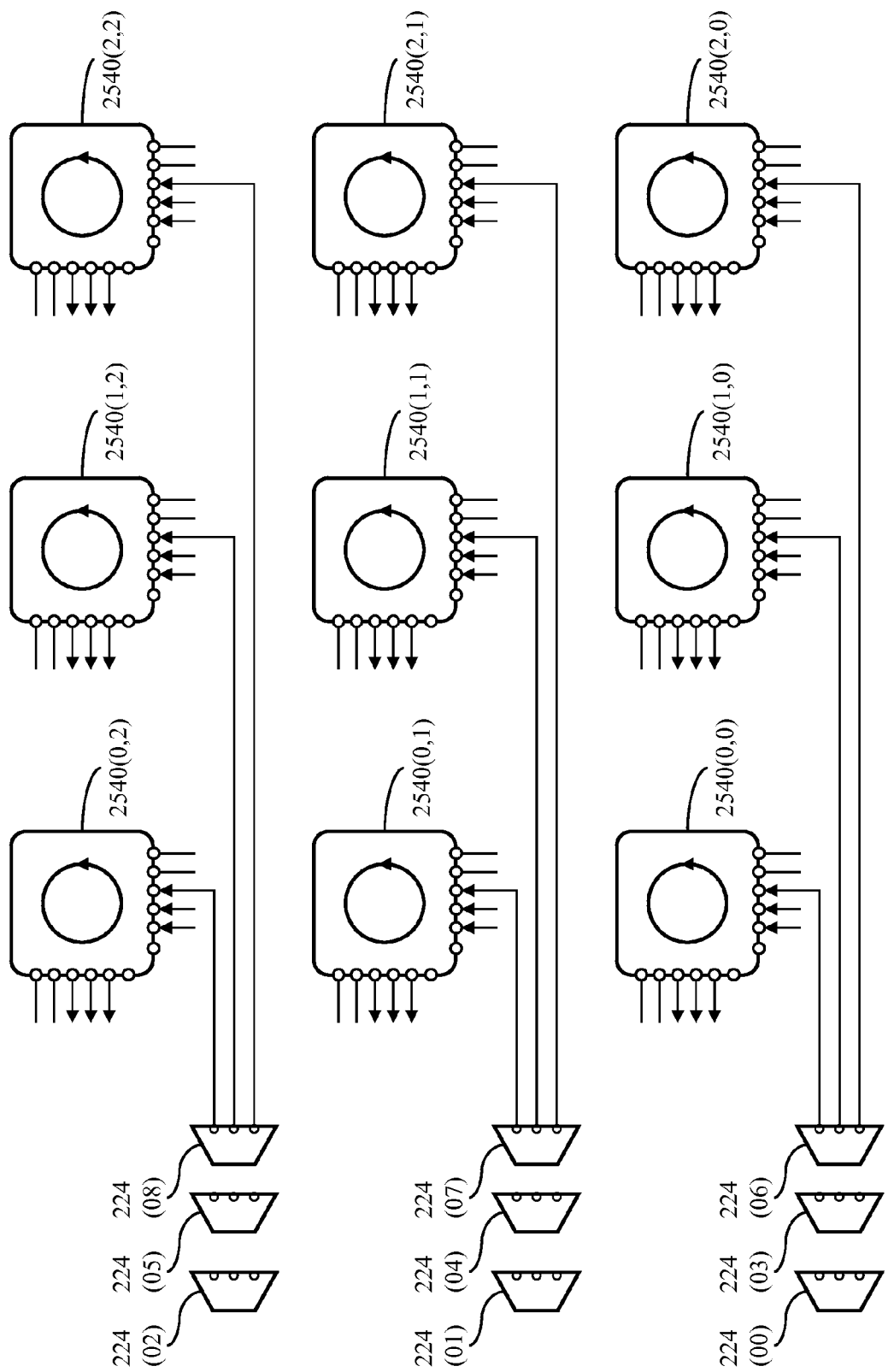
FIG. 25 illustrates source nodes connecting to rotators arranged in a matrix of rotators, in accordance with an embodiment of the present invention.

FIG. 25 illustrates rotators temporal rotators 2540 of relatively small dimensions arranged in a matrix μ×μ, μ>2, of rotators. A temporal rotator is herein also referenced as a "rotator"; all rotators used in the present application are temporal rotators. The edge nodes of FIG. 2 may be interconnected through the matrix of rotators. The matrix of rotators may interconnect a large number of edge nodes 220 with a reduced delay and a larger path capacity for each directed pair of edge nodes. The matrix of rotators illustrated in FIG. 25 has three columns and three rows (μ=3). Each rotator 2540 connects to a respective set input channels 2512 and a respective set of output channels 2514. With each rotator 2540 having m inputs and m outputs, m>2, and each source node having μ upstream channels individually connecting to rotators of a respective row of the matrix of rotators, the total number of edge nodes is m×μ. With m=32 and μ=256, for example, the total number of source nodes is 8192.

Figure 26:
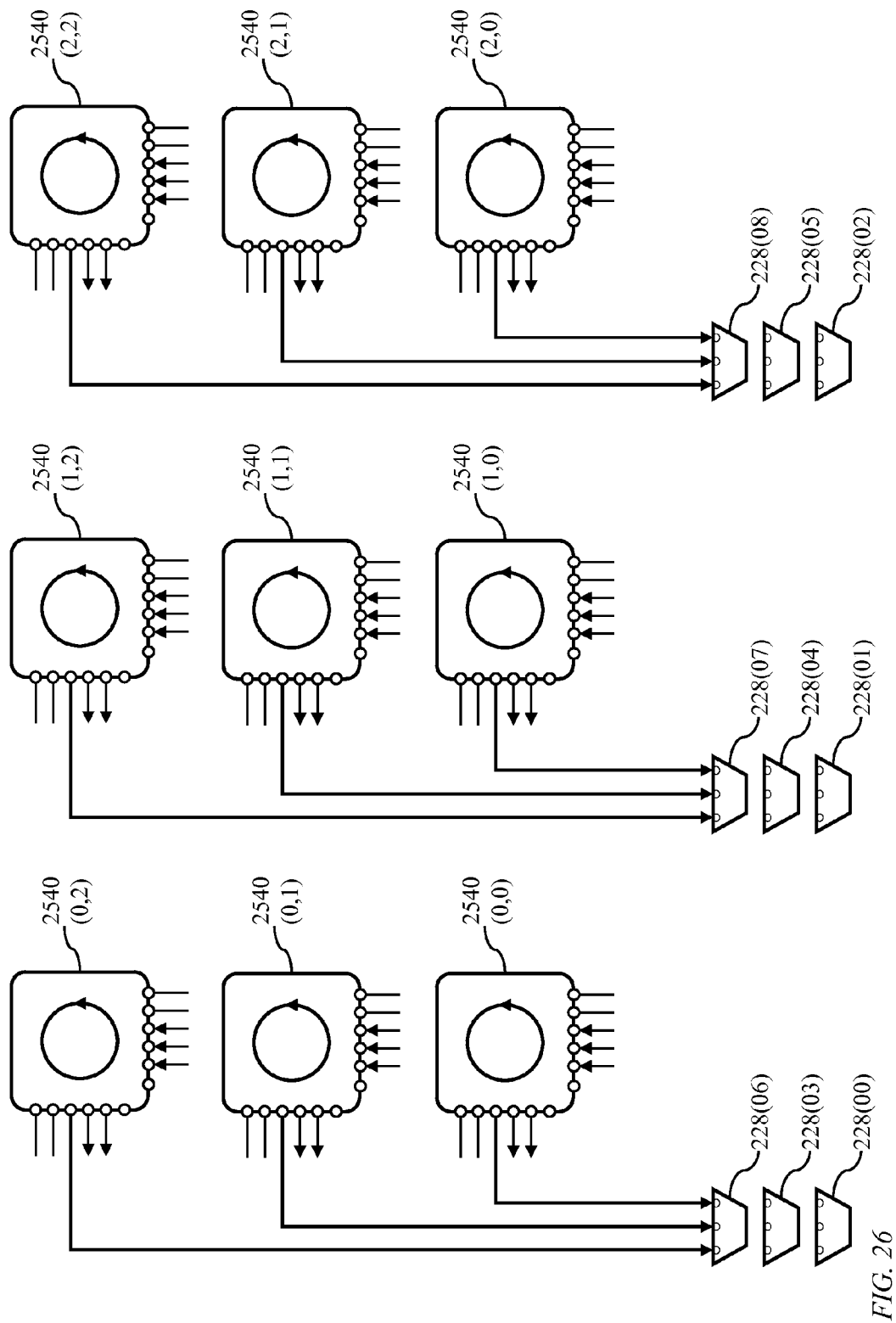
FIG. 26 illustrates connections of the rotators of FIG. 25 to sink nodes.

FIG. 26 illustrates connections of the rotators of FIG. 25 to sink nodes 228. With each sink node having μ downstream channels individually connecting to rotators of a respective column of the matrix of rotators, the number of sink nodes is m×μ.

Figure 27:
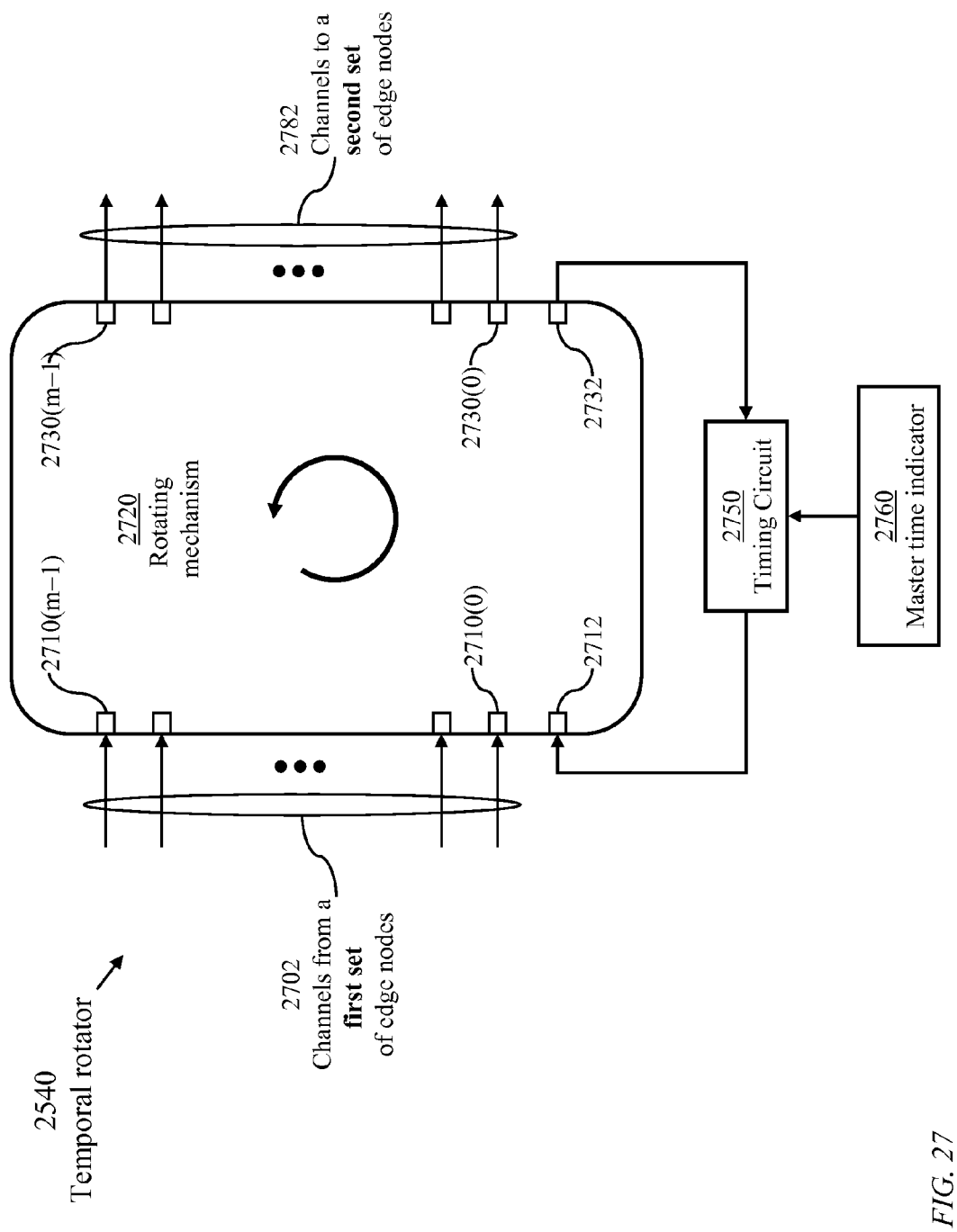
FIG. 27 illustrates a rotator coupled to a timing circuit.

FIG. 27 illustrates a temporal rotator 2540 comprising a number, m, of input ports 2710, m output ports 2730, a control inlet 2712, and a control outlet 2732, and a rotating mechanism 2720 cyclically connecting each input port 2710 to each output port 2730. The input ports 2710 receive payload data and control data from a first set of edge nodes 220 (a first set of source nodes 224) through upstream channels 2702. The output ports 2730 transmit payload data and control data to a second set of edge nodes 220 (second set of sink nodes 228) through downstream channels 2782. A timing circuit 2750 receives timing data from the first set of edge nodes 220 through the input ports 2710, the rotating mechanism, and control outlet 2732. The timing circuit 2750 transmits timing data to the second set of edge nodes 220 through control outlet 2712, the rotating mechanism, and output ports 2730.

Figure 28:
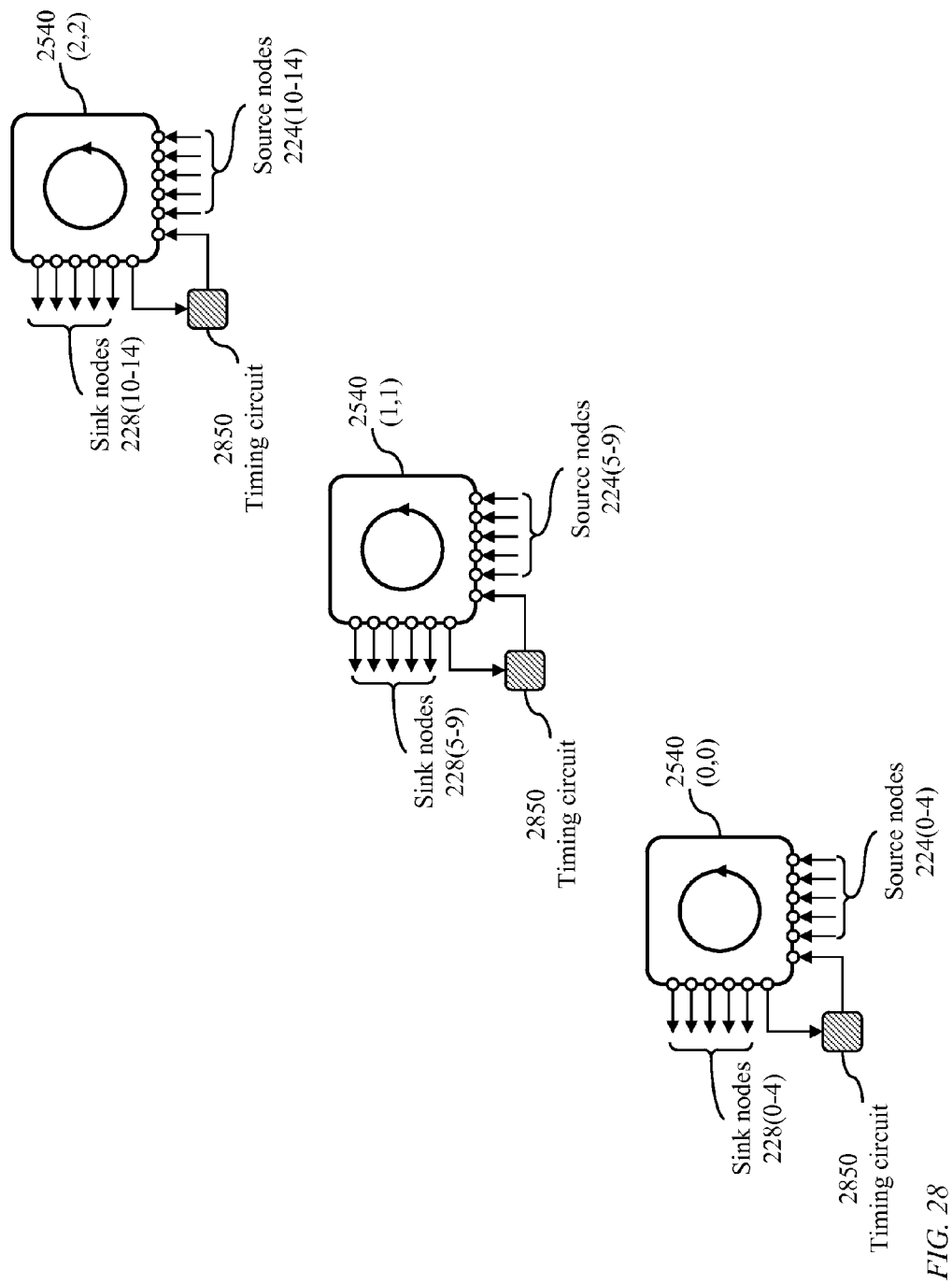
FIG. 28 illustrates diagonal rotators each of which connecting to a respective set of edge nodes, where each edge node combines a source node and a sink node.

FIG. 28 illustrates diagonal rotators 2540(j, j), 0≤j<μ, along a diagonal of the matrix of rotators of FIG. 25. Each edge node which connects to an input port of a rotator 2540(j,k), where j=k, also connects to an output port of the same rotator. Thus, where an edge node connects to a rotator 2540(j,j), there is a return control path from the edge node to itself through the same rotator 2540(j,j). k≠j. In the configuration of FIG. 25 and FIG. 26, each source node 224 has a path to each sink node 228 through one of the rotators 2540. Thus, when a source node 224 and a sink node 228 of a same edge node connect to different rotators, a return control path from an edge node to itself can be realized through any intermediate edge node. However, it is preferable that such a return control path be created without the need to traverse an intermediate edge node. This can be realized by collocating a rotator 2540(j, k) with a rotator 2540(k, j), where j≠k, 0≤j<μ, 0≤k<μ, where j and k are indices of a column and a row, respectively, of the matrix of rotators.

Rotator 2540(0,0) connects source nodes 224 of indices 0-4 to sink nodes 228 of indices 0-3. Rotator 2540(1,1) connects source nodes 224 of indices 5-9 to sink nodes 228 of indices 5-9. Rotator 2540(2,2) connects source nodes 224 of indices 10-149 to sink nodes 228 of indices 10-14.

Figure 29:
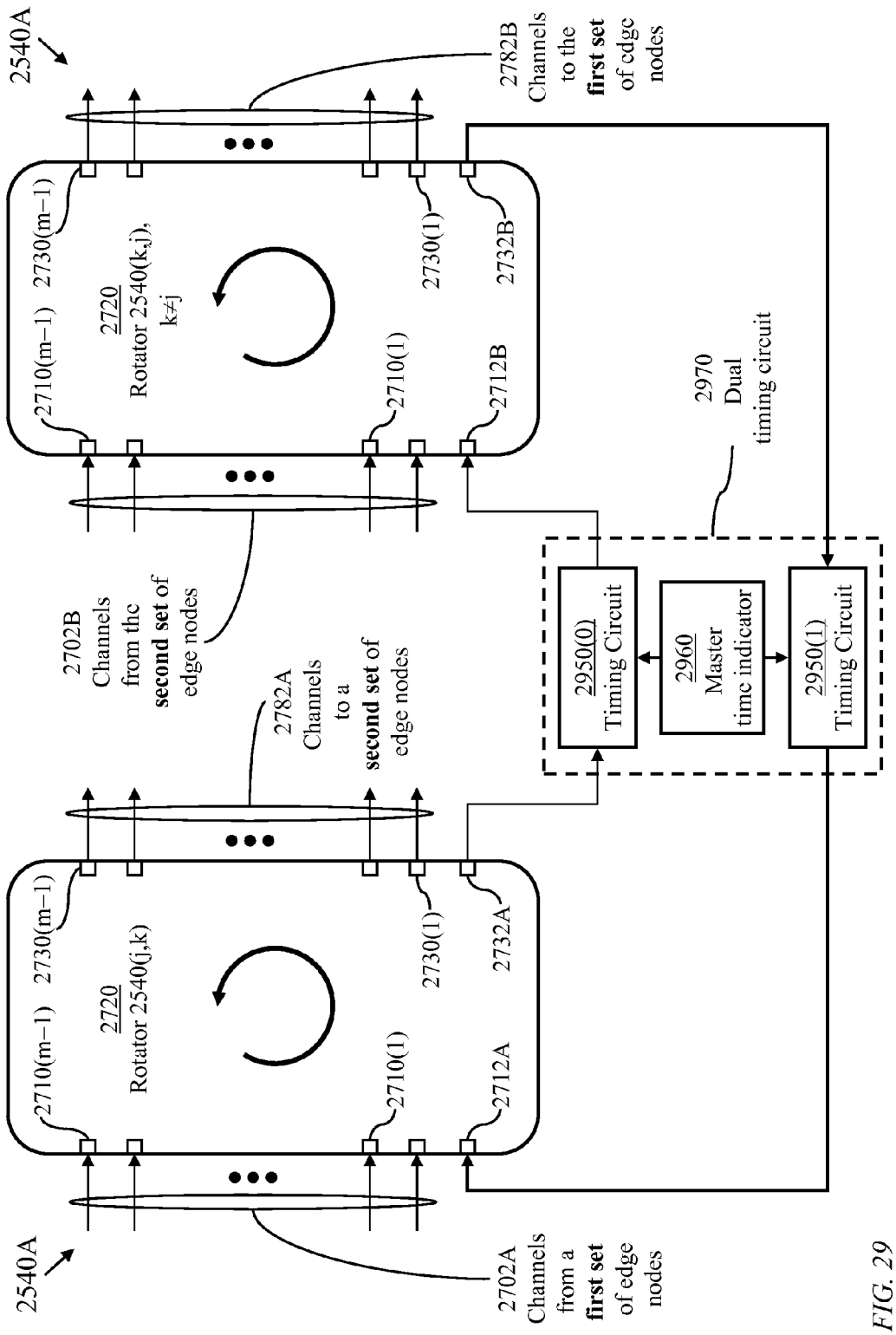
FIG. 29 illustrates coupling of timing circuits to rotators of any complementary rotator pair, in accordance with an embodiment of the present invention.

FIG. 29 illustrates coupling of timing circuits to rotators of any complementary rotator pairs. Timing circuit 2950(0) compares timing data received from input channels 2702A of rotator 2540(j,k) with corresponding readings of master time indicator 2960 and sends a result of the comparison from control inlet 2712B to output channels 2782B of rotator 2540(k,j). Likewise, timing circuit 2950(1) compares timing data received from input channels 2702B of rotator 2540(k,j) with corresponding readings of the master time indicator 2960 and sends a result of the comparison from control inlet 2712A to output channels 2782A of rotator 2540(j,k). As defined earlier, a rotator of column j and row j, 0≤j<μ, in a matrix of rotators having μ columns and μ rows, μ>2, is referenced as a diagonal rotator, the columns being indexed as 0 to (μ−1) and the rows being indexed as 0 to (μ−1). A diagonal pair of rotators comprises a rotator of column j and row k and a rotator of column k and row j, j≠k of the matrix of rotators.

Each diagonal rotator is coupled to a timing circuit coupled to a control outlet and a control inlet of the same diagonal rotator. The timing circuit is coupled to a respective master time indicator and is configured to receive timing data from external sources and return information relevant to discrepancy of received timing data from corresponding readings of the master time indicator.

Thus, the switching system of FIG. 25 and FIG. 26 comprises a plurality of rotators 2540 arranged in a matrix of a number of columns and the same number of rows, wherein a first rotator 2540A and a second rotator 2540B of each diagonal pair of rotators (FIG. 29) are collocated. Each rotator 2540 comprises a number m of input ports 2710, m output ports 2730, m>2, a control inlet 2712, a control outlet 2732, and a rotating mechanism 2720. Each edge node is communicatively coupled to an input port 2710 of each rotator 2540 of a respective row, and an output port 2730 of each rotator 2540 of a respective column.

A first timing circuit 2950(0) connects to a control outlet 2732A of said first rotator 2540A and a control inlet 2712B of said second rotator. A second timing circuit 2950(1) connects to a control outlet 1732B of said second rotator 2540B and a control inlet 2712A of said first rotator. A master time indicator 2960 provides reference time to the first timing circuit 2950(0) and the second timing circuit 2950(1).

Figure 30:
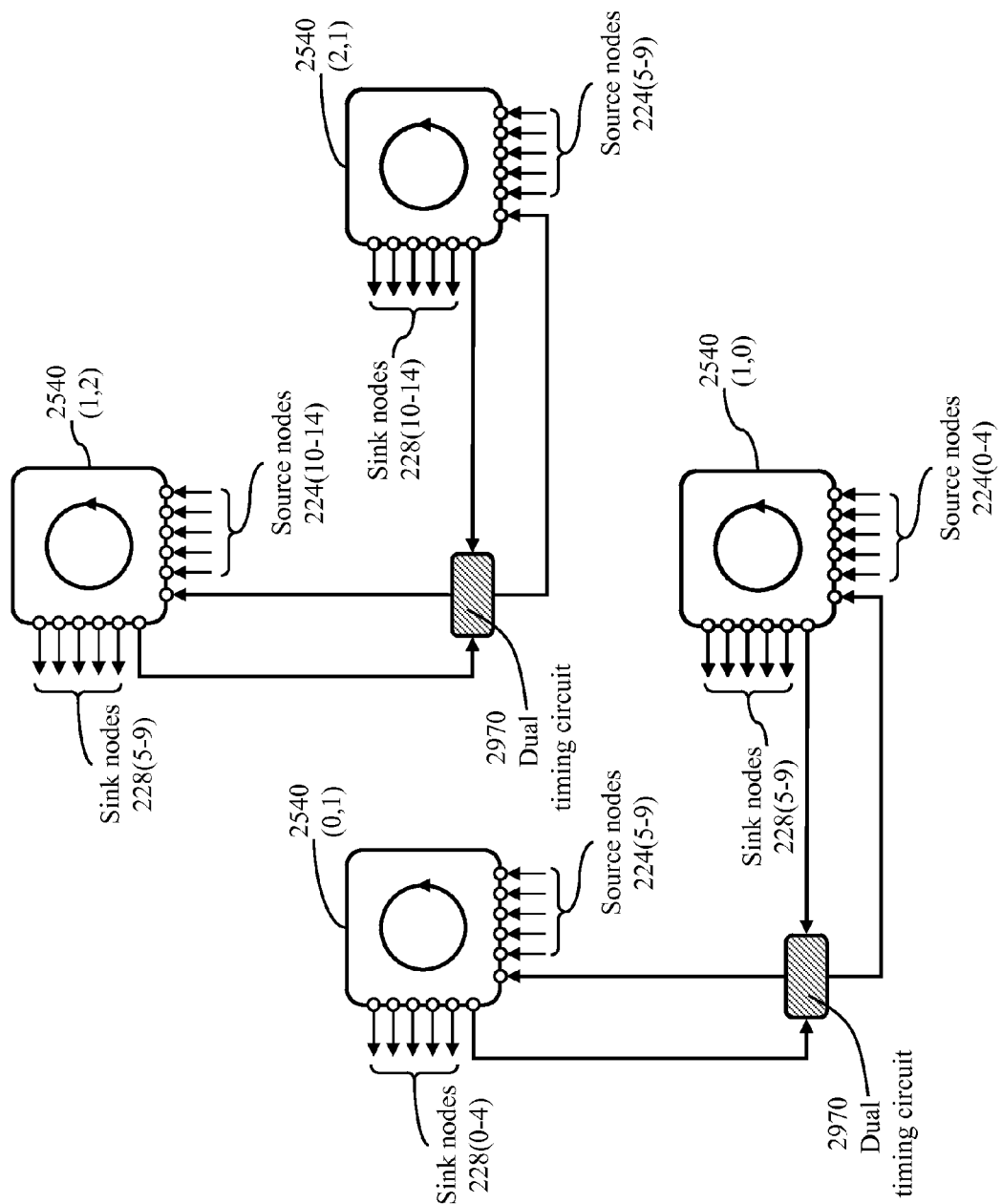
FIG. 30 and FIG. 31 illustrate rotator pairs each connecting to a respective dual timing circuit where, for each rotator pair, source nodes of a respective first set of edge nodes and sink nodes of a respective second set of edge nodes connect to one of the rotators while source nodes of the respective second set of edge nodes and sink nodes of the respective first set of edge nodes connect to the other rotator of the each rotator pair, in accordance with an embodiment of the present invention.
Figure 31:
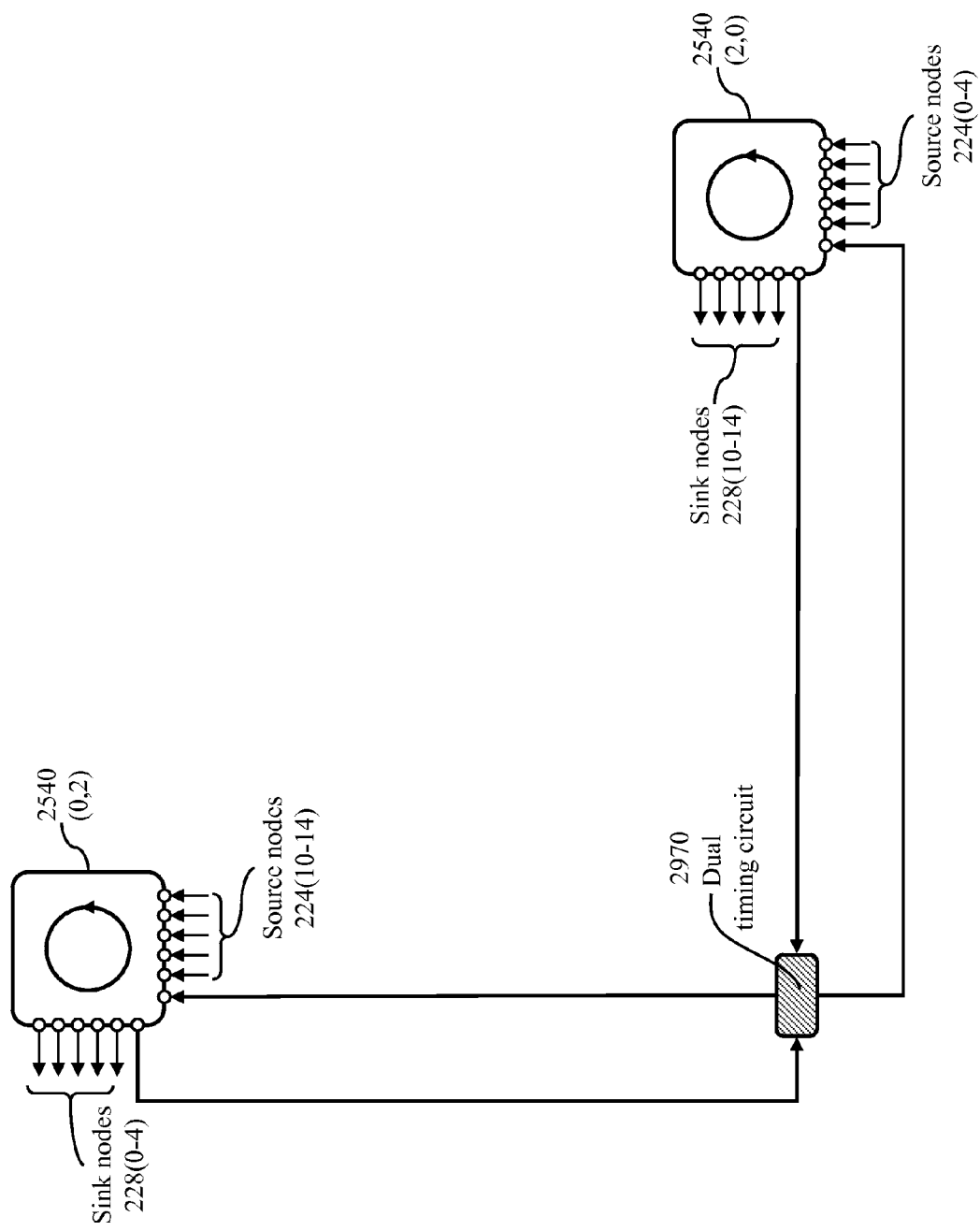

FIG. 30 and FIG. 31 illustrate rotator pairs each connecting to a respective set of source nodes and a respective set of sink nodes where, for each rotator pair, source nodes of a respective first set of edge nodes and sink nodes of a respective second set of edge nodes connect to one of the rotators while source nodes of the respective second set of edge nodes and sink nodes of the respective first set of edge nodes connect to the other rotator of the each rotator pair. The rotator-pair connectivity illustrated in FIG. 30 and FIG. 31 are analogous to the switch-pair connectivity of FIG. 23 and FIG. 24, respectively. Rotators 2540(j, k) and 2540(k,j), k≠j, are preferably collocated to exchange timing data using a dual timing circuit 2970 illustrated in FIG. 29.

Rotator 2540(1,0) transfers data from source nodes 224 of indices 0-4 to sink nodes 228 of indices 5-9 while rotator 2540(0,1) transfers data from source nodes 224 of indices 5-9 to sink nodes 228 of indices 0-4. Rotator 2540(2,1) transfers data from source nodes 224 of indices 5-9 to sink nodes 228 of indices 10-14 while rotator 2540(1,2) transfers data from source nodes 224 of indices 10-14 to sink nodes 228 of indices 5-9. Rotator 2540(2,0) transfers data from source nodes 224 of indices 0-4 to sink nodes 228 of indices 10-14 while rotator 2540(0,2) transfers data from source nodes 224 of indices 10-14 to sink nodes 228 of indices 0-4.

Rotators 2540(1,0) and 2540(0,1) form a diagonal rotator pair and with the connectivity scheme of FIGS. 25 and 26, the two rotators also form a complementary rotator pair. Likewise, rotators 2540(2,1) and 2540(1,2) form a diagonal rotator pair which is also a complementary rotator pair. Rotators 2540(2,0) and 2540(0,2) form a diagonal rotator pair which is also a complementary rotator pair.

Figure 32:
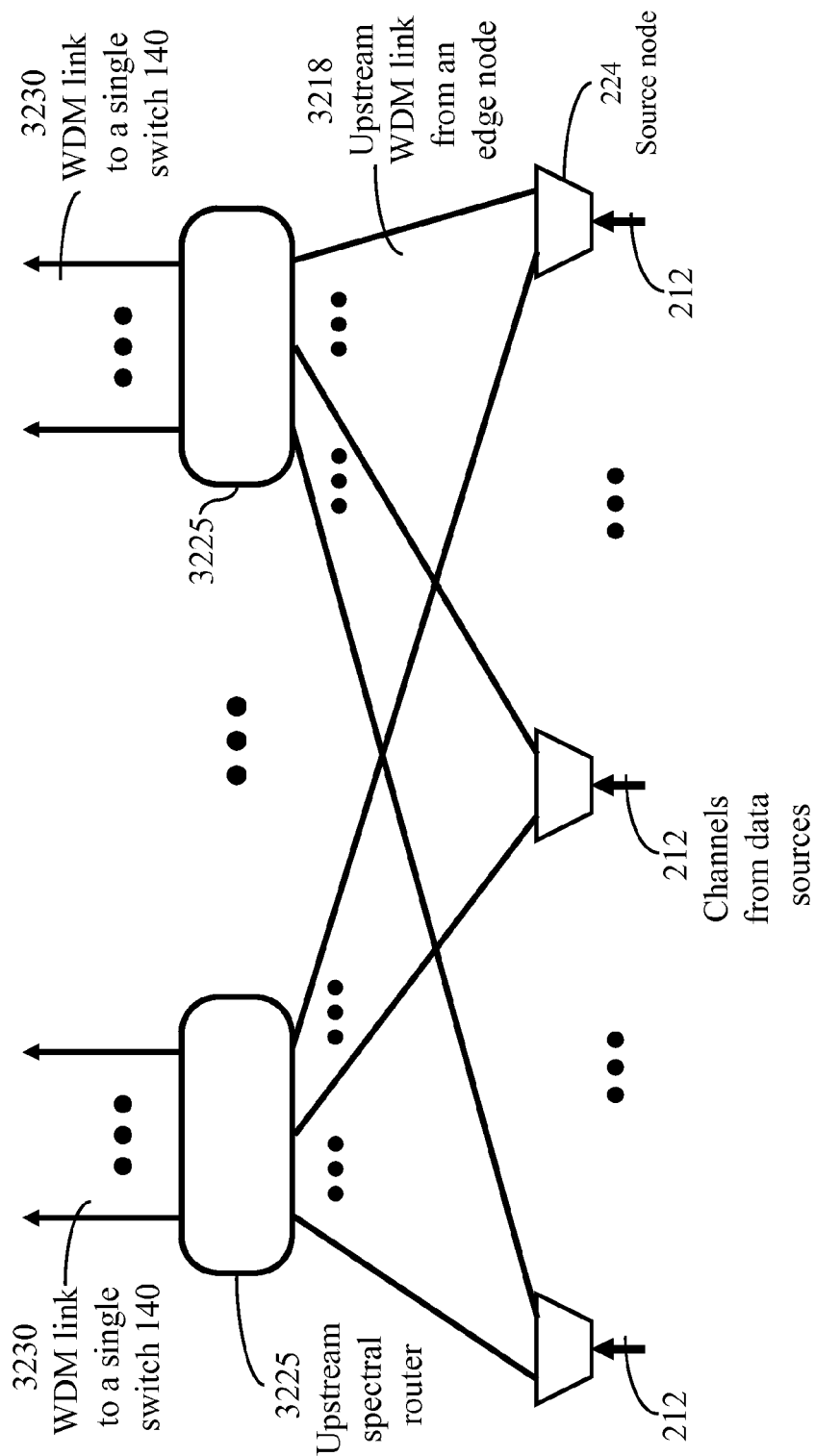
FIG. 32 illustrates connection of source nodes to switches through upstream spectral routers.

FIG. 32 illustrates connection of a set of source nodes 224 (a set of edge nodes 220) to switches 140 through a respective set of upstream spectral routers 3225. Each source node 224 of the set of source nodes has an upstream WDM link 3218 to each upstream spectral router 3225 of the respective set of upstream spectral routers. Each upstream spectral router receives optical signals from an upstream WDM link 3218 from each source node 224 of the set of source nodes and directs individual spectral bands from each upstream WDM link 3218 to each output WDM link 3230. Each output WDM link 3230 is directed to a respective switch 140. Thus, each switch 140 receives a spectral band from each source node 224 of the set of source nodes. Each source node 224 receives data from data sources through channels 212 as illustrated in FIG. 2.

Figure 33:
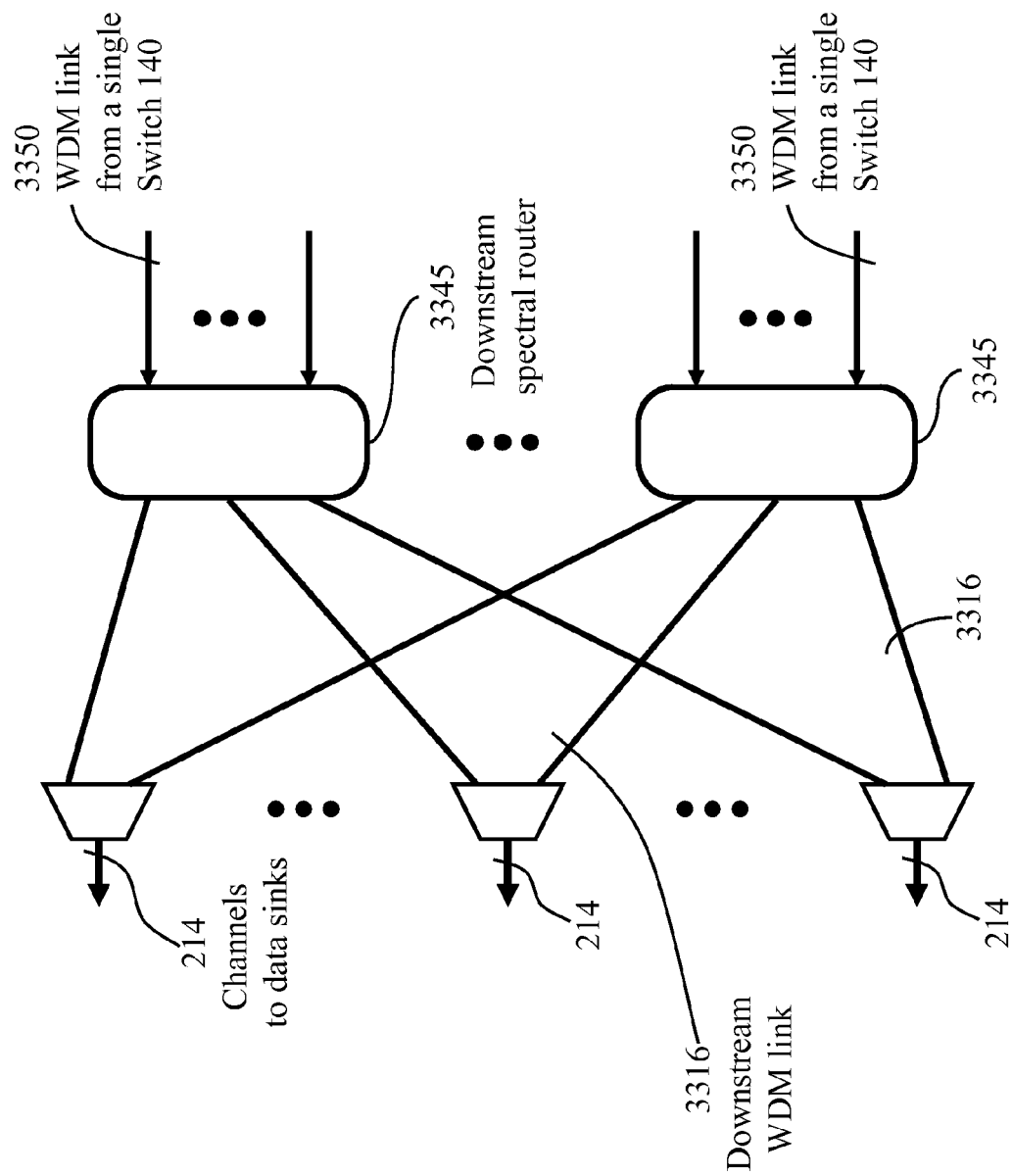
FIG. 33 illustrates connection of switches to sink nodes, through downstream spectral routers.

FIG. 33 illustrates connection of switches 140 to a set of sink nodes 228 (a set of edge nodes 220) through a respective set of downstream spectral routers 3345. Each sink node 228 of the set of sink nodes connects to a downstream WDM link 3316 from each downstream spectral router 3345 of the respective set of downstream spectral routers. Each downstream spectral router receives optical signals from a set of switches 140 through input WDM links 3350 and directs individual spectral bands of each input WDM link 3350 to each sink node 228 of the set of sink nodes through a respective downstream WDM link 3216. Thus, each sink node 228 of the set of sink nodes receives a spectral band from each input WDM link 3350. Each sink node 228 transmits data to data sinks through channels 214 as illustrated in FIG. 2.

Eliminating the Need for Spectral Routers

As described above with reference to FIG. 32 and FIG. 33, the connectivity scheme of edge nodes to switches, where the edge nodes are geographically distributed and the switches are geographically distributed, relies on use of intermediate spectral routers. Each edge node is coupled to an upstream WDM link to each of a respective set of upstream spectral routers and a downstream WDM link from each of a respective set of downstream spectral routers. To eliminate the need for upstream and downstream spectral routers, the switches 140 may be arranged into constellations of collocated switches. Preferably, the switches of each constellation are logically arranged in a matrix and the entire plurality of switches 140 are arranged in a matrix of constellations. Each source node 224 may connect to each constellation of a respective row of the matrix of constellations through an upstream WDM link. Each sink node 228 may connect to each constellation of a respective column of the matrix of constellations through a downstream WDM link.

Figure 34:
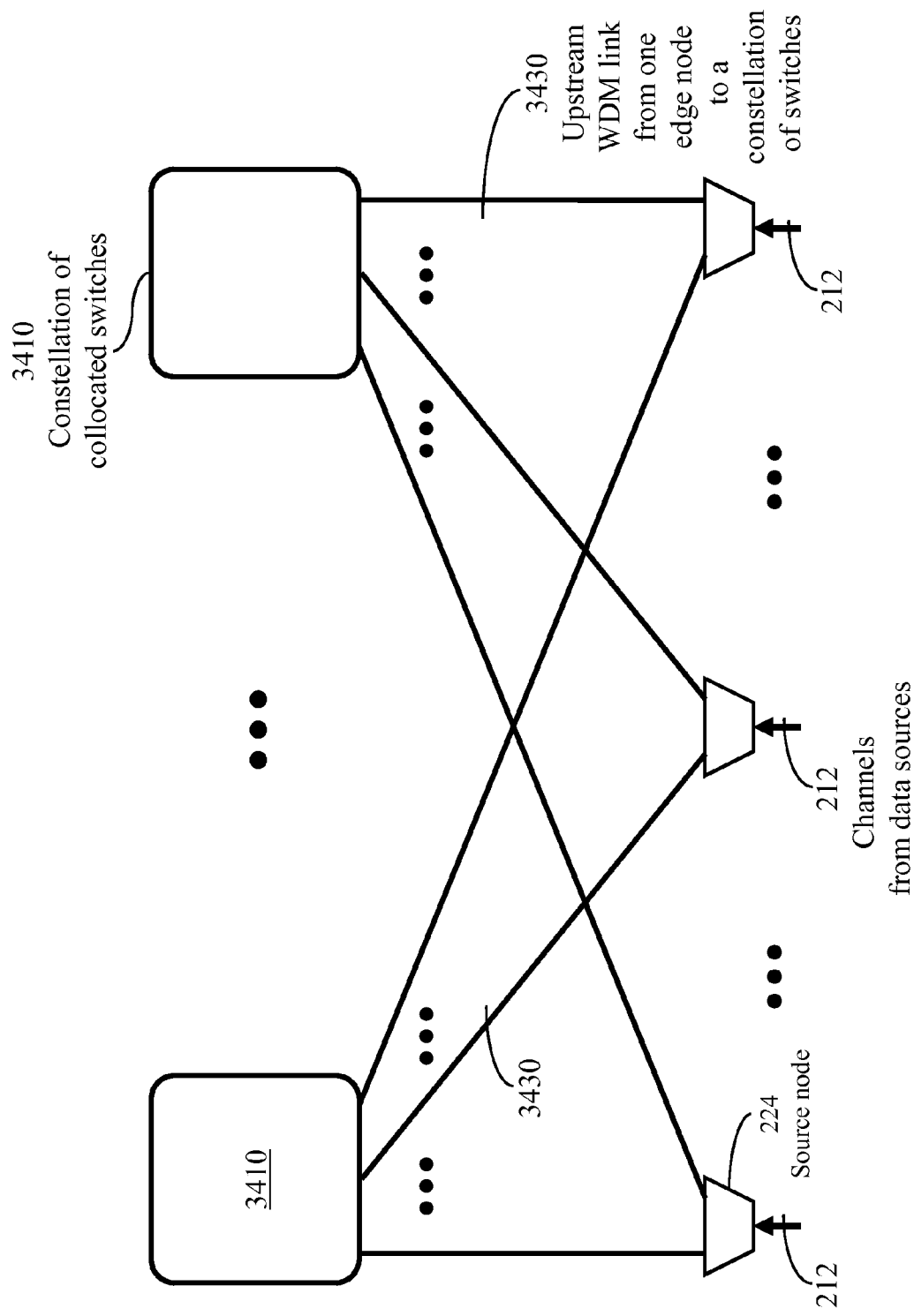
FIG. 34 illustrates direct connection, through upstream WDM links, of source nodes to a number of constellations of switches, in accordance with an embodiment of the present invention.

FIG. 34 illustrates direct connection, through upstream WDM links 3430, of source nodes 224 (edge nodes 220) to switch constellations 3410 of a row of a matrix of constellations.

Figure 35:
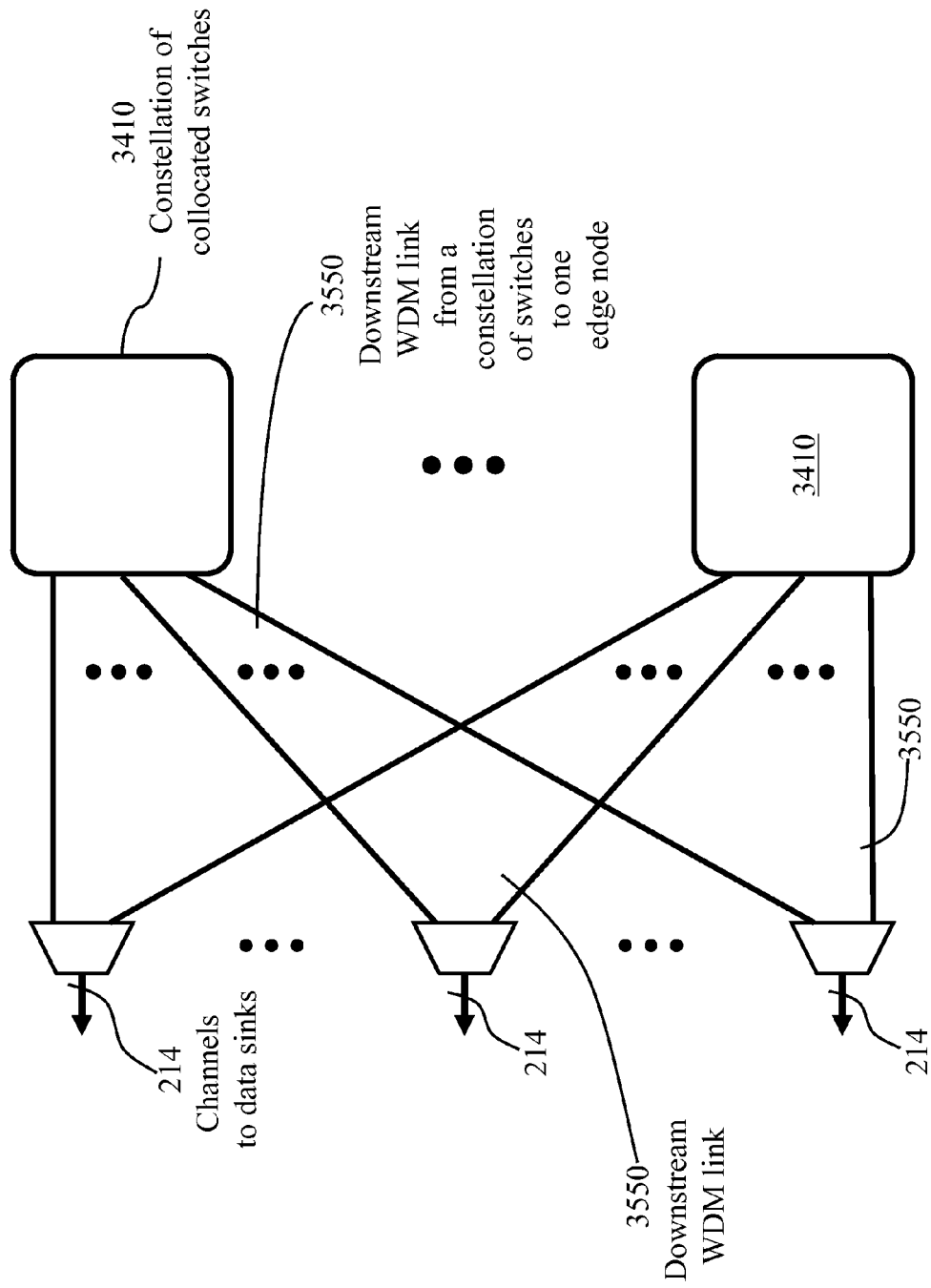
FIG. 35 illustrates connection of constellations of switches to sink nodes through downstream WDM links, in accordance with an embodiment of the present invention.

FIG. 35 illustrates connection of switch constellations 3410 to sink nodes 228 (edge nodes 220) through downstream WDM links 3550.

WDM Linkage of Edge Nodes to Switches

In the exemplary switching system of FIG. 36 to FIG. 41, switches 3640 are arranged in a matrix having six columns and six rows ($\mu=6$). Each switch 3640 has four input ports, four output ports (m=4), a control inlet, and a control outlet.

FIG. 36, FIG. 37, and FIG. 38 illustrate upstream connections from source nodes 224 (edge nodes 220) to switches 3640 through an assembly 3625 of upstream spectral routers. Each switch 3640 is coupled to a spectral demultiplexer 3635 at input and a spectral multiplexer 3645 at output. Assembly 3625 of upstream spectral routers connects a set of four source nodes 224 to six spectral demultiplexers 3635 each preceding a switch 3640 of a row of the matrix of switches 3640. A WDM link 3630 at input of each spectral demultiplexer 3645 carries a spectral band from each of the four source nodes 224.

FIG. 39, FIG. 40, and FIG. 41 illustrate downstream connections from switches 3640 to sink nodes 228 (edge nodes 220) through an assembly 3925 of downstream spectral routers. Assembly 3925 of downstream spectral routers connects six spectral multiplexers 3645 each succeeding a switch 3640 of a column of the matrix of switches 3640 to a set of four sink nodes 228. A WDM link 3950 at output of each spectral multiplexer 3645 carries a spectral band to each of the four sink nodes 228.

Source nodes 224 of indices $\{j \times m\}$ to $\{(j+1) \times m-1\}$ connect to switches 3640 of a row of index j through an assembly 3625($j$), $0 \leq j < \mu$. For j=0, FIG. 36 illustrates source nodes 3620 of indices 0 to 3 $\{0$ to m$-1\}$ connecting through assembly 3625(0) of spectral routers to switches 3640 of a row of index 0 of the matrix of switches 3640. For j=1, FIG. 37 illustrates source nodes 3620 of indices 4 to 7 $\{$m to $2 \times m-1\}$ connecting through assembly 3625(1) of spectral routers to switches 3640 of a row of index 1 of the matrix of switches 3640. For j=$\mu-1$, $\mu=6$, FIG. 38 illustrates source nodes 3620 of indices 20 to 23 $\{(\mu-1) \times m$ to $\mu \times m-1)\}$ connecting through assembly 3625($\mu-1$) of spectral routers to switches 3640 of a row of index ($\mu-1$) of the matrix of switches 3640.

Switches 3640 of a column of index j connect to sink nodes of indices $\{j \times m\}$ to $\{(j+1) \times m-1\}$ through an assembly 3925($j$), $0 \leq j < \mu$, of downstream spectral routers. For j=0, FIG. 39 illustrates switches 3640 of a column of index 0 of the matrix of switches 3640 connecting to sink nodes 228 of indices 0 to 3 $\{0$ to m$-1\}$ through assembly 3925(0) of downstream spectral routers. For j=1, FIG. 40 illustrates switches 3640 of a column of index 1 of the matrix of switches 3640 connecting to sink nodes 228 of indices 4 to 7 $\{$m to $2 \times m-1\}$ through assembly 3925(1) of spectral routers. For j=$\mu-1$, FIG. 41 illustrates switches 3640 of a column of index ($\mu-1$), $\mu=6$, of the matrix of switches 3640 connecting to sink nodes 228 of indices 20 to 23 $\{(\mu-1) \times m$ to $\mu \times m-1)\}$ through assembly 3925($\mu-1$) of spectral routers ($\mu=6$).

FIG. 42 illustrates a constellation of collocated switches 3640 indicating collocated spectral demultiplexers 4220, each spectral demultiplexer separating spectral bands from an upstream WDM link originating from a respective source node 224 (a respective edge node 220). Each spectral demultiplexer receives data from a single edge node 220 (a single source node 224) through an upstream WDM link. Spectral demultiplexers 4220(0) to 4220(3) coupled to the first row of switches of the constellation connect to upstream WDM links from edge nodes 220(0) to 220(3). Spectral demultiplexers 4220(4) to 4220(7) coupled to the second row of switches of the constellation connect to upstream WDM links from edge nodes 220(4) to 220(7). Spectral demultiplexers 4220(8) to 4220(11) coupled to the third row of switches of the constellation connect to upstream WDM links from edge nodes 220(8) to 220(11).

FIG. 43 illustrates collocated spectral multiplexers 4380 coupled to the constellation of collocated switches of FIG. 42, each spectral multiplexer 4380 combining spectral bands directed to a respective sink node 228 (a respective edge node 220). Each spectral multiplexer transmits data to a single edge node 220 (a single sink node 228) through a downstream WDM link 4380. Spectral multiplexers 4380(0) to 4380(3) coupled to the first column of switches of the constellation connect to downstream WDM links to edge nodes 220(0) to 220(3). Spectral multiplexers 4380(4) to 4380(7) coupled to the second column of switches of the constellation connect to downstream WDM links to edge nodes 220(4) to 220(7). Spectral multiplexers 4380(8) to 4380(11) coupled to the third column of switches of the constellation connect to downstream WDM links to edge nodes 220(8) to 220(11).

The matrix of switches 3640 of FIG. 36 may be arranged into four constellations arranged in a constellation matrix of $\chi$ columns and $\chi$ rows, each constellation comprising switches arranged in a sub-matrix of $\Lambda$ columns and $\Lambda$ rows so that $\mu = \chi \times \Lambda$. In the configurations of FIG. 44 to FIG. 47, $\Lambda=3$ and $\chi=2$.

FIG. 44 and FIG. 45 illustrate upstream connections of edge nodes 220 to four constellations of switches 3640 of the matrix of switches of FIG. 36. The four constellations are arranged into a constellation matrix of two rows and two columns. A constellation assembly 4490 comprises switches 3640 of a constellation coupled to respective demultiplexers 4220 and respective multiplexers 3280. Each of edge nodes 220 of indices (j×m) to (j×m+m−1), has an upstream WDM link to a demultiplexer 4220 coupled to a switch 3640 of a row of index j, $0 \le j < \mu$, of switches 3640 of the matrix of switches of FIG. 36. Thus, each of edge nodes 220(0) to 220(3) has an upstream WDM link to a demultiplexer 4220 coupled to a switch 3640 of a first row (j=0) of switches of each of the two constellation assemblies 4490(0,0) and 4490(1,0) as illustrated in FIG. 44. Each of edge nodes 220(4) to 220(7) has an upstream WDM link to a demultiplexer 4220 coupled to a switch 3640 of a second row (j=1) of switches of each of the two constellation assemblies 4490(0,0) and 4490(1,0), as illustrated in FIG. 45. Each of edge nodes 220(12) to 220(15) has an upstream WDM link to a demultiplexer 4220 coupled to a switch 3640 of a fourth row (j=3) of switches of each of the two constellation assemblies 4490(0,1) and 4490(1,1), as illustrated in FIG. 44. Each of edge nodes 220(16) to 220(19) has an upstream WDM link to a demultiplexer 4220 coupled to a switch 3640 of a fifth row (j=4) of switches of each of the two constellation assemblies 4490(0,1) and 4490(1,1), as illustrated in FIG. 45.

FIG. 46 and FIG. 47 illustrate downstream connections of edge nodes 220 to the four constellations of switches 3640 of the matrix of switches of FIG. 36.

Each of edge nodes 220 of indices (j×m) to (j×m+m−1), has a downstream WDM link from a multiplexer 4380 coupled to a switch 3640 of a column of index j, $0 \le j < \mu$, of switches 3640 of the matrix of switches of FIG. 36. Thus, each of edge nodes 220(0) to 220(3) has a downstream WDM link from a multiplexer 4380 coupled to a switch 3640 of a first column (j=0) of switches of each of the two constellation assemblies 4490(0,0) and 4490(0,1) as illustrated in FIG. 46. Each of edge nodes 220(4) to 220(7) has a downstream WDM link from a multiplexer 4380 coupled to a switch 3640 of a second column (j=1) of switches of each of the two constellation assemblies 4490(0,0) and 4490(0,1), as illustrated in FIG. 47. Each of edge nodes 220(12) to 220(15) has a downstream WDM link from a multiplexer 4380 coupled to a switch 3640 of a fourth column (j=3) of switches of each of the two constellation assemblies 4490(1,0) and 4490(1,1), as illustrated in FIG. 46. Each of edge nodes 220(16) to 220(19) has a downstream WDM link from a multiplexer 4380 coupled to a switch 3640 of a fifth column (j=4) of switches of each of the two constellation assemblies 4490(1,0) and 4490(1,1), as illustrated in FIG. 47.

FIG. 48 illustrates a switching system comprising switches arranged into a constellation matrix of $\chi$ columns of constellations and $\chi$ rows of constellations where $\chi=9$. Each constellation is similar to the constellation of FIG. 42 and FIG. 43 which comprises switches logically arranged in a sub-matrix of $\Lambda$ columns and $\Lambda$ rows where $\Lambda=3$. Each switch has m input ports and m output ports, m=4, in addition to a control inlet and a control outlet as illustrated in FIG. 3. Source nodes 224 and sink nodes 228 are connected to the constellations of switches through spectral demultiplexers 4220 and spectral multiplexers 4380. Each source node 224 (edge node 220) may have an upstream WDM link 4824 to a respective spectral demultiplexer in each of respective constellations and each sink node 228 (edge node 220) may have a downstream WDM link 4828 from a respective spectral multiplexer in each of respective constellations. The switches of all of the constellations of FIG. 48 form a logical matrix of switches of $\mu$ columns and $\mu$ rows, $\mu = \chi \times \Lambda = 27$. The total number of edge nodes 220 is $\mu \times m = 108$.

FIG. 48 illustrates upstream WDM links 4824 from edge node 220(1) and downstream WDM links 4828 to edge node 220(1). FIG. 49 illustrates upstream WDM links 4824 from edge node 220(51) to constellations of switches of a respective row of constellations, and downstream WDM links 4828 to edge node 220(51) from constellations of switches of a respective column of constellations.

In a switching system configured as a global network having a relatively large number of switches, the switches may be grouped into a large number of constellations of collocated switches. For example, the network may comprise 256 constellations arranged in a constellation matrix of 16 columns of constellations and 16 rows of constellations ($\chi=16$), each constellation being organized into a sub-matrix of 64 columns of switches and 64 rows of switches ($\Lambda=64$). With each switch having 64 input ports and 64 output ports (m=64), in addition to a control inlet and a control outlet, the network may support 65536 edge nodes 220 where each edge node has 1024 upstream channels 218 (FIG. 2) to a set of 1024 switches in different constellations of a row of 16 constellations and 1024 downstream channels 216 (FIG. 2) from another set of 1024 of switches in different constellations of a column of 16 constellations.

In a switching system configured as a large-scale network, upstream spectral routers may be used to connect source nodes 224 (edge nodes 220) to the switches 140 and downstream spectral routers may be used to connect the switches 140 to the sink nodes 228 (edge nodes 220) as illustrated in FIG. 32 and FIG. 33. To eliminate the need for spectral routers, the switches 140 may be arranged in collocated constellations as described above with reference to FIG. 42 to FIG. 49.

Integrating diagonal pairs of switches

The switches 140 are preferably implemented as fast optical switches and the rotators 2540 are preferably implemented as fast optical rotators. A fast optical switch, or a fast optical rotator, has a scalability limitation in terms of the number of input and output ports. The coverage and capacity of the switching systems described above, whether based on interconnecting edge nodes through switches 140 or rotators 2540, increases with the number of input ports (and output ports) of a switch or rotator. Thus, a preferred implementation of a switching system may be based on employing collocated switches of each diagonal pair of switches as illustrated in FIG. 20, where the two switches of a diagonal pair of switches share a dual controller 2070 comprising two mutually coupled controllers, or have a common controller (not illustrated). Likewise, a preferred implementation of a switching system employing rotators (FIG. 25 and FIG. 26) to interconnect edge nodes may be based on employing collocated rotators of each diagonal pair of switches as illustrated in FIG. 29, where the two rotators of a diagonal pair of switches share a dual timing circuit 2970.

However, if the switching system employs electronic switches 140, the two switches of each diagonal switch pair may be fully integrated into a larger switch. Likewise, if the switching system employs electronic rotators 2540, the two rotators of each diagonal rotator pair may be fully integrated into a larger rotator.

FIG. 50 illustrates a switching system 5000 similar to the switching system of FIG. 10 and FIG. 11 where the two switches 140 of each diagonal pair of switches are integrated to share a common switching mechanism forming a larger switch 5040 supporting 2×m input ports and 2×m output ports in addition to a control inlet and a control outlet. As described above, a diagonal pair of switches comprises a switch of column j and row k and a switch of column k and row j, j≠k, of a matrix of switches having μ columns and μ rows, μ>2. The columns are indexed as 0 to (μ−1) and the rows are indexed as 0 to (μ−1). The diagonal switches 140(j, j), 0≤j<μ, of switching system 5000, are the same as the diagonal switches of the switching system of FIG. 10 and FIG. 11.

Indices 5010 of source nodes 224 (edge nodes 220) connecting to input ports of each switch 140 or 5040, and the indices 5020 of sink nodes 228 (edge nodes 220) connecting to output ports of each switch 140 or 5040, are indicated in FIG. 50. For example, switch 5040(2,1) receives data from edge nodes 220 (source nodes 224) of indices 4 to 11 and transmits switched data to edge nodes 220 (sink nodes 228) of indices 4 to 11. Switch 5040(4,0) receives data from edge nodes 220 (source nodes 224) of indices 0 to 3 and 16 to 19, and transmits switched data to edge nodes 220 (sink nodes 228) of indices 0 to 3 and 16 to 19. Diagonal switch 140(2,2) receives data from edge nodes 220 (source nodes 224) of indices 8 to 11 and transmits data to edge nodes 220 (sink nodes 228) of indices 8 to 11.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A switching system comprising:
   a plurality of switches logically arranged in a matrix of μ columns and μ rows, μ>2, each switch comprising:
      a number of input ports and a same number of output ports; and
      a respective switch controller;
      wherein a first controller of a switch of column j and row k is directly coupled to a second controller of a switch of column k and row j, j≠k, the columns being indexed as 0 to (μ−1) and the rows being indexed as 0 to (μ−1);
   a master time indicator directly coupled to both said first controller and to said second controller;
   a plurality of edge nodes, each edge node communicatively coupled to:
      an input port of each switch of a respective row; and
      an output port of each switch of a respective column;
   said first controller configured to communicate control data to a first edge node connected to an input port of said first switch along a control path traversing said second controller and a switching mechanism of said second switch.

2. The switching system of claim 1 wherein said each switch comprises a control inlet and a control outlet coupled to said respective switch controller.

3. The switching system of claim 1 wherein said respective switch controller comprises:
   a scheduler for scheduling data transfer through said each switch; and
   a timing circuit for exchanging timing data with each edge node connecting to said each switch.

4. The switching system of claim 1 wherein said each switch comprises:
   a spectral demultiplexer directing individual spectral bands from an upstream wavelength-division-multiplexed link to respective input ports; and
   a spectral multiplexer combining spectral bands from said output ports onto a downstream wavelength-division-multiplexed link.

5. The switching system of claim 4 further comprising:
   a plurality of upstream spectral routers, each upstream spectral router connecting a set of upstream WDM links originating from a respective set of edge nodes, of said plurality of edge nodes, to a set of WDM links each terminating on a single switch of said plurality of switches; and
   a plurality of downstream spectral routers, each downstream spectral router connecting a set of WDM links each originating from a single switch to a respective set of downstream WDM links each terminating on a single edge node.

6. The switching system of claim 1 wherein said matrix is further organized into constellations of switches, each constellation comprising Λ rows and Λ columns of switches, Λ>1, wherein all switches of each constellation are collocated, each constellation coupled to:
   Λ arrays of spectral demultiplexers, each spectral demultiplexer directing spectral bands of a respective upstream WDM link to an input port of each switch of a row of said each constellation; and
   Λ arrays of spectral multiplexers, each spectral multiplexer combining spectral bands from an output port of each switch of a column of said each constellation onto a respective downstream WDM link.

7. The switching system of claim 6 wherein said each edge node is coupled to:

an upstream WDM link to a spectral demultiplexer of each constellation of a respective row of constellations; and a downstream WDM link from a spectral multiplexer of each constellation of a respective column of constellations.

8. A method of switching comprising:

arranging a plurality of switches, each switch coupled to a respective controller, in a matrix of $\mu$ columns and $\mu$ rows, $\mu>2$, where a first switch and a second switch of each diagonal pair of switches are collocated;

mutually coupling a first controller of said first switch and a second controller of said second switch;

coupling a master time indicator to said first controller and said second controller;

connecting each edge node of a plurality of edge nodes to an input port of each switch of a respective row and an output port of each switch of a respective column; and communicating control data from said first controller to a first edge node connected to an input port of said first switch along a first control path traversing said second controller and a switching mechanism of said second switch.

9. The method of claim 8 further comprising communicating control data from said second controller to a second edge node connected to an input port of said second switch along a second control path traversing said first controller and a switching mechanism of said first switch.

10. The method of claim 8 further comprising performing at said respective controller processes of:

scheduling data transfer through said each switch; and
exchanging timing data with each edge node connecting to said each switch.

11. The method of claim 8 further comprising:

receiving timing data from said first edge node;
correlating at said first controller said timing data with a reading of said master time indicator; and
communicating a result of said correlating to said first edge node through said first control path.

12. The method of claim 9 further comprising:

receiving timing data from said second edge node;
correlating at said second controller said timing data with a reading of said master time indicator;
communicating a result of said correlating to said second edge node through said second control path.

13. The method of claim 8 further comprising:

adding ($2\times\mu+1$) new switches as a new column of switches and a new row of switches to said matrix of switches;
providing m additional edge nodes, m being a number of input ports and a number of output ports of each switch of said plurality of switches;
connecting each edge node of said additional edge nodes to an input port of each switch of ($\mu+1$) switches of said new row of switches;

connecting m input ports of each switch of remaining $\mu$ switches to a set of edge nodes connecting to one of the rows of switches.

14. The method of claim 13 further comprising:

indexing edge nodes of said plurality of edge nodes sequentially where edge nodes connecting to a row of index q and a column of index q, $0\leq q<\mu$, are indexed as $(j+m\times q)$, $0\leq j<m$, thereby, the index of an edge node remains unchanged as the switching system grows to accommodate more edge nodes.

15. The method of claim 8 further comprising:

adding an input port and an output port to each switch of said plurality of switches;
providing $\mu$ additional edge nodes; and
connecting each edge node of said additional edge nodes to an input port of each switch of a row of index q and an output port of each switch of a column of index q, $0\leq q<\mu$.

16. The method of claim 15 further comprising:

indexing edge nodes of said plurality of edge nodes sequentially where edge nodes connecting to a row of index q and a column of index q, $0\leq q<\mu$, are indexed as $(q+\mu\times j)$, $0\leq j<m$, thereby, the index of an edge node remains unchanged as the switching system grows to accommodate more edge nodes.

17. A switching system comprising:

a plurality of switches logically organized into a matrix of constellations of collocated switches each constellation comprising $\Lambda$ rows and $\Lambda$ columns of switches, $\Lambda>1$, each switch coupled to a respective switch controller and comprising a number of input ports and the same number of output ports;

each constellation coupled to:

$\Lambda$ arrays of spectral demultiplexers, each spectral demultiplexer directing spectral bands of a respective upstream WDM link to an input port of each switch of a row of said each constellation; and $\Lambda$ arrays of spectral multiplexers, each spectral multiplexer combining spectral bands from an output port of each switch of a column of said each constellation onto a respective downstream WDM link;

a plurality of edge nodes, each edge node coupled to:

an upstream WDM link to a respective spectral demultiplexer of each constellation of a respective row of said matrix; and a downstream WDM link from a respective spectral multiplexer of each constellation of a respective column of said matrix;

said respective spectral demultiplexer and said respective spectral multiplexer being selected so that each switch of a first constellation and a corresponding switch of a second constellation constitute a complementary switch pair, where said first constellation and said second constellation belong to a diagonal constellation pair.

* * * * *